(12) United States Patent
Huang et al.

(10) Patent No.: US 9,187,601 B2
(45) Date of Patent: *Nov. 17, 2015

(54) WATER-PROCESSABLE SILICONE-CONTAINING PREPOLYMERS AND USES THEREOF

(75) Inventors: Jinyu Huang, Suwanee, GA (US); Frank Chang, Suwanee, GA (US); Robert Scott, Alpharetta, GA (US); Arturo Norberto Medina, Suwanee, GA (US); Manivakkam J. Shankernarayanan, Alpharetta, GA (US); Selma Kuyu, Duluth, GA (US); Dawn Alison Smith, Rotorua (NZ); Daqing Wu, Suwanee, GA (US)

(73) Assignee: Novartis AG, Basel (CH)

( * ) Notice: Subject to any disclaimer, the term of this patent is extended or adjusted under 35 U.S.C. 154(b) by 1025 days.

This patent is subject to a terminal disclaimer.

(21) Appl. No.: 13/253,186

(22) Filed: Oct. 5, 2011

(65) Prior Publication Data

US 2012/0088861 A1   Apr. 12, 2012

Related U.S. Application Data

(60) Provisional application No. 61/390,448, filed on Oct. 6, 2010, provisional application No. 61/390,464, filed on Oct. 6, 2010, provisional application No. 61/422,672, filed on Dec. 14, 2010.

(51) Int. Cl.
| | | |
|---|---|---|
| C08F 230/08 | (2006.01) | |
| C08G 77/42 | (2006.01) | |
| C08G 77/442 | (2006.01) | |
| C08L 83/10 | (2006.01) | |
| G02B 1/04 | (2006.01) | |
| C08G 77/20 | (2006.01) | |

(52) U.S. Cl.
CPC .............. *C08G 77/42* (2013.01); *C08G 77/442* (2013.01); *C08L 83/10* (2013.01); *G02B 1/043* (2013.01); *C08G 77/20* (2013.01)

(58) Field of Classification Search
CPC ...... C08G 77/42; C08G 77/442; G02B 1/043; C08L 83/10
USPC .......................................................... 523/107
See application file for complete search history.

(56) References Cited

U.S. PATENT DOCUMENTS

| | | | |
|---|---|---|---|
| 4,042,552 A | 8/1977 | Grueza | |
| 4,045,547 A | 8/1977 | Le Boeuf et al. | |
| 4,136,250 A | 1/1979 | Mueller et al. | |
| 4,153,641 A | 5/1979 | Deichert et al. | |
| 4,182,822 A | 1/1980 | Chang | |
| 4,189,546 A | 2/1980 | Deichert et al. | |
| 4,245,069 A | 1/1981 | Covington | |
| 4,254,248 A | 3/1981 | Friends et al. | |
| 4,259,467 A | 3/1981 | Keogh et al. | |
| 4,260,725 A | 4/1981 | Keogh et al. | |
| 4,261,875 A | 4/1981 | Le Boeuf | |
| 4,276,402 A | 6/1981 | Chromecek et al. | |
| 4,312,575 A | 1/1982 | Peyman et al. | |
| 4,327,203 A | 4/1982 | Deichert et al. | |
| 4,341,889 A | 7/1982 | Deichert et al. | |
| 4,343,927 A | 8/1982 | Chang | |
| 4,355,147 A | 10/1982 | Deichert et al. | |
| 4,444,711 A | 4/1984 | Schad | |
| 4,460,534 A | 7/1984 | Boehm et al. | |
| 4,467,082 A | 8/1984 | Shirahata et al. | |
| 4,485,236 A | 11/1984 | Rasmussen | |
| 4,486,577 A * | 12/1984 | Mueller et al. ................ | 525/474 |
| 4,543,398 A | 9/1985 | Bany et al. | |
| 4,605,712 A | 8/1986 | Mueller et al. | |
| 4,632,844 A | 12/1986 | Yanagihara et al. | |
| 4,661,575 A | 4/1987 | Tom | |
| 4,666,953 A | 5/1987 | Klemarczyk et al. | |
| 4,684,538 A | 8/1987 | Klemarczyk | |
| 4,703,097 A | 10/1987 | Wingler et al. | |

(Continued)

FOREIGN PATENT DOCUMENTS

| | | |
|---|---|---|
| EP | 0379146 B1 | 7/1990 |
| EP | 0425436 A2 | 5/1991 |

(Continued)

OTHER PUBLICATIONS

PCT International Search Report dated Dec. 28, 2011, International Application No. PCT/US2011/054878, International Filing Date Oct. 5, 2011.

PCT Written Opinion of the International Searching Authority dated Dec. 28, 2011, International Application No. PCT/US2011/054878, International Filing Date Oct. 5, 2011.

Authors: Y.F.Wang, T.M.Chen, Y.J.Li, M.Kitamura, and T.Nakaya Title of Article: Amphiphilic Poly(acrylamide)s Having Saturated and Unsaturated Dialkyl Chains and Phosp:: hatidylcholine Groups in the Side Chains Published: Macromolecules 1996, vol. 29, No. 18, pp. 5810-5817.

(Continued)

*Primary Examiner* — Michael Pepitone
(74) *Attorney, Agent, or Firm* — Jian Zhou

(57) ABSTRACT

The invention provide a class of water-processable polymerizable prepolymers which comprises (1) siloxane-containing monomeric units derived at least one siloxane containing monomer having one hydrophilic group or chain and/or polysiloxane-containing crosslinking units derived from at least one hydrophilized polysiloxane or chain-extended polysiloxane crosslinker; (2) hydrophilic monomeric units derived from one or more hydrophilic vinylic monomers; and (3) from about 0.05% to about 5% by weight of polymerizable units each having a pendant or terminal, ethylenically-unsaturated group and free of any polysiloxane segment. The prepolymer comprises from about 20% to about 50% by weight of silicone relative to the total weight of the prepolymer and has a high water solubility or dispersibility of at least about 5% by weight in water and suitable for making silicone hydrogel contact lenses.

11 Claims, No Drawings

(56) References Cited

U.S. PATENT DOCUMENTS

| | | |
|---|---|---|
| 4,711,943 A | 12/1987 | Harvey, III |
| 4,833,218 A | 5/1989 | Lee |
| 4,837,289 A | 6/1989 | Mueller et al. |
| 4,954,586 A | 9/1990 | Toyoshima |
| 4,954,587 A | 9/1990 | Mueller |
| 4,983,702 A | 1/1991 | Mueller |
| 5,010,141 A | 4/1991 | Mueller |
| 5,034,461 A | 7/1991 | Lai |
| 5,039,761 A | 8/1991 | Ono |
| 5,070,170 A | 12/1991 | Robertson |
| 5,070,215 A | 12/1991 | Bambury |
| 5,079,319 A | 1/1992 | Mueller |
| 5,164,462 A | 11/1992 | Yang |
| 5,194,556 A | 3/1993 | Mueller |
| 5,198,477 A | 3/1993 | von der Haegen |
| 5,219,965 A | 6/1993 | Valint, Jr. |
| 5,224,957 A | 7/1993 | Gasser |
| 5,227,432 A | 7/1993 | Jung |
| 5,244,981 A | 9/1993 | Seidner |
| 5,314,960 A | 5/1994 | Spinelli |
| 5,314,961 A | 5/1994 | Anton |
| 5,331,067 A | 7/1994 | Seidner |
| 5,346,946 A | 9/1994 | Yokoyama |
| 5,352,753 A | 10/1994 | Yang |
| 5,358,995 A | 10/1994 | Lai |
| 5,376,637 A | 12/1994 | Sawai |
| 5,387,632 A | 2/1995 | Lai |
| 5,416,132 A | 5/1995 | Yokoyama |
| 5,426,158 A | 6/1995 | Mueller |
| 5,449,729 A | 9/1995 | Lai |
| 5,451,617 A | 9/1995 | Lai |
| 5,466,768 A | 11/1995 | Yang |
| 5,480,927 A | 1/1996 | Janssen |
| 5,486,579 A | 1/1996 | Lai |
| 5,489,474 A | 2/1996 | Shinoda |
| 5,508,317 A | 4/1996 | Müller |
| 5,512,205 A | 4/1996 | Lai |
| 5,527,925 A | 6/1996 | Chabrecek |
| 5,559,163 A | 9/1996 | Dawson |
| 5,583,163 A | 12/1996 | Müller |
| 5,612,389 A | 3/1997 | Chabrecek |
| 5,612,391 A | 3/1997 | Chabrecek |
| 5,621,018 A | 4/1997 | Chabrecek |
| 5,637,726 A | 6/1997 | Collins |
| 5,663,288 A | 9/1997 | Shinoda |
| 5,665,840 A | 9/1997 | Pöhlmann |
| 5,681,871 A | 10/1997 | Molock |
| 5,712,356 A | 1/1998 | Bothe |
| 5,723,512 A | 3/1998 | Leppard |
| 5,729,322 A | 3/1998 | Collins |
| 5,760,100 A | 6/1998 | Nicolson |
| 5,767,169 A | 6/1998 | Leppard |
| 5,789,464 A | 8/1998 | Müller |
| 5,843,346 A | 12/1998 | Morrill |
| 5,849,810 A | 12/1998 | Müller |
| 5,849,811 A | 12/1998 | Nicolson |
| 5,849,841 A | 12/1998 | Mühlebach |
| 5,866,635 A | 2/1999 | Collins |
| 5,894,002 A | 4/1999 | Boneberger |
| 5,914,355 A | 6/1999 | Künzler |
| 5,959,117 A | 9/1999 | Ozark et al. |
| 5,962,548 A | 10/1999 | Vanderlaan |
| 5,965,776 A | 10/1999 | Leppard |
| 5,981,615 A | 11/1999 | Meijs |
| 5,981,669 A | 11/1999 | Valint, Jr. |
| 5,981,675 A | 11/1999 | Valint, Jr. |
| 5,989,462 A | 11/1999 | Buazza |
| 5,998,498 A | 12/1999 | Vanderlaan |
| 6,015,842 A | 1/2000 | LeBoeuf |
| 6,015,874 A | 1/2000 | Hiratani |
| 6,020,445 A | 2/2000 | Vanderlaan |
| 6,020,528 A | 2/2000 | Leppard |
| 6,036,891 A | 3/2000 | Liao |
| 6,039,913 A | 3/2000 | Hirt |
| 6,043,328 A | 3/2000 | Domschke |
| 6,096,846 A | 8/2000 | Oda |
| 6,136,880 A | 10/2000 | Snowwhite |
| 6,149,692 A | 11/2000 | Lally |
| 6,153,760 A | 11/2000 | Künzler |
| 6,162,844 A | 12/2000 | Lally |
| 6,165,408 A | 12/2000 | Steinmann |
| 6,204,306 B1 | 3/2001 | Chabrecek |
| 6,218,463 B1 | 4/2001 | Molock |
| 6,221,303 B1 | 4/2001 | Steinmann |
| 6,252,032 B1 | 6/2001 | Van Antwerp |
| 6,284,813 B1 | 9/2001 | Leppard |
| 6,303,687 B1 | 10/2001 | Müller |
| 6,310,215 B1 | 10/2001 | Iwamoto |
| 6,312,706 B1 | 11/2001 | Lai |
| 6,329,485 B1 | 12/2001 | Vanderbilt |
| 6,342,570 B1 | 1/2002 | Bothe |
| 6,359,024 B2 | 3/2002 | Lai |
| 6,359,025 B1 | 3/2002 | Snowwhite |
| 6,361,925 B1 | 3/2002 | Leppard |
| 6,367,929 B1 | 4/2002 | Maiden |
| 6,376,568 B1 | 4/2002 | Baudin |
| 6,451,871 B1 | 9/2002 | Winterton |
| 6,465,538 B2 | 10/2002 | Lai |
| 6,472,489 B1 | 10/2002 | Stockinger |
| 6,479,587 B1 | 11/2002 | Stockinger |
| 6,492,478 B1 | 12/2002 | Steinmann |
| 6,596,294 B2 | 7/2003 | Lai et al. |
| 6,627,124 B1 | 9/2003 | Herbrechtsmeier et al. |
| 6,638,991 B2 | 10/2003 | Baba et al. |
| 6,657,029 B2 | 12/2003 | Vanderbilt |
| 6,657,030 B2 | 12/2003 | Vanderbilt |
| 6,657,032 B2 | 12/2003 | Vanderbilt |
| 6,673,886 B2 | 1/2004 | Vanderbilt |
| 6,693,141 B2 | 2/2004 | Baudin et al. |
| 6,713,583 B2 | 3/2004 | Liao et al. |
| 6,719,929 B2 | 4/2004 | Winterton et al. |
| 6,762,264 B2 | 7/2004 | Künzler et al. |
| 6,776,934 B2 | 8/2004 | Lai |
| 6,793,973 B2 | 9/2004 | Winterton |
| 6,800,225 B1 | 10/2004 | Hagmann |
| 6,811,804 B2 | 11/2004 | Patel |
| 6,811,805 B2 | 11/2004 | Gilliard |
| 6,822,016 B2 | 11/2004 | McCabe |
| 6,849,671 B2 | 2/2005 | Steffen |
| 6,852,353 B2 | 2/2005 | Qiu |
| 6,852,793 B2 | 2/2005 | Salamone |
| 6,858,218 B2 | 2/2005 | Lai |
| 6,884,457 B2 | 4/2005 | Gilliard |
| 6,896,926 B2 | 5/2005 | Qiu |
| 6,926,965 B2 | 8/2005 | Qiu |
| 6,940,580 B2 | 9/2005 | Winterton |
| 6,943,203 B2 | 9/2005 | Vanderlaan |
| 6,995,192 B2 | 2/2006 | Phelan |
| 7,040,756 B2 | 5/2006 | Qiu |
| 7,052,131 B2 | 5/2006 | McCabe |
| 7,071,274 B2 | 7/2006 | Fujisawa |
| 7,078,074 B2 | 7/2006 | Matsuzawa |
| 7,091,283 B2 | 8/2006 | Müller |
| 7,112,641 B2 | 9/2006 | Fujisawa |
| 7,214,809 B2 | 5/2007 | Zanini |
| 7,238,750 B2 | 7/2007 | Müller |
| 7,247,692 B2 | 7/2007 | Laredo |
| 7,249,848 B2 | 7/2007 | Laredo |
| 7,256,246 B2 | 8/2007 | Kindt-Larsen |
| 7,268,189 B2 | 9/2007 | Müller |
| 7,279,507 B2 | 10/2007 | Hu |
| 7,384,590 B2 | 6/2008 | Kelly |
| 7,387,759 B2 | 6/2008 | Kelly |
| 7,396,890 B2 | 7/2008 | Zanini |
| 7,416,737 B2 | 8/2008 | Alvarez-Carrigan |
| 7,423,108 B2 | 9/2008 | Kunzler |
| 7,461,937 B2 | 12/2008 | Steffen |
| 7,468,397 B2 | 12/2008 | Schorzman |
| 7,521,488 B2 | 4/2009 | Steffen |
| 7,550,519 B2 | 6/2009 | Phelan |
| 7,649,058 B2 | 1/2010 | McCabe |
| 7,666,921 B2 | 2/2010 | McCabe |
| 7,691,916 B2 | 4/2010 | McCabe |
| 8,044,111 B2 | 10/2011 | Chang |

(56) References Cited

U.S. PATENT DOCUMENTS

| | | |
|---|---|---|
| 8,048,968 B2 | 11/2011 | Phelan |
| 8,835,525 B2 * | 9/2014 | Kuyu et al. .................. 523/107 |
| 2001/0037001 A1 | 11/2001 | Muller |
| 2002/0042022 A1 | 4/2002 | Leppard |
| 2002/0107297 A1 | 8/2002 | Baudin |
| 2002/0107324 A1 | 8/2002 | Vanderlaan et al. |
| 2002/0198280 A1 | 12/2002 | Baba |
| 2003/0044447 A1 | 3/2003 | Zanini |
| 2003/0125498 A1 | 7/2003 | McCabe |
| 2003/0162862 A1 | 8/2003 | McCabe |
| 2004/0082680 A1 | 4/2004 | Phelan |
| 2004/0115242 A1 | 6/2004 | Meyers |
| 2004/0150788 A1 | 8/2004 | Anderson |
| 2004/0151755 A1 | 8/2004 | Rathore |
| 2004/0186248 A1 | 9/2004 | Vanderlaan |
| 2004/0198916 A1 | 10/2004 | Nakamura |
| 2004/0209973 A1 | 10/2004 | Steffen |
| 2004/0213827 A1 | 10/2004 | Enns |
| 2005/0055090 A1 | 3/2005 | Lai |
| 2005/0113549 A1 | 5/2005 | Devlin |
| 2005/0117112 A1 | 6/2005 | Nayiby |
| 2005/0154080 A1 | 7/2005 | McCabe |
| 2005/0159502 A1 | 7/2005 | Steffen |
| 2005/0179862 A1 | 8/2005 | Steffen |
| 2005/0237483 A1 | 10/2005 | Phelan |
| 2005/0260249 A1 | 11/2005 | Neely |
| 2006/0007391 A1 | 1/2006 | McCabe |
| 2006/0036052 A1 | 2/2006 | Kindt-Larsen |
| 2006/0069178 A1 | 3/2006 | Rastogi |
| 2006/0235162 A1 | 10/2006 | Muller |
| 2006/0252850 A1 | 11/2006 | Jani |
| 2007/0043140 A1 | 2/2007 | Lorenz |
| 2007/0092830 A1 | 4/2007 | Lai |
| 2007/0092831 A1 | 4/2007 | Lai |
| 2007/0138692 A1 | 6/2007 | Ford |
| 2007/0142551 A1 | 6/2007 | Kunzler |
| 2007/0142584 A1 | 6/2007 | Schorzman |
| 2007/0160643 A1 | 7/2007 | Schorzman |
| 2007/0160649 A1 | 7/2007 | Schorzman |
| 2007/0161810 A1 | 7/2007 | Schorzman |
| 2007/0229757 A1 | 10/2007 | McCabe |
| 2007/0242215 A1 | 10/2007 | Schorzman |
| 2008/0000201 A1 | 1/2008 | Schorzman |
| 2008/0004413 A1 | 1/2008 | Schorzman |
| 2008/0004414 A1 | 1/2008 | Schorzman |
| 2008/0015282 A1 | 1/2008 | McCabe |
| 2008/0015315 A1 | 1/2008 | Chang |
| 2008/0076897 A1 | 3/2008 | Kunzler |
| 2008/0143003 A1 | 6/2008 | Phelan |
| 2008/0143958 A1 | 6/2008 | Medina |
| 2008/0174035 A1 | 7/2008 | Winterton |
| 2008/0231798 A1 | 9/2008 | Zhou |
| 2008/0234457 A1 | 9/2008 | Zhou |
| 2008/0274207 A1 | 11/2008 | Nayiby |
| 2008/0299179 A1 | 12/2008 | Rathore |
| 2008/0316424 A1 | 12/2008 | McCabe |
| 2009/0005528 A1 | 1/2009 | Fujisawa |
| 2009/0059164 A1 | 3/2009 | Steffen |
| 2009/0091704 A1 | 4/2009 | Steffen |
| 2009/0143499 A1 | 6/2009 | Chang |
| 2009/0171026 A1 * | 7/2009 | Fujisawa et al. .............. 525/103 |
| 2009/0230575 A1 | 9/2009 | Liu |
| 2009/0234089 A1 | 9/2009 | Ueyama |
| 2009/0252868 A1 | 10/2009 | Phelan |
| 2009/0276042 A1 | 11/2009 | Hughes |
| 2010/0084775 A1 | 4/2010 | McCabe |
| 2010/0120938 A1 * | 5/2010 | Phelan et al. ................. 523/107 |
| 2010/0120939 A1 | 5/2010 | Phelan |
| 2010/0133710 A1 | 6/2010 | McCabe |
| 2010/0152084 A1 | 6/2010 | Rathore |
| 2010/0168359 A1 | 7/2010 | Domschke |

FOREIGN PATENT DOCUMENTS

| | | |
|---|---|---|
| EP | 0584764 B1 | 3/1994 |
| EP | 0584826 B1 | 3/1994 |
| EP | 0677561 A1 | 10/1995 |
| EP | 0862068 A2 | 9/1998 |
| EP | 0932635 B1 | 8/1999 |
| EP | 0958315 B1 | 11/1999 |
| EP | 0961941 B1 | 12/1999 |
| EP | 1754728 B1 | 2/2007 |
| GB | 2292740 A | 3/1996 |
| GB | 2310855 A | 9/1997 |
| WO | 9628762 | 9/1996 |
| WO | 9700274 A1 | 1/1997 |
| WO | 9805690 | 2/1998 |
| WO | 9847954 | 10/1998 |
| WO | 9933894 | 7/1999 |
| WO | 0031150 | 6/2000 |
| WO | 0059970 | 10/2000 |
| WO | 03/022321 A2 | 3/2003 |
| WO | 2007128051 A1 | 11/2007 |
| WO | 2007146299 A2 | 12/2007 |
| WO | 2007146312 A2 | 12/2007 |
| WO | 2008008752 A2 | 1/2008 |
| WO | 2008116131 A2 | 9/2008 |

OTHER PUBLICATIONS

English Translation of Japan Office Action, Patent Application No. 2013-532906, Dispatch No. 328844, Dispatch Date: Jul. 21, 2015.

* cited by examiner

WATER-PROCESSABLE SILICONE-CONTAINING PREPOLYMERS AND USES THEREOF

This application claims the benefits under 35 USC §119 (e) of U.S. provisional application Nos. 61/390,448 filed 6 Oct. 2010, 61/390,464 filed 6 Oct. 2010 and 61/422,672 filed 14 Dec. 2010, incorporated by reference in their entireties.

The present invention is related to a class of water-processable polymerizable prepolymers and uses thereof. In addition, the present invention is related to a method for making silicone hydrogel contact lenses from a water-based lens-forming composition and to the contact lenses made according to the method of the invention.

BACKGROUND

In recent years, soft silicone hydrogel contact lenses become more and more popular because of their high oxygen permeability and comfort. "Soft" contact lenses can conform closely to the shape of the eye, so oxygen cannot easily circumvent the lens. Soft contact lenses must allow oxygen from the surrounding air (i.e., oxygen) to reach the cornea because the cornea does not receive oxygen from the blood supply like other tissue. If sufficient oxygen does not reach the cornea, corneal swelling occurs. Extended periods of oxygen deprivation cause the undesirable growth of blood vessels in the cornea. By having high oxygen permeability, a silicone hydrogel contact lens allows sufficient oxygen permeate through the lens to the cornea and to have minimal adverse effects on corneal health.

However, all commercially available silicone hydrogel contact lenses are produced according to a conventional cast molding technique involving use of disposable plastic molds and a mixture of monomers and/or macromers. There are several disadvantages with such conventional cast-molding technique. For example, a traditional cast-molding manufacturing process must include lens extraction in which unpolymerized monomers must be removed from the lenses by using an organic solvent. Such lens extraction increases the production cost and decreases the production efficiency. In addition, disposable plastic molds inherently have unavoidable dimensional variations, because, during injection-molding of plastic molds, fluctuations in the dimensions of molds can occur as a result of fluctuations in the production process (temperatures, pressures, material properties), and also because the resultant molds may undergo non-uniformly shrinking after the injection molding. These dimensional changes in the mold may lead to fluctuations in the parameters of contact lenses to be produced (peak refractive index, diameter, basic curve, central thickness etc.) and to a low fidelity in duplicating complex lens design.

The above described disadvantages encountered in a conventional cast-molding technique can be overcome by using the so-called Lightstream Technology™ (CIBA Vision), which involves (1) a lens-forming composition being substantially free of monomers and comprising a substantially purified prepolymer with ethylenically-unsaturated groups, (2) reusable molds produced in high precision, and (3) curing under a spatial limitation of actinic radiation (e.g., UV), as described in U.S. Pat. Nos. 5,508,317, 5,583,463, 5,789,464, and 5,849,810. Lenses can be produced at relatively lower cost according to the Lightstream Technology™ to have high consistency and high fidelity to the original lens design.

But, the Lightstream Technology™ has not been applied to make silicone hydrogel contact lenses. One potential issue in the manufacture of silicone hydrogel contact lenses based on Lightstream Technology™ is that the silicone-containing polymerizable materials of a lens formulation are not soluble in water or ophthalmically compatible solvent (non-reactive diluent). As such a non-ophthalmically compatible organic solvent has to be used and a solvent exchange or hydration process has been carried out in the production. Another potential issue is that the silicone-containing components of a lens formulation left behind on the mold surface may not be water soluble and a non-ophthalmically compatible organic solvent, not water, may have to be used to wash the reusable molds. However, use of organic solvents can be costly and is not environmentally friendly. A water-based mold washing system is desirable.

Therefore, there is still a need for a water-processable polymerizable silicone-containing macromers or prepolymers and for washing, with a water-based system, reusable molds for making silicone hydrogel contact lenses according to the Lightstream Technology™. There is also a need for new actinically-crosslinkable prepolymers suitable for making silicone hydrogel contact lenses with desired bulk and surface properties according to the Lightstream Technology™.

SUMMARY OF THE INVENTION

The present invention, in one aspect, provides a water soluble or processable siloxane-containing prepolymer, which comprises: (1) siloxane-containing monomeric units and/or polysiloxane-containing crosslinking units, wherein the siloxane-containing monomeric units are derived from one or more siloxane-containing vinylic monomers each having at least one hydrophilic group and/or at least one hydrophilic polymeric chains, wherein the polysiloxane-containing crosslinking units are derived from at least one hydrophilized polysiloxane crosslinker and/or at least one chain-extended hydrophilized polysiloxane crosslinker; (2) hydrophilic monomeric units derived from one or more hydrophilic vinylic monomers; (3) from about 0.05% to about 5% by weight of polymerizable units each having a pendant or terminal, ethylenically-unsaturated group and free of any polysiloxane segment; and (4) optionally hydrophobic units derived from at least one hydrophobic vinylic monomer free of silicone, wherein the prepolymer comprises from about 20% to about 50% by weight of silicone relative to the total weight of the prepolymer and has a high water solubility or dispersibility of at least about 5% by weight in water, wherein the prepolymer is capable of being actinically crosslinked, in the absence of one or more vinylic monomers, to form a silicone hydrogel contact lens having a water content of from about 20% to about 75% by weight when fully hydrated and an oxygen permeability (Dk) of at least about 40 barrers.

In another aspect, the invention provides a method for making silicone hydrogel contact lenses, the method comprising a step of actinically polymerizing a lens-forming composition including an ophthalmically compatible solvent and a water-soluble or processable silicone-containing polymerizable material dissolved or dispersed therein.

In a further aspect, the invention provides silicone hydrogel contact lens, which comprises: a polymeric material that is obtained by polymerizing, in a mold, a lens-forming composition including an ophthalmically compatible solvent selected from the group consisting of water, 1,2-propylene glycol, a polyethyleneglycol having a molecular weight of about 400 Daltons or less, and combinations thereof, and a water soluble or processable silicone-containing polymerizable material dissolved or dispersed therein.

DETAILED DESCRIPTION OF EMBODIMENTS OF THE INVENTION

Unless defined otherwise, all technical and scientific terms used herein have the same meaning as commonly understood by one of ordinary skill in the art to which this invention belongs. Generally, the nomenclature used herein and the laboratory procedures are well known and commonly employed in the art. Conventional methods are used for these procedures, such as those provided in the art and various general references. Where a term is provided in the singular, the inventors also contemplate the plural of that term. The nomenclature used herein and the laboratory procedures described below are those well known and commonly employed in the art.

An "ophthalmic device", as used herein, refers to a contact lens (hard or soft), an intraocular lens, a corneal onlay, other ophthalmic devices (e.g., stents, glaucoma shunt, or the like) used on or about the eye or ocular vicinity.

"Contact Lens" refers to a structure that can be placed on or within a wearer's eye. A contact lens can correct, improve, or alter a user's eyesight, but that need not be the case. A contact lens can be of any appropriate material known in the art or later developed, and can be a soft lens, a hard lens, or a hybrid lens. A "silicone hydrogel contact lens" refers to a contact lens comprising a silicone hydrogel material.

A "hydrogel" or "hydrogel material" refers to a crosslinked polymeric material which can absorb at least 10 percent by weight of water when it is fully hydrated.

A "silicone hydrogel" refers to a silicone-containing hydrogel obtained by copolymerization of a polymerizable composition comprising at least one silicone-containing vinylic monomer or crosslinker or at least one actinically-crosslinkable silicone-containing prepolymer.

"Hydrophilic," as used herein, describes a material or portion thereof that will more readily associate with water than with lipids.

A "monomer" refers to a compound that can be polymerized chemically, actinically or thermally.

A "vinylic monomer", as used herein, refers to a monomer that has one sole ethylenically unsaturated group and can be polymerized actinically or thermally.

The term "olefinically unsaturated group" or "ethylenically unsaturated group" is employed herein in a broad sense and is intended to encompass any groups containing at least one >C=C< group. Exemplary ethylenically unsaturated groups include without limitation (meth)acryloyl $$(-\underset{\underset{O}{\|}}{C}-\underset{\underset{CH_3}{|}}{C}=CH_2 \text{ and/or } -\underset{\underset{O}{\|}}{C}-CH=CH_2),$$

allyl, vinyl, styrenyl, or other C=C containing groups.

As used herein, "actinically" in reference to curing, crosslinking or polymerizing of a polymerizable composition, a prepolymer or a material means that the curing (e.g., crosslinked and/or polymerized) is performed by actinic irradiation, such as, for example, UV irradiation, ionizing radiation (e.g. gamma ray or X-ray irradiation), microwave irradiation, and the like. Thermal curing or actinic curing methods are well-known to a person skilled in the art.

The term "(meth)acrylamide" refers to methacrylamide and/or acrylamide.

The term "(meth)acrylate" refers to methacrylate and/or acrylate.

A "hydrophilic vinylic monomer", as used herein, refers to a vinylic monomer which as a homopolymer typically yields a polymer that is water-soluble or can absorb at least 10 percent by weight water.

A "hydrophobic vinylic monomer", as used herein, refers to a vinylic monomer which as a homopolymer typically yields a polymer that is insoluble in water and can absorb less than 10 percent by weight water.

A "prepolymer" refers to a polymer that contains ethylenically unsaturated groups and can be polymerized actinically or thermally to form a polymer having a molecular weight larger than the starting prepolymer.

A "polymer" means a material formed by polymerizing/crosslinking one or more vinylic monomers, crosslinkers and/or prepolymers.

"Molecular weight" of a polymeric material (including monomeric or macromeric materials), as used herein, refers to the number-average molecular weight unless otherwise specifically noted or unless testing conditions indicate otherwise.

A "crosslinker" refers to a compound having at least two ethylenically-unsaturated groups. A "crosslinking agent" refers to a compound which belongs to a subclass of crosslinkers and comprises at least two ethylenically unsaturated groups and has a molecular weight of 700 Daltons or less.

A "polysiloxane" refers to a compound containing one sole polysiloxane segment.

A "chain-extended polysiloxane" refers to a compound containing at least two polysiloxane segments separated by a linkage.

A "polysiloxane crosslinker" refers to a compound having at least two ethylenically unsaturated groups and one sole polysiloxane segment.

A "chain-extended polysiloxane crosslinker" refers to a linear polysiloxane compound which comprises at least two ethylenically unsaturated groups and at least two polysiloxane segments separated by a linkage.

A "polysiloxane vinylic monomer" refers to a vinylic monomer containing one sole ethylenically unsaturated group and one sole polysiloxane segment.

A "chain-extended polysiloxane vinylic monomer" refers to a compound which comprises one sole ethylenically unsaturated group and at least two polysiloxane segments separated by a linkage.

A "bulkyl vinylic monomer" refers to a vinylic monomer having a bulky substitute group. Preferred bulky vinylic monomers include without limitation N-[tris(trimethylsiloxy)silylpropyl]-(meth)acrylamide; N-[tris(dimethylpropylsiloxy)-silylpropyl](meth)acrylamide; N-[tris(dimethylphenylsiloxy)-silylpropyl](meth)acrylamide; N-[tris(dimethylethylsiloxy)silylpropyl](meth)acrylamide; N-(2-hydroxy-3-(3-(bis(trimethylsilyloxy)methylsilyl)propyloxy)propyl)-2-methyl acrylamide; N-(2-hydroxy-3-(3-(bis(trimethylsilyloxy)methylsilyl)propyloxy)propyl) acrylamide; N,N-bis[2-hydroxy-3-(3-(bis(trimethylsilyloxy)methylsilyl)propyloxy)propyl]-2-methyl acrylamide; N,N-bis[2-hydroxy-3-(3-(bis(trimethylsilyloxy)methylsilyl)propyloxy)propyl]acrylamide; N-(2-hydroxy-3-(3-(tris(trimethylsilyloxy)silyl)propyloxy)propyl)-2-methyl acrylamide; N-(2-hydroxy-3-(3-(tris(trimethylsilyloxy)silyl)propyloxy)propyl)acrylamide; N,N-bis[2-hydroxy-3-(3-(tris(trimethylsilyloxy)silyl)propyloxy)propyl]-2-methyl acrylamide; N,N-bis[2-hydroxy-3-(3-(tris(trimethylsilyloxy)silyl)propyloxy)propyl]acrylamide; N-[2-hydroxy-3-(3-(t-butyldimethylsilyl)-propyloxy)propyl]-2-methyl acrylamide; N-[2-hydroxy-3-(3-(t-butyldimethylsilyl)propyloxy)propyl]acrylamide; N,N-bis[2-hydroxy-3-(3-(t-butyldimethylsilyl)propyloxy)propyl]-2-methyl acrylamide; N,N-bis[2-hydroxy-3-(3-(t-butyldimethylsilyl)propyloxy) propyl]acrylamide; 3-methacryloxy propylpentamethyldisiloxane; tris(trimethylsilyloxy)silylpropyl methacrylate (TRIS); (3-methacryloxy-2-hydroxypropyloxy)propylbis (trimethylsiloxy)methylsilane); (3-methacryloxy-2-hydroxypropyloxy)propyltris(trimethylsiloxy)silane; 3-methacryloxy-2-(2-hydroxyethoxy)-propyloxy)propylbis (trimethylsiloxy)methylsilane; N-2-methacryloxyethyl-O-(methyl-bis-trimethylsiloxy-3-propyl)silyl carbamate; 3-(trimethylsilyl)propylvinyl carbonate; 3-(vinyloxycarbonylthio)propyl-tris(trimethyl-siloxy)silane; 3-[tris(trimethylsiloxy)silyl]propylvinyl carbamate; 3-[tris(trimethylsiloxy) silyl]propyl allyl carbamate; 3-[tris(trimethylsiloxy)silyl] propyl vinyl carbonate; t-butyldimethyl-siloxyethyl vinyl carbonate; trimethylsilylethyl vinyl carbonate; trimethylsilylmethyl vinyl carbonate; t-butyl(meth)acrylate, cyclohexylacrylate, isobornyl methacrylate, a polysiloxane-containing vinylic monomer (having 3 to 8 silicone atoms), and combinations thereof.

The term "fluid" as used herein indicates that a material is capable of flowing like a liquid.

A free radical initiator can be either a photoinitiator or a thermal initiator. A "photoinitiator" refers to a chemical that initiates free radical crosslinking/polymerizing reaction by the use of light. Suitable photoinitiators include, without limitation, benzoin methyl ether, diethoxyacetophenone, a benzoylphosphine oxide, 1-hydroxycyclohexyl phenyl ketone, Darocure® types of photoinitiators, and Irgacure® types of photoinitiators, preferably Darocure® 1173, and Irgacure® 2959. Examples of benzoylphosphine oxide initiators include 2,4,6-trimethylbenzoyldiphenylophosphine oxide (TPO); bis-(2,6-dichlorobenzoyl)-4-N-propylphenylphosphine oxide; and bis-(2,6-dichlorobenzoyl)-4-N-butylphenylphosphine oxide. Reactive photoinitiators which can be incorporated, for example, into a prepolymer or can be used as a special monomer are also suitable. Examples of reactive photoinitiators are those disclosed in EP 632 329, herein incorporated by reference in its entirety. The polymerization can then be triggered off by actinic radiation, for example light, in particular UV light of a suitable wavelength. The spectral requirements can be controlled accordingly, if appropriate, by addition of suitable photosensitizers.

A "thermal initiator" refers to a chemical that initiates radical crosslinking/polymerizing reaction by the use of heat energy. Examples of suitable thermal initiators include, but are not limited to, 2,2'-azobis(2,4-dimethylpentanenitrile), 2,2'-azobis(2-methylpropanenitrile), 2,2'-azobis(2-methylbutanenitrile), peroxides such as benzoyl peroxide, and the like. Preferably, the thermal initiator is 2,2'-azobis(isobutyronitrile) (AIBN).

A "polymerizable UV-absorbing agent" refers to a compound comprising an ethylenically-unsaturated group and a UV-absorbing moiety which can absorb or screen out UV radiation in the range from 200 nm to 400 nm as understood by a person skilled in the art.

A "spatial limitation of actinic radiation" refers to an act or process in which energy radiation in the form of rays is directed by, for example, a mask or screen or combinations thereof, to impinge, in a spatially restricted manner, onto an area having a well defined peripheral boundary, as illustrated in U.S. Pat. Nos. 6,800,225, 6,627,124, 7,384,590 and 7,387, 759 (all of which are incorporated by reference in their entireties).

"Dye" means a substance that is soluble in a lens-forming fluid material and that is used to impart color. Dyes are typically translucent and absorb but do not scatter light.

A "pigment" means a powdered substance (particles) that is suspended in a lens-forming composition in which it is insoluble.

A "hydrophilic surface" in reference to a silicone hydrogel material or a contact lens means that the silicone hydrogel material or the contact lens has a surface hydrophilicity characterized by having an averaged water contact angle of about 90 degrees or less, preferably about 80 degrees or less, more preferably about 70 degrees or less, even more preferably about 60 degrees or less.

An "average water contact angle" refers to a water contact angle (measured by Sessile Drop), which is obtained by averaging measurements of individual contact lenses or samples of a silicone hydrogel material.

The term "post molding surface treatment" refers to a process which is carried out after a contact lens is obtained by cast-molding of a lens formulation in a mold to render the surface of the contact lens more hydrophilic/wettable. For example, a post molding surface treatment can be plasma treatment, chemical treatments, the grafting of hydrophilic monomers or macromers onto the surface of a lens, physical deposition of one or more layer of one or more hydrophilic polymers, crosslinking a hydrophilic coating onto a contact lens, etc.

An "antimicrobial agent", as used herein, refers to a chemical that is capable of decreasing or eliminating or inhibiting the growth of microorganisms such as that term is known in the art. Preferred examples of antimicrobial agent include without limitation silver salts, silver complexes, silver nanoparticles, silver-containing zeolites, and the likes "Silver nanoparticles" refer to particles which are made essentially of silver metal and have a size of less than 1 micrometer.

The term "soluble" in reference to a compound or material means that the compound or material can be dissolved in a solvent to an extent sufficient to form a solution having a concentration of at least about 1% by weight at room temperature (about 22° C. to about 28° C.).

The term "water solubility and/or dispersity" in reference to a compound or material means the concentration (weight percentage) of the compound or material dissolved and/or dispersed in water at room temperature (about 22° C. to about 28° C.) to form a transparent aqueous solution or a slightly hazy aqueous solution having a light transmissibility of 85% or greater in the range between 400 to 700 nm.

The term "water-processable" in reference to a silicone-containing polymerizable material means that the silicone-containing polymerizable component can be dissolved at room temperature (about 22° C. to about 28° C.) in an ophthalmically compatible solvent to form a lens-forming composition (or formulation) having a light transmissibility of 85% or greater in the range between 400 to 700 nm.

The term "ophthalmically compatible solvent" refers to a solvent which may be in intimate contact with the ocular environment for an extended period of time without significantly damaging the ocular environment and without significant user discomfort. "Ocular environment", as used herein, refers to ocular fluids (e.g., tear fluid) and ocular tissue (e.g., the cornea) which may come into intimate contact with a contact lens used for vision correction, drug delivery, wound healing, eye color modification, or other ophthalmic applications. Preferred examples of ophthalmically compatible solvents include without limitation water, 1,2-propylene glycol, a polyethyleneglycol having amolecular weight of about 400 Daltons or less, and combinations thereof.

In accordance with the invention, the term "oxygen permeability" in reference to a contact lens means an estimated intrinsic oxygen permeability $Dk_c$ which is corrected for the surface resistance to oxygen flux caused by the boundary layer effect as measured according to the procedures described in Example 1. The intrinsic "oxygen permeability", Dk, of a material is the rate at which oxygen will pass through a material. Oxygen permeability is conventionally expressed in units of barrers, where "barrer" is defined as [($cm^3$ oxygen)(mm)/($cm^2$)(sec)(mm Hg)]×$10^{-10}$.

The "oxygen transmissibility", Dk/t, of a lens or material is the rate at which oxygen will pass through a specific lens or material with an average thickness of t [in units of mm] over the area being measured. Oxygen transmissibility is conventionally expressed in units of barrers/mm, where "barrers/mm" is defined as [($cm^3$ oxygen)/($cm^2$)(sec)(mm Hg)]×$10^{-9}$.

The "ion permeability" through a lens correlates with the Ionoflux Diffusion Coefficient. The Ionoflux Diffusion Coefficient, D (in units of [$mm^2$/min]), is determined by applying Fick's law as follows:

$$D=-n'/(A \times dc/dx)$$

where n'=rate of ion transport [mol/min]; A=area of lens exposed [$mm^2$]; dc=concentration difference [mol/L]; dx=thickness of lens [mm].

The term "ethylenically functionalize" or ethylenically functionalization" in reference to a compound or polymer or copolymer having one or more reactive functional groups (e.g., amine, hydroxyl, carboxyl, isocyanate, anhydride, aziridine, azlactone, and/or epoxy groups) means a process or product thereof in which one or more ethylenically unsaturated groups are covalently attached to the functional groups of the compound or polymer or copolymer by reacting an ethylenically functionalizing vinylic monomer with the compound or polymer or copolymer under coupling reaction conditions.

An "ethylenically functionalizing vinylic monomer" throughout of this patent application refers to a vinylic monomer having one reactive functional group capable of participating in a coupling (or crosslinking) reaction known to a person skilled in the art. Any vinylic monomer having a hydroxy, amino, carboxyl, epoxy, aziridine, acid-chloride, isocyanate group, which is coreactive with isocyanate, amine, hydroxyl, carboxy, or epoxy groups of a polysiloxane in the absence or presence of a coupling agent (those described above), can be used in ethylenically functionalizing the polysiloxane. Examples of ethylenically-functionalizing vinylic monomers include without limitation $C_2$ to $C_6$ hydroxylalkyl (meth)acrylate, $C_2$ to $C_6$ hydroxyalkyl(meth)acrylamide, allylalcohol, allylamine, amino-$C_2$-$C_6$ alkyl(meth)acrylate, $C_1$-$C_6$ alkylamino-$C_2$-$C_6$ alkyl(meth)acrylate, vinylamine, amino-$C_2$-$C_6$ alkyl(meth)acrylamide, $C_1$-$C_6$ alkylamino-$C_2$-$C_6$ alkyl(meth)acrylamide, acrylic acid, $C_1$-$C_4$ alkylacrylic acid (e.g., methacrylic ethylacrylic acid, propylacrylic acid, butylacrylic acid), N-[tris(hydroxymethyl)-methyl]acrylamide, N,N-2-acrylamidoglycolic acid, beta methyl-acrylic acid (crotonic acid), alpha-phenyl acrylic acid, beta-acryloxy propionic acid, sorbic acid, angelic acid, cinnamic acid, 1-carboxy-4-phenyl butadiene-1,3, itaconic acid, citraconic acid, mesaconic acid, glutaconic acid, aconitic acid, maleic acid, fumaric acid, aziridinyl $C_1$-$C_{12}$ alkyl(meth)acrylate (e.g., 2-(1-aziridinyl)ethyl(meth)acrylate, 3-(1-aziridinyl) propyl(meth)acrylate, 4-(1-aziridinyl)butyl(meth)acrylate, 6-(1-aziridinyl)hexyl(meth)acrylate, or 8-(1-aziridinyl)octyl (meth)acrylate), glycidyl(meth)acrylate, vinyl glycidyl ether, allyl glycidyl ether, (meth)acrylic acid halide groups (—COX, X═Cl, Br, or I), $C_1$ to $C_6$ isocyanatoalkyl(meth) acrylate, azlactone-containing vinylic monomers (e.g., 2-vinyl-4,4-dimethyl-1,3-oxazolin-5-one, 2-isopropenyl-4,4-dimethyl-1,3-oxazolin-5-one, 2-vinyl-4-methyl-4-ethyl-1,3-oxazolin-5-one, 2-isopropenyl-4-methyl-4-butyl-1,3-oxazolin-5-one, 2-vinyl-4,4-dibutyl-1,3-oxazolin-5-one, 2-isopropenyl-4-methyl-4-dodecyl-1,3-oxazolin-5-one, 2-isopropenyl-4,4-diphenyl-1,3-oxazolin-5-one, 2-isopropenyl-4,4-pentamethylene-1,3-oxazolin-5-one, 2-isopropenyl-4,4-tetramethylene-1,3-oxazolin-5-one, 2-vinyl-4,4-diethyl-1,3-oxazolin-5-one, 2-vinyl-4-methyl-4-nonyl-1,3-oxazolin-5-one, 2-isopropenyl-4-methyl-4-phenyl-1,3-oxazolin-5-one, 2-isopropenyl-4-methyl-4-benzyl-1,3-oxazolin-5-one, 2-vinyl-4,4-pentamethylene-1,3-oxazolin-5-one, and 2-vinyl-4,4-dimethyl-1,3-oxazolin-6-one, with 2-vinyl-4,4-dimethyl-1,3-oxazolin-5-one (VDMO) and 2-isopropenyl-4,4-dimethyl-1,3-oxazolin-5-one (IPDMO) as preferred azlactone-containing vinylic monomers), and combinations thereof.

A "coupling reaction" is intended to describe any reaction between a pair of matching functional groups in the presence or absence of a coupling agent to form covalent bonds or linkages under various reaction conditions well known to a person skilled in the art, such as, for example, oxidation-reduction conditions, dehydration condensation conditions, addition conditions, substitution (or displacement) conditions, Diels-Alder reaction conditions, cationic crosslinking conditions, ring-opening conditions, epoxy hardening conditions, and combinations thereof. Non-limiting examples of coupling reactions under various reaction conditions between a pair of matching co-reactive functional groups selected from the group preferably consisting of amino group (—NHR' as defined above), hydroxyl group, carboxylic acid group, acid halide groups (—COX, X═Cl, Br, or I), acid anhydrate group, aldehyde group, azlactone group, isocyanate group, epoxy group, aziridine group, thiol group, and amide groups (—$CONH_2$), are given below for illustrative purposes. A carboxylic acid group reacts with an amino group —NHR' in the presence of a coupling agent—carbodiimide (e.g., 1-ethyl-3-(3-dimethylaminopropyl)carbodiimide (EDC), N,N'-dicyclohexylcarbodiimide (DCC), 1-cyclohexyl-3-(2-morpholinoethyl)carbodiimide, diisopropyl carbodiimide, or mixtures thereof) to form an amide linkage; a carboxylic acid group reacts with an isocyanate group under heating to form an amide linkage; a carboxyl group reacts with an epoxy or aziridine group to form an ester bond; a carboxyl group reacts with a halide group (—Cl, —Br or —I) to form an ester bond; an amino group reacts with aldehyde group to form a Schiff base which may further be reduced; an amino group —NHR' reacts with an acid chloride or bromide group or with an acid anhydride group to form an amide linkage (—CO—NR'—); an amino group —NHR' reacts with an isocyanate group to form a urea linkage (—NR'—C (O)—NH—); an amino group —NHR' reacts with an epoxy or aziridine group to form an amine bond (C—NR'); an amino group reacts (ring-opening) with an azlactone group to form a linkage (—C(O)NH—$CR_1R_2$—($CH_2$)$_r$—C(O)—NR'—); an amino group reacts with a halide group (—Cl, —Br or —I) to form an amine bond; a hydroxyl reacts with an isocyanate to form a urethane linkage; a hydroxyl reacts with an epoxy or aziridine or a halide group (—Cl, —Br or —I) to form an ether linkage (—O—); a hydroxyl reacts with an acid chloride or bromide group or with an acid anhydride group to form an ester linkage; an hydroxyl group reacts with an azlactone group in the presence of a catalyst to form a linkage (—C(O) NH—$CR_1R_2$—($CH_2$)$_r$—C(O)—O—); a thiol group (—SH)

reacts with an isocyanate to form a thiocarbamate linkage (—N—C(O)—S—); a thiol group reacts with an epoxy or aziridine to form a thioether linkage (—S—); a thiol group reacts with an acid chloride or bromide group or with an acid anhydride group to form a thiolester linkage; a thiol group reacts with an azlactone group in the presence of a catalyst to form a linkage (—C(O)NH-alkylene-C(O)—S—); a thiol group reacts with a vinyl group based on thiol-ene reaction under thiol-ene reaction conditions to form a thioether linkage (—S—); a thiol group reacts with an acryloyl or methacryloyl group based on Michael Addition under appropriate reaction conditions to form a thioether linkage; and a 1,2- or 1,3-diol group reacts with an acetalaldehyde dimethylacetal group to form a cyclic acetal linkage.

It is also understood that coupling agents with two reactive functional groups may be used in the coupling reactions. A coupling agent having two reactive functional groups can be a diisocyanate, a di-acid halide, a di-carboxylic acid compound, a di-acid halide compound, a di-azlactone compound, a di-epoxy compound, a diamine, or a diol. A person skilled in the art knows well to select a coupling reaction (e.g., anyone described above in this application) and conditions thereof to prepare a polysiloxane terminated with one or more ethylenically unsaturated groups. For example, a diisocyanate, di-acid halide, di-carboxylic acid, di-azlactone, or di-epoxy compound can be used in the coupling of two hydroxyl, two amino groups, two carboxyl groups, two epoxy groups, or combination thereof; a diamine or dihydroxyl compound can be used in the coupling of two isocyanate, epoxy, aziridine, carboxylic acid, acid halide or azlactone groups or combinations thereof.

Any suitable $C_4$-$C_{24}$ diisocyanates can be used in the invention. Examples of preferred diisocyanates include without limitation isophorone diisocyanate, tetramethylene diisocyanate, hexamethyl-1,6-diisocyanate, 4,4'-dicyclohexylmethane diisocyanate, toluene diisocyanate, 4,4'-diphenyl diisocyanate, 4,4'-diphenylmethane diisocyanate, p-phenylene diisocyanate, 1,4-phenylene 4,4'-diphenyl diisocyanate, 1,3-bis-(4,4'-isocyanto methyl)cyclohexane, cyclohexane diisocyanate, and combinations thereof.

Any suitable diamines can be used in the invention. An organic diamine can be a linear or branched $C_2$-$C_{24}$ aliphatic diamine, a $C_5$-$C_{24}$ cycloaliphatic or aliphatic-cycloaliphatic diamine, or a $C_6$-$C_{24}$ aromatic or alkyl-aromatic diamine. A preferred organic diamine is N,N'-bis(hydroxyethyl)ethylenediamine, N,N'-dimethylethylenediamine, ethylenediamine, N,N'-dimethyl-1,3-propanediamine, N,N'-diethyl-1,3-propanediamine, propane-1,3-diamine, butane-1,4-diamine, pentane-1,5-diamine, hexamethylenediamine, and isophorone diamine.

Any suitable diacid halides can be used in the invention. Examples of preferred diacid halide include without limitations fumaroyl chloride, suberoyl chloride, succinyl chloride, phthaloyl chloride, isophthaloyl chloride, terephthaloyl chloride, sebacoyl chloride, adipoyl chloride, trimethyladipoyl chloride, azelaoyl chloride, dodecanedioic acid chloride, succinic chloride, glutaric chloride, oxalyl chloride, dimer acid chloride, and combinations thereof.

Any suitable di-epoxy compounds can be used in the invention. Examples of preferred di-epoxy compounds are neopentyl glycol diglycidyl ether, 1,4-butanediol diglycidyl ether, 1,6-hexanediol diglycidyl ether, glycerol diglycidyl ether, ethylene glycol diglycidyl ether, diethylene glycol diglycidyl ether, polyethylene glycol diglycidyl ether, propylene glycol diglycidyl ether, dipropylene glycol diglycidyl ether, and combinations thereof. Such di-epoxy compounds are available commercially (e.g., those DENACOL series di-epoxy compounds from Nagase ChemteX Corporation).

Any suitable $C_2$-$C_{24}$ diols (i.e., compounds with two hydroxyl groups) can be used in the invention. Examples of preferred diols include without limitation ethylene glycol, diethylene glycol, triethylene glycol, tetraethylene glycol, polyethylene glycol, propylene glycol, 1,4-butanediol, various pentanediols, various hexanediols, various cyclohexanediols, and combination thereof.

Any suitable $C_3$-$C_{24}$ di-carboxylic acid compounds can be used in the invention. Examples of preferred di-carboxylic acid compounds include without limitation a linear or branched $C_3$-$C_{24}$ aliphatic dicarboxylic acid, a $C_5$-$C_{24}$ cycloaliphatic or aliphatic-cycloaliphatic dicarboxylic acid, a $C_6$-$C_{24}$ aromatic or aralphatic dicarboxylic acid, a dicarboxylic acid which contains amino or imido groups or N-heterocyclic rings, and combinations thereof. Examples of suitable aliphatic dicarboxylic acids are: oxalic acid, malonic acid, succinic acid, glutaric acid, adipic acid, pimelic acid, suberic acid, azelaic acid, sebacic acid, undecanedioic acid, dodecanedioic acid, dimethylmalonic acid, octadecylsuccinic acid, trimethyladipic acid, and dimeric acids (dimerisation products of unsaturated aliphatic carboxylic acids, such as oleic acid). Examples of suitable cycloaliphatic dicarboxylic acids are: 1,3-cyclobutanedicarboxylic acid, 1,3-cyclopentanedicarboxylic acid, 1,3- and 1,4-cyclohexanedicarboxylic acid, 1,3- and 1,4-dicarboxylmethylcyclohexane, 4,4'-dicyclohexyldicarboxylic acid. Examples of suitable aromatic dicarboxylic acids are: terephthalic acid, isophthalic acid, o-phthalic acid, 1,3-, 1,4-, 2,6- or 2,7-naphthalenedicarboxylic acids, 4,4'-diphenyldicarboxylic acid, 4,4'-diphenylsulphone-dicarboxylic acid, 1,1,3-trimethyl-5-carboxyl-3-(p-carboxyphenyl)-indane, 4,4'-diphenyl ether-dicarboxylic acid, bis-p-(carboxylphenyl)-methane.

Any suitable $C_{10}$-$C_{24}$ di-azlactone compounds can be used in the invention. Examples of such diazlactone compounds are those described in U.S. Pat. No. 4,485,236 (herein incorporated by reference in its entirety).

The reactions conditions for the above described coupling reactions are taught in textbooks and are well known to a person skilled in the art.

In general, the invention is directed to a class of actinically-polymerizable silicone-containing prepolymers which have a relatively high water solubility and/or dispersity and suitable for making silicone hydrogel contact lenses having a water content of from about 20% to about 75% by weight when fully hydrated, an oxygen permeability (Dk) of at least about 40 barrers, and optionally (but preferably) a hydrophilic surface characterized by an average water contact angle of about 90 degrees or less.

There are several potential unique features associated with use of prepolymers of the invention in making silicone hydrogel contact lens. First, a prepolymer of the invention can be used in preparing a silicone hydrogel lens formulation by dissolving or dispersing it in an ophthalmically compatible solvent (e.g., water, 1,2-propylene glycol, a polyethyleneglycol having a molecular weight of about 400 Daltons or less, or a combination thereof).

Second, extractions of resultants silicone hydrogel contact lenses from a lens formulation comprising a prepolymer of the invention as silicone-containing polymerizable components can be carried out with the ophthalmically compatible solvent if needed. Generally, extraction of non-volatile residuals from lenses made from polymerizable components in a lens formulation is required to remove unpolymerized ingredients in the lens formulation. For silicone hydrogel lenses, the non-volatile extractables are usually performed using organic solvent due to the solubility of silicone containing extractables which are not fully soluble in aqueous solution. But, by using a prepolymer of the invention as silicone-containing polymerizable materials in a lens formulation, water or other ophthalmically compatible solvents can be used as a solvent in the extraction process.

Third, if a lens formulation comprising a prepolymer of the invention as silicone-containing polymerizable components is used in cast molding of silicone hydrogel contact lenses and if reusable molds are used in the lens production based on the Lightstream Technology™, then the reusable molds can be washed with water or other ophthalmically compatible solvent between consecutive molding cycles to remove silicone-containing polymerizable materials of a lens formulation left behind on the mold surface. Use of water can save the production cost and is environmentally friendly.

Fourth, a prepolymer can be used to produce silicone hydrogel contact lenses having a hydrophilic surface without any post molding surface treatment. It is known that a silicone hydrogel material typically has a surface or at least some areas of its surface, which is hydrophobic (non-wettable). Hydrophobic surface or surface areas will up-take lipids or proteins from the ocular environment and may adhere to the eye. Thus, a silicone hydrogel contact lens will generally require a surface modification which is typically carried out after cast-molding of the lens. It is discovered that by having a balanced composition of the silicone content and the content of the hydrophilic groups and hydrophilic polymer chains a prepolymer of the invention may have a relatively high water solubility and/or dispersity while providing a silicone hydrogel contact lens made therefrom with a relatively high oxygen permeability, a relatively high water content and a hydrophilic surface without post molding surface treatment. It is believed that when silicone portions of the polymer matrix of a silicone hydrogel made from a lens formulation containing a prepolymer of the invention migrate to the lens surface, the pendant and terminal hydrophilic polymeric chains linked directly to silicone through a short linkage may migrate to the lens surface and dangle out of the lens surface to form a hydrophilic surface. Without post molding surface treatment, the lens production process can be simplified and may be relatively more cost effective.

The present invention, in one aspect, provides a water soluble or processable siloxane-containing prepolymer, which comprises: (1) siloxane-containing monomeric units and/or polysiloxane-containing crosslinking units, wherein the siloxane-containing monomeric units are derived from one or more siloxane-containing vinylic monomers each having at least one hydrophilic moiety selected from the group consisting of a hydrophilic polymeric chain with a molecular weight of up to about 10,000 Daltons (preferably about 7500 Dalton or less, more preferably about 5000 Daltons or less), a hydroxyl group, an amide linkage, a urethane linkage (or carbamate linkage), a diurethane linkage, an oligo-ethyleneoxide linkage (i.e., composed about 2 to about 12 ethyleneoxide units), a 2-hydroxy-substituted propyleneoxide linkage, and combinations thereof, wherein the polysiloxane-containing crosslinking units are derived from at least one hydrophilized polysiloxane crosslinker and/or chain-extended hydrophilized polysiloxane crosslinker each having one or more pendant hydrophilic polymer chains; (2) hydrophilic monomeric units derived from one or more hydrophilic vinylic monomers; (3) from about 0.05% to about 5%, preferably from about 0.1% to about 4%, more preferably from about 0.5 to about 3% by weight of polymerizable units each having a pendant or terminal, ethylenically-unsaturated group and free of any polysiloxane segment; and (4) optionally hydrophobic units derived from at least one hydrophobic vinylic monomer free of silicone, wherein the prepolymer comprises from about 20% to about 50%, preferably from about 25% to about 45%, more preferably from 28% to about 40%, by weight of silicone relative to the total weight of the prepolymer and has a high water solubility or dispersibility of at least about 5%, preferably at least about 10%, more preferably at least about 20% by weight in water, wherein the prepolymer is capable of being actinically crosslinked, in the absence of one or more vinylic monomers, to form a silicone hydrogel contact lens having a water content of from about 20% to about 75% (preferably from about 25% to about 70%, more preferably from about 30% to about 65%) by weight when fully hydrated, an oxygen permeability (Dk) of at least about 40 barrers (preferably at least about 50 barrers, more preferably at least about 60 barrers, and even more preferably at least about 70 barrers), and optionally (but preferably) a hydrophilic surface characterized by an average water contact angle of about 90 degrees or less (preferably about 80 degrees or less, more preferably 70 degrees or less, even more preferably about 60 degrees or less) without post-molding surface treatment.

The term "hydrophilic polymer chain" as used in this patent application refers to a pendant and/or terminal polymer chain unless otherwise specifically noted, which can be a linear or 3-arm (or Y-shape) hydrophilic polymer chain that comprises at least about 60%, preferably at least about 70%, more preferably at least about 80%, even more preferably at least about 90%) by weight of one or more hydrophilic monomeric units selected from the group consisting of ethyleneoxides ($-CH_2CH_2O-$), (meth)acrylamide units, $C_1$-$C_3$ alkyl (meth)acrylamide units, di-($C_1$-$C_3$ alkyl)(meth)acrylamide units, N-vinylpyrrole units, N-vinyl-2-pyrrolidone units, 2-vinyloxazoline units, 4-vinylpyridine units, mono-$C_1$-$C_4$ alkoxy, mono-(meth)acryloyl terminated polyethyleneglycol units having a molecular weight of 2000 Daltons or less, di($C_1$-$C_3$ alkyl amino)($C_2$-$C_4$ alkyl)(meth)acrylate units, N—$C_1$-$C_4$ alkyl-3-methylene-2-pyrrolidone units, N—$C_1$-$C_4$ alkyl-5-methylene-2-pyrrolidone units, N-vinyl $C_1$-$C_6$ alkylamide units, N-vinyl-N—$C_1$-$C_6$ alkyl amide units, and combinations thereof. Preferably, the linear or 3-arm (or Y-shape) hydrophilic polymer chain comprises bulky vinylic monomeric units (any one of those described above)

Such prepolymer can be obtained by first polymerizing a polymerizable composition including (a) at least one siloxane-containing vinylic monomer having at least one hydrophilic moiety as described above) and/or at least one hydrophilized polysiloxane and/or chain extended polysiloxane crosslinker having one or more pendant hydrophilic polymer chains, (b) at least one hydrophilic vinylic monomer, (c) an ethylenically functionalizing vinylic monomer having a first reactive functional group (other than ethylenically unsaturated group), (d) a chain transfer agent with or without a second reactive functional group (other than thiol group), and (e) optionally a hydrophobic vinylic monomer, to form a water-processable intermediary copolymer and then by ethylenically functionalizing the intermediary copolymer with an ethylenically functionalizing vinylic monomer having a third reactive functional group capable of reacting with the first and/or second reactive functional group to form a linkage in a coupling reaction in the presence or absence of a coupling agent to form the prepolymer, wherein the first, second and third reactive functional groups independent of one another are selected from the group consisting of amino group, hydroxyl group, carboxyl group, acid halide group, azlactone group, isocyanate group, epoxy group, aziridine group, and combination thereof. The general procedures for preparing amphiphilic prepolymers are disclosed in commonly-owned U.S. Pat. Nos. 6,039,913, 6,043,328, 7,091,283, 7,268,189 and 7,238,750, 7,521,519; commonly-owned US patent application publication Nos. US 2008-0015315 A1, US 2008-0143958 A1, US 2008-0143003 A1, US 2008-0234457 A1, US 2008-0231798 A1, and commonly-owned U.S. patent application Ser. Nos. 12/313,546, 12/616,166 and 12/616,169; all of which are incorporated herein by references in their entireties.

In accordance with the invention, any siloxane-containing vinylic monomers can be used in the preparation of a water-processable prepolymer of the invention so long as they have at least one hydrophilic moiety selected from the group consisting of a hydrophilic polymer chain with a molecular weight of up to about 10,000 Daltons or less (preferably about 7500 daltons or less, more preferably about 5000 daltons or less, even more preferably about 2500 Daltons or less, most preferably about 1000 Daltons or less), a hydroxyl group, an amide linkage, a urethane linkage (or carbamate linkage), a diurethane linkage, an oligo-ethyleneoxide linkage (i.e., composed about 2 to 12 ethyleneoxide units), a 2-hydroxy-substituted propyleneoxide linkage, and combinations thereof. Preferably, a siloxane-containing vinylic monomer is represented by formula (1), (2), or (3)

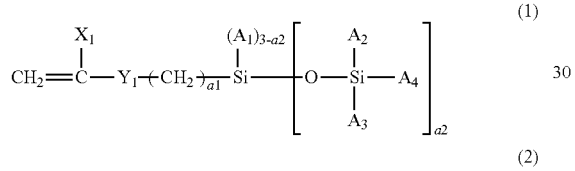

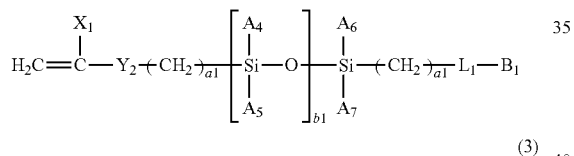

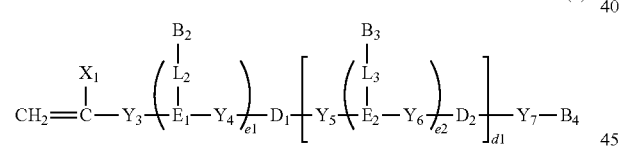

in which
  a1 is an integer from 1 to 5;
  a2 is an integer of 1, 2 or 3;
  b1 is an integer from 1 to 10;
  d1 is an integer from 0 to 4;
  e1 and e2 independent of each other are 0, 1, 2 or 3;
  $A_1$, $A_2$, $A_3$, $A_4$, $A_5$, $A_6$, and $A_7$ independent of one another are methyl or ethyl;
  $X_1$ is hydrogen or methyl;
  $Y_1$ is a radical of -$M_1$-$X_2$-$M_2$-$X_3$-$M_3$-$X_4$-$M_4$- in which $M_1$, $M_2$, $M_3$ and $M_4$ independent of one another are a direct bond, —$CH_2$—, —$C_2H_4$—, —$C_3H_6$—, —$CH_2$—CH(OH)—$CH_2$—, or —$(C_2H_4$—O—$)_{a3}$- in which a3 is an integer from 2 to 12, $X_2$, $X_3$, and $X_4$ independent of one other are a linkage selected from the group consisting of a direct bond, —O—, —NR'— in which R' is H or $C_1$-$C_4$ alkyl, —C(O)—NH—, —NH—C(O)—, —NH—C(O)—NH—, —O—C(O)—NH—, —S—, —NH—C(O)—O—, —C(O)—O—, —O—C(O)—, —NH—C(O)—NH—$Z_0$—NH—C(O)—NH—, —O—C(O)—NH—$Z_0$—NH—C(O)—O—, —O—C(O)—NH—$Z_0$—NH—C(O)—NH—, and —NH—C(O)—NH—$Z_0$—NH—C(O)—O—, in which $Z_0$ is a linear or branched $C_2$-$C_{12}$ alkylene divalent radical or a $C_5$-$C_{45}$ cycloaliphatic or aliphatic-cycloaliphatic divalent radical optionally containing therein one or more linkages of —O—, —NR'—, —S— and —C(O)—;

$D_1$ and $D_2$ independently of each other are a divalent group of formula (4)

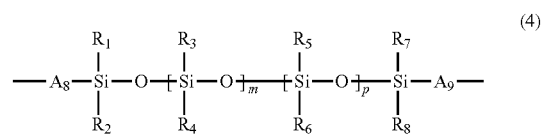

in which $A_8$ and $A_9$ independent of each other are a direct bond, a linear or branched $C_1$-$C_{10}$ alkylene divalent radical, —$(CH_2CH_2O)_{r1}$—$CH_2CH_2$— in which r1 is an integer of 1 to 20, or a $C_1$-$C_7$ alkyleneoxy-$C_1$-$C_7$ alkylene divalent radical, and $R_1$, $R_2$, $R_3$, $R_4$, $R_5$, $R_6$, $R_7$, and $R_8$, independently of one another, are $C_1$-$C_4$-alkyl, -alk-$(OCH_2CH_2)_{r2}$—$OR_9$ in which alk is $C_1$-$C_6$-alkylene divalent radical, $R_9$ is $C_1$-$C_4$ alkyl and r2 is an integer from 1 to 20, m and p independently of each other are an integer of from 0 to 150 and (m+p) is from 2 to 150;

$L_1$, $L_2$, $L_3$, $Y_2$, $Y_3$, $Y_4$, $Y_5$, $Y_6$, and $Y_7$ independent of one another are a direct bond or a divalent radical of —$Z_1$—$X_2$—$Z_2$—$X_3$—$Z_3$—$X_4$—$Z_4$— In which $X_2$, $X_3$, and $X_4$ are as defined, $Z_1$, $Z_2$, $Z_3$, and $Z_4$ independent of one other are is a direct bond, a linear or branched $C_1$-$C_{12}$ alkylene divalent radical optionally containing therein one or more linkages of —O—, —NR'—, —S— and —C(O)—, a divalent radical of —$CH_2$—CH(OH)—$CH_2$— or —$(CH_2CH_2O)_{r1}$—$CH_2CH_2$— with r1 as defined above, or a $C_5$-$C_{45}$ cycloaliphatic or aliphatic-cycloaliphatic divalent radical optionally containing therein one or more linkages of —O—, —NR'—, —S— and —C(O)—;

$B_1$, $B_2$, $B_3$ and $B_4$ independent of one another are hydroxyl or (preferably) a linear or 3-arm hydrophilic polymer chain having a molecular weight of about 10,000 Daltons or less (preferably about 7500 daltons or less, more preferably about 5000 daltons or less, even more preferably about 2500 Daltons or less, most preferably about 1000 Daltons or less) and comprising at least about 60%, preferably at least about 70%, more preferably at least about 80%, even more preferably at least about 90%) by weight of one or more hydrophilic monomeric units selected from the group consisting of ethyleneoxide units, (meth)acrylamide units, $C_1$-$C_3$ alkyl(meth)acrylamide units, di-($C_1$-$C_3$ alkyl)(meth)acrylamide units, N-vinylpyrrole units, N-vinyl-2-pyrrolidone units, 2-vinyloxazoline units, 4-vinylpyridine units, mono-$C_1$-$C_4$ alkoxy, mono-(meth)acryloyl terminated polyethyleneglycol units having a molecular weight of 600 Daltons or less, di($C_1$-$C_3$ alkyl amino)($C_2$-$C_4$ alkyl)(meth)acrylate units, N—$C_1$-$C_4$ alkyl-3-methylene-2-pyrrolidone units, N—$C_1$-$C_4$ alkyl-5-methylene-2-pyrrolidone units, N-vinyl $C_1$-$C_6$ alkylamide units, N-vinyl-N—$C_1$-$C_6$ alkyl amide units, and combinations thereof, provided that at least one of $B_2$, $B_3$ and $B_4$ is the linear or 3-arm hydrophilic polymer chain; and $E_1$ and $E_2$ independent of each another are an aliphatic or cycloaliphatic or aliphatic-cycloaliphatic trivalent radical which has up to 15 carbon atoms and can be interrupted by —O—, —NR'—, —C(O)— and/or —S—.

Exemplary siloxane-containing vinylic monomers of formula (1) are those described in U.S. Pat. Nos. 4,711,943, 5,070,215, 5,998,498, 7,071,274, 7,112,641 (herein incorporated by reference in their entireties). The preparation of such monomers is described in those patents. Preferred siloxane-containing vinylic monomers of formula (1) include without limitation N-[methylbis(trimethylsiloxy)silyl]propyl acrylamide, N-[methylbis(trimethylsiloxy)silyl]propyl methacrylamide, N-[tris(trimethylsiloxy)silyl]propyl acrylamide, N-[tris(trimethylsiloxy)-silyl]propyl methacrylamide, methyl bis(trimethylsiloxy)silyl]propyl glycerol methacrylate (SiGMA), methyl bis(trimethylsiloxy)-silylpropylglycerol acrylate, tris(trimethylsiloxy)silyl propyl glycerol methacrylate, tris(trimethylsiloxy)silylpropyl glycerol acrylate, 3-[methyl-bis(trimethylsiloxy)silyl]propyl allyl carbamate, 3-[methylbis(trimethylsiloxy)silyl]propyl vinyl carbamate, 3-[tris(trimethylsiloxy)silyl]propyl allyl carbamate, 3-[tris(trimethylsiloxy)silyl]propyl vinyl carbamate, or combinations thereof.

Exemplary siloxane-containing vinylic monomers of formula (2) and (3) are those described in PCT patent application publication WO0059970, U.S. Pat. Nos. 5,981,615 and 5,760,100 (Macromer C), U.S. patent application Nos. 61/390,448, and 61/390,464, and published US patent application Nos. US 2008/0234457 A1, US 2009/0143499 A1, US 2010/0120938 A1, US 2010/0120939 A1, and US 2010/0298446 A1 (herein incorporated by reference in their entireties). The methods for preparing such siloxane-containing vinylic monomers are taught in those patent application publications and US patents above. Examples of preferred siloxane-containing vinylic monomers of formula (2) and (3) include without limitation

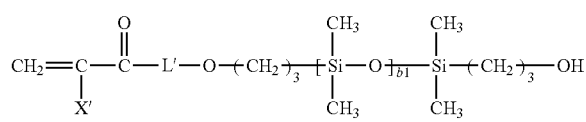

(5)

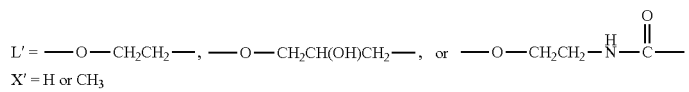

L' = —O—$CH_2CH_2$—, —O—$CH_2CH(OH)CH_2$—, or —O—$CH_2CH_2$—NH—C(O)—

X' = H or $CH_3$

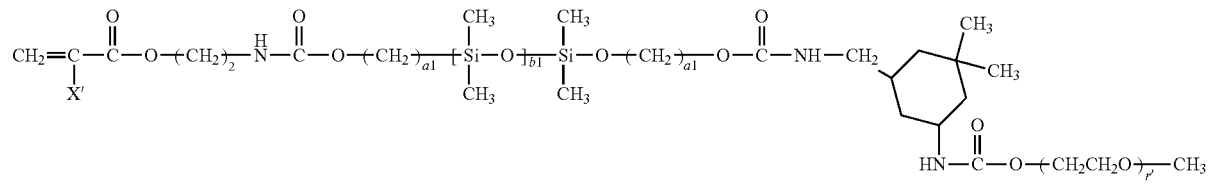

(6)

a1 = 1 to 5
b1 = 2 to 10
r2 = 3 to 20
X' = H or $CH_3$

In accordance with the invention, any hydrophilized polysiloxane or chain-extended polysiloxane crosslinkers can be used in the preparation of a water-processable prepolymer of the invention so long as they comprise at least one pendant hydrophilic polymer chain. Preferably, the polysiloxane-containing crosslinking units in a prepolymer of the invention are derived from at least one hydrophilized polysiloxane crosslinker and/or chain-extended hydrophilized polysiloxane crosslinker of formula (7) or (8)

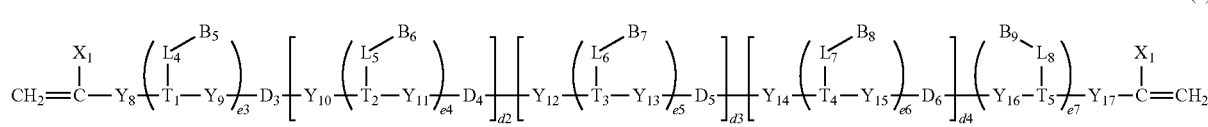

(7)

(8)

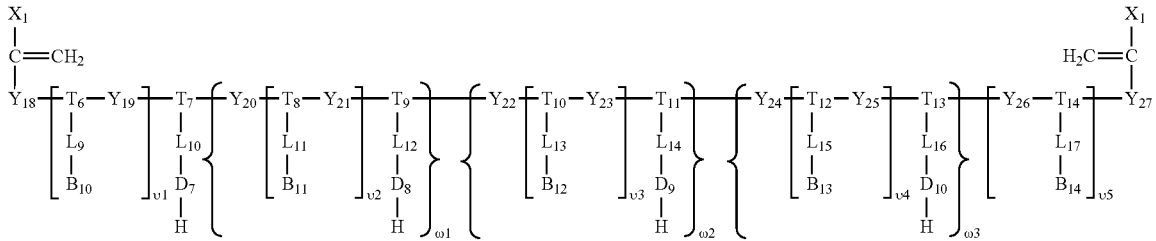

in which
- d2, d3, d4, ω1, ω2, and ω3 independent of one another are an integer from 0 to 20;
- e3, e4, e5, e6, e7, v1, v2, v3, v4, and v5 independent of one other are 0, 1, 2 or 3 and (e3+e4+e5+e6+e7)≥1 and (v1+v2+v3+v4+v5)≥1;
- $X_1$ is hydrogen or methyl;
- $D_3$, $D_4$, $D_5$, $D_6$, $D_7$, $D_8$, $D_9$, and $D_{10}$ independently of one other are a divalent group of formula (9)

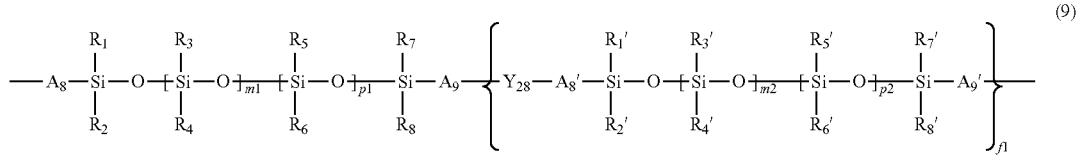

in which $Y_{28}$ is as defined below, $A_8$, $A_8'$, $A_9$, and $A_9'$ independent of one other are a direct bond, a linear or branched $C_1$-$C_{10}$ alkylene divalent radical, —(CH$_2$CH$_2$O)$_{r1}$—CH$_2$CH$_2$— in which r1 is an integer of 1 to 20, or a $C_1$-$C_7$ alkyleneoxy-$C_1$-$C_7$ alkylene divalent radical, and $R_1$, $R_2$, $R_3$, $R_4$, $R_5$, $R_6$, $R_7$, $R_8$, $R_1'$, $R_2'$, $R_3'$, $R_4'$, $R_5'$, $R_6'$, $R_7'$, and $R_8'$ independently of one another, are $C_1$-$C_4$-alkyl, -alk-(OCH$_2$CH$_2$)$_{r2}$—OR$_9$ in which alk is $C_1$-$C_6$-alkylene divalent radical, $R_9$ is $C_1$-$C_4$ alkyl and r2 is an integer from 1 to 20, f1 is an integer of 0 to 8, m1, m2, p1 and p2 independently of each other are an integer of from 0 to 150, (m1+p1) and (m2+p2) independent of each other are from 2 to 150;

$L_4$, $L_5$, $L_6$, $L_7$, $L_8$, $L_9$, $L_{10}$, $L_{11}$, $L_{12}$, $L_{13}$, $L_{14}$, $L_{15}$, $L_{16}$, $L_{17}$, $Y_8$, $Y_9$, $Y_{10}$, $Y_{11}$, $Y_{12}$, $Y_{13}$, $Y_{14}$, $Y_{15}$, $Y_{16}$, $Y_{17}$, $Y_{18}$, $Y_{19}$, $Y_{20}$, $Y_{21}$, $Y_{22}$, $Y_{23}$, $Y_{24}$, $Y_{25}$, $Y_{26}$, $Y_{27}$, and $Y_{28}$ independent of one another are a direct bond or a divalent radical of —$Z_1$—$X_2$—$Z_2$—$X_3$—$Z_3$—$X_4$—$Z_4$— In which $X_2$, $X_3$ and $X_4$ independent of one other are a linkage selected from the group consisting of a direct bond, —O—, —NR'— in which R' is H or $C_1$-$C_4$ alkyl, —C(O)—NH—, —NH—C(O)—, —NH—C(O)—NH—, —O—C(O)—NH—, —S—, —NH—C(O)—O—, —C(O)—O—, —O—C(O)—, —NH—C(O)—NH—$Z_0$—NH—C(O)—NH—, —O—C(O)—NH—$Z_0$—NH—C(O)—O—, —O—C(O)—NH—$Z_0$—NH—C(O)—NH—, and —NH—C(O)—NH—$Z_0$—NH—C(O)—O—, $Z_0$ is a linear or branched $C_2$-$C_{12}$ alkylene divalent radical or a $C_5$-$C_{45}$ cycloaliphatic or aliphatic-cycloaliphatic divalent radical optionally containing therein one or more linkages of —O—, —NR'—, —S— and —C(O)—, $Z_1$, $Z_2$, $Z_3$ and $Z_4$ independent of one other are is a direct bond, a linear or branched $C_1$-$C_{12}$ alkylene divalent radical optionally containing therein one or more linkages of —O—, —NR'—, —S— and —C(O)—, a divalent radical of —CH$_2$—CH(OH)—CH$_2$— or —(CH$_2$CH$_2$O)$_{r1}$—CH$_2$CH$_2$— with r1 as defined above, or a $C_5$-$C_{45}$ cycloaliphatic or aliphatic-cycloaliphatic divalent radical optionally containing therein one or more linkages of —O—, —NR'—, —S— and —C(O)—;

$B_5$, $B_6$, $B_7$, $B_8$, $B_9$, $B_{10}$, $B_{11}$, $B_{12}$, $B_{13}$, and $B_{14}$ independent of one another are hydroxyl or (preferably) a linear or 3-arm hydrophilic polymer chain having a molecular weight of about 10000 Daltons or less (preferably about 7500 daltons or less, more preferably about 5000 daltons or less, even more preferably about 2500 Daltons or less, most preferably about 1000 Daltons or less) and comprising at least about 60%, preferably at least about 70%, more preferably at least about 80%, even more preferably at least about 90%) by weight of one or more hydrophilic monomeric units selected from the group consisting of ethyleneoxide units, (meth)acrylamide units, $C_1$-$C_3$ alkyl(meth)acrylamide units, di-($C_1$-$C_3$ alkyl)(meth)acrylamide units, N-vinylpyrrole units, N-vinyl-2-pyrrolidone units, 2-vinyloxazoline units, 4-vinylpyridine units, mono-$C_1$-$C_4$ alkoxy, mono-(meth)acryloyl terminated polyethyleneglycol units having a molecular weight of 600 Daltons or less, di($C_1$-$C_3$ alkyl amino)($C_2$-$C_4$ alkyl)(meth)acrylate units, N—$C_1$-$C_4$ alkyl-3-methylene-2-pyrrolidone units, N—$C_1$-$C_4$ alkyl-5-methylene-2-pyrrolidone units, N-vinyl $C_1$-$C_6$ alkylamide units, N-vinyl-N—$C_1$-$C_6$ alkyl amide units, and combinations thereof, provided that at least one of $B_5$, $B_6$, $B_7$, $B_8$, and $B_9$ and at least one of $B_{10}$, $B_{11}$, $B_{12}$, $B_{13}$, and $B_{14}$ are the linear or 3-arm hydrophilic polymer chain;

$T_1$, $T_2$, $T_3$, $T_4$, $T_5$, $T_6$, $T_7$, $T_8$, $T_9$, $T_{10}$, $T_{11}$, $T_{12}$, $T_{13}$, and $T_{14}$ independent of one another are an aliphatic or cycloaliphatic or aliphatic-cycloaliphatic trivalent radical which has up to 15 carbon atoms and can be interrupted by —O—, —NR'—, —C(O)— and/or —S—.

In accordance with the invention, a hydrophilized polysiloxane crosslinker of formula (7) can be obtained from a hydroxy-containing polysiloxane crosslinker (i.e., having one sole polysiloxane segment and two ethylenically unsaturated groups) by covalently attaching one or more polyethyleneoxides or hydrophilic polymers of one or more hydrophilic vinylic monomers selected from the group consisting of (meth)acrylamide units, $C_1$-$C_3$ alkyl(meth)acrylamide units, di-($C_1$-$C_3$ alkyl)(meth)acrylamide units, N-vinylpyrrole units, N-vinyl-2-pyrrolidone units, 2-vinyloxazoline units, 4-vinylpyridine units, mono-$C_1$-$C_4$ alkoxy, mono-(meth)acryloyl terminated polyethyleneglycol units having a molecular weight of 600 Daltons or less, di($C_1$-$C_3$ alkyl amino)($C_2$-$C_4$ alkyl)(meth)acrylate units, N—$C_1$-$C_4$ alkyl-3-methylene-2-pyrrolidone units, N—$C_1$-$C_4$ alkyl-5-methylene-2-pyrrolidone units, N-vinyl $C_1$-$C_6$ alkylamide units, N-vinyl-N—$C_1$-$C_6$ alkyl amide units, and combinations thereof, preferably selected from the group consisting of N-vinylpyrrolidone, N,N-dimethyl(meth)acrylamide, (meth) acrylamide, N-vinyl formamide, N-vinyl acetamide, N-vinyl isopropylamide, N-vinyl-N-methyl acetamide, and combinations thereof, each of polyethyleneoxide or hydrophilic polymer containing one sole reactive functional group capable of participating in a coupling reaction to form a covalent linkage, according to commonly known coupling reactions.

A hydroxyl-containing polysiloxane crosslinker having one sole polysiloxane segment can be obtained by ethylenically-functionalizing of:

(1) a di-epoxy-terminated polysiloxane by using an ethylenically-functionalizing vinylic monomer selected from the group consisting of $C_2$ to $C_6$ hydroxylalkyl(meth)acrylate, $C_2$ to $C_6$ hydroxyalkyl(meth)acrylamide, allyl alcohol, N—$C_1$-$C_6$ alkylamino-$C_2$-$C_6$ alkyl(meth)acrylate, N—$C_1$-$C_6$ alkylamino-$C_2$-$C_6$ alkyl(meth)acrylamide, acrylic acid, $C_1$-$C_4$ alkylacrylic acid, beta methyl-acrylic acid (crotonic acid), alpha-phenyl acrylic acid, beta-acryloxy propionic acid, sorbic acid, angelic acid, cinnamic acid, 1-carboxy-4-phenyl butadiene-1,3, itaconic acid, citraconic acid, mesaconic acid, glutaconic acid, aconitic acid, maleic acid, fumaric acid, and combination thereof;

(2) a di-hydroxyl-terminated, a di-N-alkylaminoalkyl-terminated, or a di-carboxyl-terminated polysiloxane by using epoxy-containing vinylic monomer (e.g., glycidyl(meth) acrylate, allyl glycidyl ether, vinyl glycidyl ether, or a combination thereof);

(3) a di-hydroxyl-terminated, a di-N-alkylaminoalkyl-terminated, or a di-carboxyl-terminated polysiloxane by using an ethylenically-functionalizing vinylic monomer selected from the group consisting of $C_2$ to $C_6$ hydroxylalkyl(meth) acrylate, $C_2$ to $C_6$ hydroxyalkyl(meth)acrylamide, allylalcohol, N—$C_1$-$C_6$ alkylamino-$C_2$-$C_6$ alkyl(meth)acrylate, N—$C_1$-$C_6$ alkylamino-$C_2$-$C_6$ alkyl(meth)acrylamide, acrylic acid, $C_1$-$C_4$ alkylacrylic acid, beta methyl-acrylic acid (crotonic acid), alpha-phenyl acrylic acid, beta-acryloxy propionic acid, sorbic acid, angelic acid, cinnamic acid, 1-carboxy-4-phenyl butadiene-1,3, itaconic acid, citraconic acid, mesaconic acid, glutaconic acid, aconitic acid, maleic acid, fumaric acid, and combination thereof, in the presence of a di-epoxy compound (e.g., neopentyl glycol diglycidyl ether, 1,4-butanediol diglycidyl ether, 1,6-hexanediol diglycidyl ether, glycerol diglycidyl ether, ethylene glycol diglycidyl ether, diethylene glycol diglycidyl ether, polyethylene glycol diglycidyl ether, propylene glycol diglycidyl ether, dipropylene glycol diglycidyl ether, and combinations thereof) as a coupling agent;

(4) a di-epoxy-terminated polysiloxane by using glycidyl (meth)acrylate or allyl glycidyl ether or vinyl glycidyl ether in the presence of a diol (e.g., hydroxy-terminated polyethyleneoxide (HO-PEO-OH), hydroxy-terminated polypropyleneoxide (HO—PPO—OH), hydroxy-terminated PEO/PPO block copolymer, ethylene glycol, diethylene glycol, triethylene glycol, tetraethylene glycol, polyethylene glycol, propylene glycol, 1,4-butanediol, various pentanediols, various hexanediols, various cyclohexanediols, and combination thereof) or di-carboxylic acid compound (e.g., oxalic acid, malonic acid, succinic acid, glutaric acid, adipic acid, pimelic acid, suberic acid, azelaic acid, sebacic acid, undecanedioic acid, dodecanedioic acid, dimethylmalonic acid, octadecylsuccinic acid, trimethyladipic acid, 1,3-cyclobutanedicarboxylic acid, 1,3-cyclopentanedicarboxylic acid, 1,3- and 1,4-cyclohexanedicarboxylic acid, 1,3- and 1,4-dicarboxylmethylcyclohexane, 4,4'-dicyclohexyldicarboxylic acid, and combinations thereof) as a coupling agent; or (5) combinations thereof.

Various polysiloxanes having two terminal functional groups selected from the group consisting of hydroxyl groups (—OH), amino groups (—NHR'), carboxyl groups (—COOH), epoxy groups, isocyanate groups, thiol groups, and combinations thereof can be obtained from commercial suppliers (e.g., from Shin Etsu, Gelest, Inc, or Fluorochem). Otherwise, one skilled in the art will know how to prepare such difunctional group-terminated polysiloxanes according to procedures known in the art and described in Journal of Polymer Science—Chemistry, 33, 1773 (1995) (herein incorporated by reference in its entirety). Examples of commercially available di-functional polysiloxane include without limitation, di-epoxypropoxypropyl-terminated polysiloxane, di-hydroxyethoxypropyl-terminated polysiloxane, di-hydroxyl(polyethyleneoxy)propyl-terminated polysiloxane, dicarboxydecyl-terminated polysiloxane, dicarboxypropyl-terminated polysiloxane, di-caprolactone terminated polysiloxane, di-N-ethylaminopropyl terminated polysiloxane, and combinations thereof.

Examples of preferred hydroxyl-containing polysiloxane crosslinkers having one sole polysiloxane segment are those that can be obtained from those commercial available di-functional polysiloxane by ethylenically functionalization, for example, including without limitation, α,ω-bis[3-(meth) acryloxy-2-hydroxypropyloxypropyl]-terminated polydimethylsiloxane, α,ω-bis[3-(meth)acryloxyethoxy-2-hydroxypropyloxypropyl]-terminated polydimethylsiloxane, α,ω-bis[3-(meth)acrylamidoethoxy-2-hydroxypropyloxy-propyl]-terminated polydimethylsiloxane, α,ω-bis[3-(meth) acryloxypropoxy-2-hydroxypropyloxypropyl]-terminated polydimethylsiloxane, α,ω-bis[3-(meth)acrylamidopropoxy-2-hydroxypropyloxypropyl]-terminated polydimethylsiloxane, α,ω-bis[3-(meth)acrylamidoisopropoxy-2-hydroxypropyloxypropyl]-terminated polydimethylsiloxane, α,ω-bis(allyloxy-2-hydroxypropyl-oxyethoxypropyl)-terminated polydimethylsiloxane, α,ω-bis(vinyloxy-2-hydroxypropyl-oxyethoxypropyl)-terminated polydimethylsiloxane, α,ω-bis[(meth)acryloxy-2-hydroxypropyloxy-ethoxypropyl]-terminated polydimethylsiloxane, α,ω-bis[(meth)acryloxy-2-hydroxypropyl-N-ethylaminopropyl]-terminated polydimethylsiloxane, α,ω-bis[allyloxy-2-hydroxypropyl-N-ethylaminopropyl]-terminated polydimethylsiloxane, α,ω-bis [vinyloxy-2-hydroxypropyl-N-ethylaminopropyl]-terminated polydimethylsiloxane, α,ω-bis[(meth)acryloxy-2-hydroxypropyl-oxycabonylpropyl]-terminated polydimethylsiloxane, α,ω-bis[allyloxy-2-hydroxypropyl-oxycabonylpropyl]-terminated polydimethylsiloxane, α,ω-bis[vinyloxy-2-hydroxypropyl-oxycabonylpropyl]-terminated polydimethylsiloxane, α,ω-bis[(meth)acryloxy-2-hydroxypropyl-oxy-pentylcabonyloxyalkyl]-terminated polydimethylsiloxane, α,ω-bis[allyloxy-2-hydroxypropyl-oxy-pentylcabonyloxyalkyl]-terminated polydimethylsiloxane, α,ω-bis[vinyloxy-2-hydroxypropyl-oxy-pentylcabonyloxyalkyl]-terminated polydimethylsiloxane, α,ω-bis(allyloxy-2-hydroxypropyl-oxy(polyethylenoxy)propyl)-terminated polydimethylsiloxane, α,ω-bis(vinyloxy-2-hydroxypropyl-oxy(polyethylenoxy)propyl)-terminated polydimethylsiloxane, α,ω-bis[(meth)acryloxy-2-hydroxypropyloxy(polyethylenoxy)propyl]-terminated polydimethylsiloxane, a coupling product of $C_2$-$C_4$ hydroxyalkyl (meth)acrylate or $C_2$-$C_4$ hydroxyalkyl(meth)acrylamide or (meth)acrylic acid with α,ω-bis(hydroxyethoxypropyl)-polydimethylsiloxane through a di-epoxy compound (e.g., 1,4-butanediol diglycidyl ether, 1,6-hexanediol diglycidyl ether, glycerol diglycidyl ether, ethylene glycol diglycidyl ether, diethylene glycol diglycidyl ether, polyethylene glycol diglycidyl ether, propylene glycol diglycidyl ether, dipropylene glycol diglycidyl ether, or combinations thereof), and combinations thereof.

Various monofunctional terminated polyethyleneglycols (PEGs) or polyethyleneoxides (PEOs) can be obtained from commercial sources, e.g., Shearwater Polymers, Inc., Polymer Sources™, Sigma-Aldrich, and Perstorp Polyols, Inc. Preferred monofunctional-terminated PEGs are those PEGs with one amino, hydroxyl, acid chloride, or epoxy group at one terminus and a methoxy or ethoxy group at the other terminus. Various monofunctional polyvinylpyrrolidones (PVPs) with one terminal hydroxy, carboxyl or thiol group can be obtained from commercial sources, e.g., Polymer Sources™. It is understood that both the terms "polyethyleneglycol" and polyethyleneoxide" are interchangeable in this patent application.

Monofunctional group-terminated hydrophilic polymers of one or more hydrophilic vinylic monomers selected from the group consisting of N-vinylpyrrolidone, N,N-dimethyl(meth)acrylamide, (meth)acrylamide, N-vinyl formamide, N-vinyl acetamide, N-vinyl isopropylamide, N-vinyl-N-methyl acetamide, and combinations thereof can be prepared according to procedures similar to those described in U.S. Pat. No. 6,218,508, herein incorporated by reference in its entirety. For example, one or more hydrophilic vinylic monomer without functional group (i.e., primary amino group, hydroxyl group, isocyanate group, carboxyl group, or epoxy group) and a chain transfer agent (e.g., 2-mercaptoethanol, 2-aminoethanethiol, 2-mercaptopropionic acid, thioglycolic acid, thiolactic acid, or other hydroxymercaptanes, aminomercaptans, or carboxyl-containing mercaptanes) are copolymerized (thermally or actinically) in the presence or absence of an initiator to obtain a monohydroxy-, moncarboxyl-, or monoamine-terminated hydrophilic polymer or copolymer. Generally, the molar ratio of chain transfer agent to that of one or more hydrophilic vinylic monomers is from about 1:5 to about 1:100. The molar ratio of chain transfer agent to the hydrophilic vinylic monomer without functional group is selected to obtain a polymer or copolymer with a molecular weight of from about 500 to about 500,000, preferably from about 1000 to about 100,000, more preferably from about 1500 to about 100,000 Daltons. Mono-epoxy-, mono-isocyanate-, or mono-acid chloride-terminated polymers or copolymers of one or more hydrophilic vinylic monomers can be prepared by covalently attaching epoxy, isocyanate, or acid chloride groups to the above-obtained monohydroxy- or monoamine-terminated polymers or copolymers of one or more hydrophilic vinylic monomers according to any known procedures. Use of monofunctional group-terminated hydrophilic polymers with higher molecular weight may ensure that the interfacial film on a silicone hydrogel material or lens made from a prepolymer of the invention has adequate thickness and coverage.

Alternatively, monofunctional group-terminated hydrophilic polymers can be prepared by polymerizing the one or more hydrophilic monomers (free of reactive functional group other than ethylenically unsaturated group) in the presence of a hydroxyl-, amine-, or carboxyl-containing free radical initiator at a molar ratio of initiator to the hydrophilic monomers of from about 1:30 to about 1:700. Examples of initiators with amine, hydroxyl, or carboxyl group are azo initiators, such as, e.g., 2,2'-Azobis{2-[1-(2-hydroxyethyl)-2-imidazolin-2-yl]propane}dihydrochloride, 2,2'-Azobis{2-methyl-N-[1,1-bis(hydroxymethyl)-2-hydroxyethyl]propionamide, 2,2'-Azobis[2-methyl-N-(2-hydroxyethyl)propionamide], or 2,2'-Azobis{2-methyl-N-[2-(1-hydroxybutyl)]propionamide}, 2,2'-Azobis(2-methylpropionamide)dihydrochloride, 2,2'-Azobis[N-(2-carboxyethyl)-2-methylpropionamidine]tetrahydrate, or the likes.

A person skilled in the art will know well how to covalently attach a monofunctional group terminated PEG or hydrophilic polymer to one of the hydroxy groups of a hydroxy-containing polysiloxane crosslinker under well known coupling reaction conditions as described above or taught in textbooks.

In accordance with the invention, a hydrophilized chain-extended polysiloxane crosslinker of formula (7) can be obtained from: (A) a hydroxy-containing chain-extended polysiloxane crosslinker (i.e., having at least two polysiloxane segments and two ethylenically unsaturated groups) by covalently attaching one or more polyethyleneoxides or hydrophilic polymers of one or more hydrophilic vinylic monomers selected from the group consisting of N-vinylpyrrolidone, N,N-dimethyl(meth)acrylamide, (meth)acrylamide, N-vinyl formamide, N-vinyl acetamide, N-vinyl isopropylamide, N-vinyl-N-methyl acetamide, and combinations thereof, each of polyethyleneoxide or hydrophilic polymer containing one sole reactive functional group capable of participating in a coupling reaction to form a covalent linkage, according to commonly known coupling reactions (described above); and/or (B) a di-functional group terminated chain-extended polysiloxane comprising at least one pendant hydrophilic polymer chain by ethylenical functionalization with an ethylenically functionalizing vinylic monomer described above.

A hydroxy-containing chain-extended polysiloxane crosslinker (i.e., having at least two polysiloxane segments separated by a linkage) can be obtained by: (1) reacting at least one polysiloxane crosslinker having one sole polysiloxane segment and two ethylenically-unsaturated groups with at least one dimercapto compound or dimercaptan (i.e., a compound having two thiol groups), under Michael Addition or thiol-ene reaction conditions, provided that at least one of the dimercaptan, the polysiloxane crosslinker and polysiloxane vinylic monomer comprises at least one, preferably at least two hydroxyl groups; and/or (2) reacting at least one di-thiol terminated polysiloxane having one sole polysiloxane segment with at least one crosslinking agent (i.e., a compound having two ethylenicallynically unsaturated groups and a molecular weight of 700 Daltons or less), under Michael Addition or thiol-ene reaction conditions, provided that at least one of the di-thiol-terminated polysiloxane, the mono-thiol-terminated polysiloxane and the crosslinking agent comprises at least one, preferably at least two hydroxyl groups.

It is understood that a reaction for preparing a hydroxy-containing chain-extended polysiloxane crosslinker can be prepared in a one-pot reaction. For example, a polysiloxane crosslinker can react with a dimercaptan under Michael Addition or thiol-ene reaction conditions at a molar equivalent ratio of about 2:1 to form a chain-extended polysiloxane crosslinker having two polysiloxane segments linked together through a linker derived from the dimercaptan. Alternatively, steps-wise reactions can be used. For example, in the first step, a dimercaptan (or di-thiol-terminated polysiloxane) can be reacted with a polysiloxane crosslinker (or a crosslinking agent) under the Michael Addition or thio-ene reaction conditions at a molar equivalent ratio of about 2:1 or higher to form a thiol-capped polysiloxane. In the second step, the polysiloxane crosslinker (or crosslinking agent) can be reacted with the thiol-capped polysiloxane under the Michael Addition or thio-ene reaction conditions at a molar equivalent ratio of about 2:1 or higher to form a hydroxy-containing polysiloxane crosslinker having three (or two) polysiloxane segments. Addition step(s) of reactions can be used to add additional polysiloxane segments in a hydroxy-containing polysiloxane crosslinker.

Any dimercaptans having 2 to 24 carbon atoms can be used in the invention to prepare a hydroxy-containing chain-extended polysiloxane crosslinker. Examples of dimercaptans include without limitation $C_2$-$C_{12}$ alkyl dimercaptans (e.g., ethyl dimercaptan, propyl dimercaptan, butyl dimercaptan, pentamethylene dimercaptan, hexamethylene dimercaptan, heptamethylene dimercaptan, octamethylene dimercaptan, nonamethylene dimercaptan, decamethylene dimercaptan, or combinations thereof), ethylcyclohexyl dimercaptan, dipentene dimercaptan, benzenedithiol, methyl-substituted benzenedithiol, benzenedimethanethiol, glycol dimercaptoacetate, ethyl ether dimercaptan (diglycol dimercaptan), triglycol dimercaptan, tetraglycol dimercaptan, dimercaprol, dimercaptopropanol, dimercaptobutanol, dimercaptopentanol, dimercaptopropionic acid, dihydrolipoic acid, dithiothreitol, dimercaptosuccinic acid, and combinations thereof.

The preferred hydroxy-containing polysiloxane vinylic monomers or crosslinkers described above can be used in preparing a hydroxy-containing chain-extended polysiloxane crosslinker. It is understood that various commercially-available polysiloxane crosslinkers terminated with two (meth)acryloyl, allyl, and/or vinyl groups and free of hydroxyl group (e.g., from Gelest, Inc, or Fluorochem) can be used in the preparation of a hydroxy-containing chain-extended polysiloxane vinylic monomer or crosslinker so long as that a dimercaptan contains at least one hydroxyl group.

Any crosslinking agents can be used in the preparation of a hydroxy-containing chain-extended polysiloxane crosslinker of the invention. Examples of preferred cross-linking agents include without limitation tetraethyleneglycol di-(meth)acrylate, triethyleneglycol di-(meth)acrylate, ethyleneglycol di-(meth)acrylate, diethyleneglycol di-(meth)acrylate, bisphenol A dimethacrylate, vinyl methacrylate, ethylenediamine di(meth)acrylamide, glycerol dimethacrylate, allyl(meth)acrylate, N,N'-methylenebis(meth)acrylamide, N,N'-ethylenebis(meth)acrylamide, N,N'-dihydroxyethylene bis(meth)acrylamide, 1,3-bis(methacrylamidopropyl)-1,1,3,3-tetrakis (trimethylsiloxy)disiloxane, 1,3-bis(N-(meth)acrylamidopropyl)-1,1,3,3-tetrakis-(trimethylsiloxy) disiloxane, 1,3-bis(methacrylamidobutyl)-1,1,3,3-tetrakis (trimethylsiloxy)-disiloxane, 1,3-bis(methacryloxyethylureidopropyl)-1,1,3,3-tetrakis(trimethylsiloxy)disiloxane, a product of diamine (preferably selected from the group consisting of N,N'-bis(hydroxyethyl)ethylenediamine, N,N'-dimethylethylenediamine, ethylenediamine, N,N'-dimethyl-1,3-propanediamine, N,N'-diethyl-1,3-propanediamine, propane-1,3-diamine, butane-1,4-diamine, pentane-1,5-diamine, hexamethylenediamine, isophorone diamine, and combinations thereof) and epoxy-containing vinylic monomer (preferably selected from the group consisting of glycidyl(meth)acrylate, vinyl glycidyl ether, allyl glycidyl ether, and combinations thereof), combinations thereof. A more preferred cross-linking agent to be used in the preparation of a hydroxy-containing chain-extended polysiloxane crosslinker of the invention is tetra(ethyleneglycol)diacrylate, tri(ethyleneglycol)diacrylate, ethyleneglycol diacrylate, di(ethyleneglycol)diacrylate, glycerol dimethacrylate, allyl (meth)acrylate, N,N'-methylene bis(meth)acrylamide, N,N'-ethylene bis(meth)acrylamide, N,N'-dihydroxyethylene bis (meth)acrylamide, or combination thereof.

In accordance with the invention, a hydroxy-containing chain-extended polysiloxane crosslinker can further be obtained by reacting ethylenically functionalizing vinylic monomer having an amino (—NHR'), carboxyl or epoxy group with a di-functional chain-extended polysiloxane having two terminal functional groups selected from the group consisting of amino group, carboxyl group, epoxy group, and combination thereof, in the presence or absence of a coupling agent selected from the group consisting of diamine, di-epoxy and di-carboxylic acid compound, wherein the di-functional chain-extended polysiloxane is obtained by reacting one or more di-functional polysiloxanes each having two terminal amino, epoxy or carboxyl groups in the presence or absence of a coupling agent selected from the group consisting of diamine, di-epoxy and di-carboxylic acid compound, provided that at least one of the di-functional polysiloxanes and the coupling agent contains at least one epoxy group.

As discussed above, a person skilled in the art will know well how to covalently attach one or more of monofunctional group terminated PEGs or hydrophilic polymers which are described above to one of the hydroxy groups of a hydroxy-containing chain-extended polysiloxane crosslinker under well known coupling reaction conditions as described above or taught in textbooks.

A chain-extended polysiloxane crosslinker of formula (7) can also be obtained by a process including the steps of: (1) obtaining a bridging linker having a pendant (linear or 3-arm) hydrophilic polymer chain and two first reactive functional groups; (2) reacting the bridging linker with at least one di-functional polysiloxane having one sole polysiloxane segment and two terminal second reactive functional groups, in the presence or absence of a coupling agent under coupling reaction conditions, to form an intermediary chain-extended polysiloxane polymer having two terminal first or second reactive functional groups, at least two polysiloxane segments, and at least one dangling hydrophilic polymer chain attached to an organic linkage linking a pair of adjacent polysiloxane segments; and (3) ethylenically functionalizing the intermediary chain-extended polysiloxane polymer by using an ethylenically functionalizing vinylic monomer having a third reactive functional group (other than ethylenically unsaturated group) capable of reacting with the first or second reactive functional groups in the presence or absence of a coupling agent to form a covalent linkage, thereby forming the chain-extended polysiloxane crosslinker of the invention (i.e., of formula (I)). Preferably, the first reactive functional group is selected from the group consisting of amino (—NHR' with R' as defined above), hydroxyl, carboxyl, and combinations thereof, and the second and third reactive functional groups independent of each other are selected from the group consisting of hydroxyl groups (—OH), amino groups (—NHR'), carboxyl groups (—COOH), isocyanate groups, epoxy groups, azlactone group, aziridine group, acid chloride, and combinations thereof.

A bridging linker having a pendant (linear or 3-arm) hydrophilic polymer chain and two first reactive functional groups selected from the group consisting of amino, hydroxyl, carboxyl, isocyanate groups, and combinations thereof by: (a) reacting a mercaptan having one sole thiol group and two first reactive functional groups (other than thiol groups) with a mono-ethylenically-functionalized hydrophilic polymer (i.e., a linear or 3-arm hydrophilic polymer having one sole terminal, ethylenically-unsaturated group), under Michael Addition or thiol-ene reaction conditions; (b) reacting monothiol terminated (linear or Y-shape) hydrophilic polymer with a vinylic monomer having two first reactive functional groups (other than ethylenically unsaturated groups), under Michael Addition or thiol-ene reaction conditions; (c) polymerizing a mixture including a chain transfer agent (i.e., a mercaptan) having one sole thiol group and at least two first reactive functional groups, at least about 60%, preferably at least about 70%, more preferably at least about 80%, even more preferably at least about 90%) by weight of one or more hydrophilic vinylic monomers and from 0 to about 40% (preferably from 0 to about 30%, more preferably from 0 to about 20%, even more preferably from 0 to about 10%) by weight of one or more bulky vinylic monomers (any one of those described above); (d) reacting a $C_2$-$C_{20}$ compound having three first reactive functional groups (which can be identical to or different from one other) with a (linear or 3-arm) hydrophilic polymer having one sole terminal second reactive functional group in the presence or absence of a coupling agent under coupling reaction conditions, or (e) reacting a $C_2$-$C_{20}$ compound having three first reactive functional groups (reactive with organic bromide) with a ATRP polymerization product of a polymerizing a mixture including an organic bromide as ATRP initiator, at least about 60% (preferably at least about 70%, more preferably at least about 80%, even more preferably at least about 90%) by weight of one or more hydrophilic vinylic monomers and from 0 to about 40% (preferably from 0 to about 30%, more preferably from 0 to about 20%, even more preferably from 0 to about 10%) by weight of one or more bulky vinylic monomers (any one of those described above).

For example, a bridging linker having a pendant hydrophilic polymer chain and two first functional groups can be reacted with a polysiloxane with two terminal second functional groups, in the presence or absence of a coupling agent under coupling reaction conditions at a molar equivalent ratio of about 1:2 or higher, to form a di-second functional group-terminated chain extended polysiloxane having two polysiloxane segments linked through the bridging linker. Such prepared chain extended polysiloxane can be reacted further with a bridging linker at a molar equivalent ratio of about 1:2 to form a new chain-extended polysiloxane capped by the bridging linker (i.e., a chain-extend polysiloxane having two terminal first functional groups and three pendant hydrophilic polymer chains and two polysiloxane segments).

As another illustrative example, a chain-extended polysiloxane having three polysiloxane segments each pair of which is separated by a bridging linker having a pendant hydrophilic polymer chain can be prepared in a one-pot coupling reaction or three step reactions. In a one pot reaction, a bridging linker with two first functional groups and a pendant hydrophilic polymer chain can react with a polysiloxane having one polysiloxane segment and two terminal second functional groups coreactive with the first functional group to form covalent linkages under coupling reaction conditions at a molar equivalent ratio of about 2:3 to form a chain-extended polysiloxane having (a) three polysiloxane segments each pair of which are linked together through a bridging linker having a pendant hydrophilic polymer chain and (b) two terminal second functional groups. Alternatively, in the first step of three-step reactions, a bridging linker having a pendant hydrophilic polymer chain and two first functional groups a polysiloxane with two terminal second functional groups can be reacted with a bridging linker having a pendant hydrophilic polymer chain and two first functional groups, in the presence or absence of a coupling agent under coupling reaction conditions at a molar equivalent ratio of about 2:1 or higher to form a polysiloxane capped (terminated) with one bridging linker at each ends. In the second step, the bridging linker-capped polysiloxane can be reacted with a polysiloxane having two terminal second functional groups (the same as or different from the polysiloxane used in the first step) under coupling reaction conditions at a molar equivalent ratio of about 1:2 or higher to form a chain-extended polysiloxane having three polysiloxane segments, two pendant hydrophilic polymer chains and two terminal second functional group. Addition step(s) of reactions can be used to add additional polysiloxane segments and/or bridging linkers each with a pendant hydrophilic polymer chain to a chain-extended polysiloxane.

Mono-dihydroxysubstituted-alkyl or alkyloxyalkyl-terminated PEGs are available from commercial source (e.g., Ymer™ N120, a linear difunctional polyethylene glycol monomethyl ether, from Perstorp). Alternatively, a bridging linker having a pendant hydrophilic polymer chain and two first reactive functional groups can be obtained by (a) reacting a mercaptan having one sole thiol group and two first reactive functional groups (other than thiol groups) with a mono-ethylenically-functionalized hydrophilic polymer (i.e., a hydrophilic polymer having one sole ethylenically unsaturated group), or (b) reacting mono-thiol terminated hydrophilic polymer with a vinylic monomer having two first reactive functional groups (other than ethylenically unsaturated groups), under Michael Addition or thiol-ene reaction conditions.

In a preferred embodiment, each hydrophilic polymer chain comprises at least about 60%, preferably at least about 70%, more preferably at least about 80%, even more preferably at least about 90%) by weight of one or more hydrophilic monomers selected from the group consisting of ethyleneglycol, (meth)acrylamide, $C_1$-$C_3$ alkyl(meth)acrylamide, di-($C_1$-$C_3$ alkyl)(meth)acrylamide, N-vinylpyrrole, N-vinyl-2-pyrrolidone, 2-vinyloxazoline, 4-vinylpyridine, mono-$C_1$-$C_4$ alkoxy, mono-(meth)acryloyl terminated polyethyleneglycol having a molecular weight of 2000 Daltons or less, di($C_1$-$C_3$ alkyl amino)($C_2$-$C_4$ alkyl)(meth)acrylate, N—$C_1$-$C_4$ alkyl-3-methylene-2-pyrrolidone, N—$C_1$-$C_4$ alkyl-5-methylene-2-pyrrolidone, N-vinyl $C_1$-$C_6$ alkylamide, N-vinyl-N—$C_1$-$C_6$ alkyl amide, and combinations thereof. Preferably, the hydrophilic polymer chain comprises a bulky vinylic monomer, which can be any one of those described above.

Examples of preferred hydrophilic vinylic monomers used in this aspect of the invention are N,N-dimethylacrylamide (DMA), N,N-dimethylmethacrylamide (DMMA), 3-acryloylamino-1-propanol, N-methyl-3-methylene-2-pyrrolidone, N-ethyl-3-methylene-2-pyrrolidone, N-methyl-5-methylene-2-pyrrolidone, N-ethyl-5-methylene-2-pyrrolidone, 5-methyl-3-methylene-2-pyrrolidone, 5-ethyl-3-methylene-2-pyrrolidone, 1-n-propyl-3-methylene-2-pyrrolidone, 1-n-propyl-5-methylene-2-pyrrolidone, 1-isopropyl-3-methylene-2-pyrrolidone, 1-isopropyl-5-methylene-2-pyrrolidone, 1-n-butyl-3-methylene-2-pyrrolidone, 1-tert-butyl-3-methylene-2-pyrrolidone, dimethylaminoethyl methacrylate (DMAEMA), N-vinyl-2-pyrrolidone (NVP), a $C_1$-$C_4$-alkoxy polyethylene glycol(meth)acrylate having a weight average molecular weight of up to 1500, methacrylic acid, N-vinyl formamide, N-vinyl acetamide, N-vinyl isopropylamide, N-vinyl-N-methyl acetamide, N-vinyl caprolactam, and mixtures thereof.

Any mercaptans having 2 to 24 carbon atoms and two reactive functional groups selected from the group consisting of amino (—NHR' with R' as defined above), hydroxyl, carboxyl, and combinations thereof can be used in the invention to prepare a bridging linker. Examples of such mercaptans include without limitation mercaptoglycerol, 2-Mercaptopyrimidine-4,6-diol; cysteine; 4-amino-5-mercapto-pentanoic acid, 2-mercapto-4-amino-6-hydroxypyrimidine, 2-mercapto-succinic acid, 3-mercapto-2-(methylamino)propanoic acid, 2-mercapto-4,5-dihydro-1h-imidazole-4,5-diol, 3-mercaptotyramine, mercaptopropanediol, 2-mercaptomethylglutaric acid, 3-mercapto-DL-valine hydrochloride, and combinations thereof.

Any vinylic monomer having two reactive functional groups selected from the group consisting of amino (—NHR' with R' as defined above), hydroxyl, carboxyl, and combinations thereof can be used in the invention to prepare a bridging linker having a pendant hydrophilic polymer chain. Examples of such vinylic monomers include without limitation N,N-2-(meth)acrylamidoglycolic acid, glycerol(meth)acrylate, 2-hydroxy-3-aminopropyl(meth)acrylate, 1-hydroxy-2-aminopropyl(meth)acrylate, 1-amino-2-hydroxypropyl(meth)acrylate, glutaconic acid, itaconic acid, citraconic acid, mesaconic acid, maleic acid, fumaric acid, and combinations thereof.

Any linear hydrophilic polymers having one sole thiol or ethylenically unsaturated group can be used in the invention to prepare a bridging linker having a pendant hydrophilic polymer chain. Exemplary hydrophilic polymers with one ethylenically-unsaturated group or thiol group include without limitation mono-ethylenically unsaturated group- or mono-thiol-terminated poly(ethylene glycol) (PEG); mono-ethylenically unsaturated group- or mono-thiol-terminated polyethyleneglycol/polypropyleneglycol (PEG/PPG) block copolymers; mono-ethylenically unsaturated group- or mono-thiol-terminated polymers comprising at least about 60% (preferably at least about 70%, more preferably at least about 80%, even more preferably at least about 90%) by weight of one or more hydrophilic vinylic monomers selected from the group consisting of N,N-dialkyl(meth)acrylamide, N-vinylpyrrolidone, N-methyl-N-vinylacetamide, N-vinylacetamide, N-vinyl formamide, N-vinyl isopropylamide, di-$C_1$-$C_4$alkylamino-$C_2$-$C_4$alkyl(meth)acrylate, (meth)acrylamide, a $C_1$-$C_4$-alkoxy polyethylene glycol(meth)acrylate having a weight average molecular weight of up to 200, N-methyl-3-methylene-2-pyrrolidone, 1-methyl-5-methylene-2-pyrrolidone, 5-methyl-3-methylene-2-pyrrolidone, or mixture thereof; and combinations thereof and from 0 to about 40% (preferably from 0 to about 30%, more preferably from 0 to about 20%, even more preferably from 0 to about 10%) by weight of one or more bulky vinylic monomers (any one of those described above).

Mono-ethylenically unsaturated group- or mono-thiol-terminated polyethyleneglycols (PEG's) are available from commercial sources. A monoethylenically unsaturated group-terminated hydrophilic polymer can be prepared by ethylenically functionalizing of a hydrophilic polymer having one sole reactive functional group selected from the group consisting of amino group, hydroxyl group, acid chloride group, carboxyl group, isocyanate group, anhydride, and epoxy group.

Various monofunctional terminated PEGs can be obtained from commercial sources, e.g., Shearwater Polymers, Inc. and Polymer Sources™. Preferred monofunctional-terminated PEGs are those PEGs with one amino, hydroxyl, acid chloride, or epoxy group at one terminus and a methoxy or ethoxy group at the other terminus. Various monofunctional polyvinylpyrrolidones (PVPs) with one terminal hydroxy, carboxyl or thiol group can be obtained from commercial sources, e.g., Polymer Sources™.

Monofunctional group-terminated linear hydrophilic polymers of one or more hydrophilic vinylic monomers free of any reactive functional group (other than ethylenically unsaturated group) can be prepared according to procedures similar to those described in U.S. Pat. No. 6,218,508, herein incorporated by reference in its entirety. For example, one or more hydrophilic vinylic monomers without functional group (i.e., primary amino group, hydroxyl group, isocyanate group, carboxyl group, or epoxy group), a small amount (i.e., about 40% or less, preferably about 30% or less, more preferably about 20% or less, even more preferably about 10% or less by weight, relative to the total amount of polymerizable components) of a bulky vinylic monomer, and a chain transfer agent (e.g., 2-mercaptoethanol, 2-aminoethanethiol, 2-mercaptopropionic acid, thioglycolic acid, thiolactic acid, or other hydroxymercaptanes, aminomercaptans, or carboxyl-containing mercaptanes) are copolymerized (thermally or actinically) in the presence or absence of an initiator to obtain a monohydroxy-, moncarboxyl-, or monoamine-terminated hydrophilic polymer or copolymer. Generally, the molar ratio of chain transfer agent to that of one or more hydrophilic vinylic monomers is from about 1:5 to about 1:100. The molar ratio of chain transfer agent to the hydrophilic vinylic monomer without functional group is selected to obtain a polymer or copolymer with a molecular weight of from about 500 to about 10,000, preferably from about 1000 to about 7,500 Daltons. Mono-epoxy-, mono-isocyanate-, or mono-acid chloride-terminated polymers or copolymers of one or more hydrophilic vinylic monomers can be prepared by covalently attaching epoxy, isocyanate, or acid chloride groups to the above-obtained monohydroxy- or monoamine-terminated polymers or copolymers of one or more hydrophilic vinylic monomers according to any known procedures. Use of monofunctional group-terminated hydrophilic polymers with higher molecular weight may ensure that the interfacial film on a silicone hydrogel material or lens made from a prepolymer of the invention has adequate thickness and coverage.

Alternatively, monofunctional group-terminated hydrophilic polymers can be prepared by polymerizing the one or more hydrophilic monomers (free of reactive functional group other than ethylenically unsaturated group) in the presence of a hydroxyl-, amine-, or carboxyl-containing free radical initiator at a molar ratio of intiator to the hydrophilic monomers of from about 1:30 to about 1:700. Examples of initiators with amine, hydroxyl, or carboxy group are azo initiators, such as, e.g., 2,2'-Azobis{2-[1-(2-hydroxyethyl)-2-imidazolin-2-yl]propane}dihydrochloride, 2,2'-Azobis{2-methyl-N-[1,1-bis(hydroxymethyl)-2-hydroxyethyl]propionamide, 2,2'-Azobis[2-methyl-N-(2-hydroxyethyl) propionamide], or 2,2'-Azobis{2-methyl-N-[2-(1-hydroxybutyl)]propionamide}, 2,2'-Azobis(2-methylpropionamide)dihydrochloride, 2,2'-Azobis[N-(2-carboxyethyl)-2-methylpropionamidine]tetrahydrate, or the likes.

In accordance with the invention, ethylenically functionalizing of a mono-functional group-terminated hydrophilic polymer can be carried out by covalently attaching ethylenically unsaturated groups to the functional groups (e.g., amine, hydroxyl, carboxyl, isocyanate, anhydride, and/or epoxy groups) of the mono-functional group terminated hydrophilic polymer by using an ethylenically functionalizing vinylic monomer (any one of those described above).

Examples of $C_2$-$C_{20}$ compounds having three first reactive functional groups (which can be identical to or different from one other) include without limitation 3-amino-1,2-propanediol, 2-amino-1,3-propanediol, 2-amino-2-methylpropane-1,3-diol, α-aminoadipic acid, 2,3-dihydroxy-3-methylpentanoic acid, glyceric acid, 4-amino-2-hydroxybutanoic acid, 3-amino-2-hydroxypropionic acid, tyrosine, serine, threonine, lysine, aspartate, glutamate, 3-hydroxy-3-methylglutaric acid, malic acid, 2-hydroxyglutaric acid, glycerol, diglycerol, 1,1,1-trishydroxymethylethane, 1,1,1-trishydroxymethylpropane, 1,2,4-butanetriol, 1,2,6-hexanetriol, erythritol, pentaerythritol, diethylenetriamine, N-2'-aminoethyl-1,3-propylenediamine, N,N-bis(3-aminopropyl)-amine, N,N-bis(6-aminohexyl)amine, triethylenetetramine, the isocyanurate trimer of hexamethylene diisocyanate, 2,4,6-toluene triisocyanate, p, p', p''-triphenylmethane triisocyanate, and the trifunctional trimer (isocyanurate) of isophorone diisocyanate, trimesoyl chloride, cyclohexane-1,3,5-tricarbonyl chloride, trimer acid chloride, triglycidylisocyanurate (TGIC), trimethylopropane trimethacrylate, pentaerythritol tetramethacrylate, triallyl isocyanurate, triallyl cyanurate, aconitic acid, citric acid, 1,3,5-cyclohexanetricarboxylic acid, 1,3,5-trimethyl-1,3,5-cyclohexanetricarboxylic acid, 1,2,3 benzene tricarboxylic acid, and 1,2,4 benzene tricarboxylic acid. Preferably, a $C_2$-$C_{20}$ compound used for preparing a bridging linker having a pendant (linear or 3-arm) hydrophilic polymer chain and two first reactive functional groups (i.e., in formula (I) t1 and t2 is zero and $L_1$, $L_2$, $L_1'$ and $L_2'$ are direct bonds) is 3-amino-1,2-propanediol, 2-amino-1, 3-propanediol, 2-amino-2-methylpropane-1,3-diol, α-aminoadipic acid, 2,3-dihydroxy-3-methylpentanoic acid, lysine, aspartate, or glutamate. A person skilled in the art understand well how to chose a coupling reaction based on selectivity and/or differential reactivity of a given functional group. For example, the amine group of 3-amino-1,2-propanediol can react with the sole carboxylic group of a mono-functionalized linear or 3-arm hydrophilic polymer in the presence of a carbodiimide (i.e., 1-ethyl-3-(3-dimethylaminopropyl)carbodiimide (EDC), N,N'-dicyclohexylcarbodiimide (DCC), 1-cyclohexyl-3-(2-morpholinoethyl)carbodiimide, diisopropyl carbodiimide) according to well-known carbodiimide-assisted coupling reaction, so as to form a bridging linker with one dangling linear or 3-arm hydrophilic polymer chain and two hydroxyl groups.

In accordance with the invention, the three arms of a monofunctional 3-arm hydrophilic polymer independent of each other are a linear hydrophilic polymer chain comprising at least about 60%, preferably at least about 70%, more preferably at least about 80%, even more preferably at least about 90% by weight of one or more hydrophilic monomers and they can be identical or different. Each arm is linked to a $C_2$-$C_{20}$ compound having three first reactive functional groups selected from the groups consisting of hydroxyl, amino, carboxyl, isocyanate groups, and combination thereof. A monofunctional 3-arm hydrophilic polymer can be prepared by reacting a first linear hydrophilic polymer having one sole terminal second reactive functional group with a $C_2$-$C_{20}$ compound having three first reactive functional groups to form a mono-di(first functional group) terminated linear hydrophilic polymer; reacting a second linear hydrophilic polymer having one sole third reactive functional group with the mono-di(first functional group) terminated linear hydrophilic polymer to form an intermediary hydrophilic polymer composed of the first and send linear hydrophilic polymers linked by a linkage with one first reactive functional group; and then reacting a third linear hydrophilic polymer having two terminal fourth reactive functional groups with the intermediary hydrophilic polymer to form a 3-arm hydrophilic polymer having one sole terminal fourth reactive functional group. Preferably, a $C_2$-$C_{20}$ compound having three first reactive functional groups for preparing a mono-functional terminated 3-arm hydrophilic polymer comprises three different reactive functional groups having different reactivities, for example, such as, 4-amino-2-hydroxybutanoic acid, 3-amino-2-hydroxypropionic acid, tyrosine, serine, or threonine.

Alternatively, a bridging linker having a pendant linear hydrophilic polymer chain and two first reactive functional groups (as described above) can be reacting sequentially with one mono-functional terminated linear hydrophilic polymer and with a linear hydrophilic polymer having two terminal functional groups under well known coupling reaction conditions, obtain a mono-functional terminated 3-arm hydrophilic polymer.

A mono-ethylenically unsaturated group terminated 3-arm hydrophilic polymer can be prepared by covalently attaching ethylenically unsaturated groups to the functional group (e.g., amine, hydroxyl, carboxyl, isocyanate, anhydride, and/or epoxy groups) of the mono-functional group terminated 3-arm hydrophilic polymer by using an ethylenically functionalizing vinylic monomer (as described above).

Any suitable di-functional polysiloxanes can be used to prepare an intermediary chain-extended polysiloxane polymer having two terminal reactive functional groups, at least two polysiloxane segments, and at least one dangling hydrophilic polymer chain attached to an organic linkage linking a pair of adjacent polysiloxane segments. Various polysiloxanes having two terminal functional groups selected from the group consisting of hydroxyl groups (—OH), amino groups (—NHR'), carboxyl groups (—COOH), epoxy groups, isocyanate groups, acid anhydride, and combinations thereof can be obtained from commercial suppliers (e.g., from Gelest, Inc, or Fluorochem). Otherwise, one skilled in the art will know how to prepare such difunctional group-terminated polysiloxanes according to procedures known in the art and described in Journal of Polymer Science—Chemistry, 33, 1773 (1995) (herein incorporated by reference in its entirety). Examples of commercially available di-functional polysiloxane include without limitation, di-epoxypropoxypropyl-terminated polysiloxane, di-hydroxyethoxypropyl-terminated polysiloxane, di-hydroxyl(polyethylenoxy)propyl-terminated polysiloxane, dicarboxydecyl-terminated polysiloxane, dicarboxypropyl-terminated polysiloxane, dicaprolactone terminated polysiloxane, di-N-ethylaminopropyl terminated polysiloxane, diaminopropyl terminated polysiloxane, di-succinic acid anhydride terminated polysiloxane, and combinations thereof. A person skilled in the art will know well to select a di-functional polysiloxane and coupling reaction conditions in step (2).

It is understood that the molar equivalent ratio of the bridging linker having one pendant hydrophilic polymer chain to the difunctional terminated polysiloxane in coupling reaction mixture can determine whether resultant intermediary chain-extended polysiloxane polymer is capped with one of the two reactive functional group of the bridging linker or of the difunctional polysiloxane.

Where the molar equivalent ratio of a first bridging linker to a first di-functional terminated polysiloxane is about 2:1 in the coupling reaction mixture, the resultant first intermediary polysiloxane polymer has one polysiloxane segment and is capped with one of the two reactive functional group of the bridging linker. The first intermediary polymer then can be reacted with a second difunctional polysiloxane (which can be different from or the same as the first difunctional polysiloxane) at a molar equivalent ratio of 1:2 to form a second intermediary polysiloxane polymer having three polysiloxane segments and capped with one of the reactive functional groups of the second difunctional polysiloxane. Such procedures can be repeated to obtain an intermediary polymer having a desired number of polysiloxane segments.

Similarly, where the molar equivalent ratio of a first bridging linker to first difunctional terminated polysiloxane is about 1:2 in the coupling reaction mixture, the resultant first intermediary polysiloxane polymer has two polysiloxane segments and is capped with one of the two reactive functional group of the first difunctional polysiloxane. The resultant first intermediary chain-extended polysiloxane polymer then can be ethylenically functionalized to obtain a chain-extended polysiloxane crosslinker (i.e., step (3)) of the invention or reacted with a second bridging linker (which can be different from or the same as the first bridging linker) at a molar equivalent ratio of 1:2 to form a second intermediary polysiloxane polymer having the same two polysiloxane segments but capped with one of the reactive functional groups of the second bridging linker. The second intermediary polysiloxane can further be reacted with a second difunctional polysiloxane (which can be different from or the same as the first difunctional polysiloxanes) to form a third intermediary polysiloxane polymer having four polysiloxane segments and capped with one of the reactive functional groups of the second difunctional polysiloxane. Such procedures can be repeated to obtain an intermediary polymer having a desired number of polysiloxane segments.

It is understood that two or three bridging linkers can be covalently linked together, in a coupling reaction (any one described above), to form a new bridging linker having two or more pendant hydrophilic polymer chains (i.e., corresponding the formula (I) in which v1 and ω1 independent of each other are an integer of 2 or 3).

An intermediary chain-extended polysiloxane polymer obtained then can be ethylenically functionalized to obtain a chain-extended polysiloxane crosslinker of the invention, according to any ethylenically functionalizing procedures described above and using any ethylenically functionalizing vinylic monomer described above. Preferably, covalent linkages formed in the ethylenically functionalizing process are linkages free of ester linkages between one carbon-carbon double bond and one polydisiloxane segment. For example, where the terminal functional groups of an intermediary chain-extended polysiloxane polymer is amino or hydroxyl group, an azlactone-containing vinylic monomer or an isocyanate-containing (meth)acrylamide monomer (which can be for example the 1:1 reaction product of $C_2$-$C_4$ hydroxyalkyl (meth)acrylamide (e.g., hydroxyethyl(meth)acrylamide) with a hexamethyl-1,6-diisocyanate (or isophorene diisocyanate or any diisocyanate described above)) can be used as ethylenically functionalizing vinylic monomer; wherein the terminal functional groups of an intermediary chain-extended polysiloxane polymer are an amino group, a (meth)acrylic acid chloride can be as ethylenically functionalizing vinylic monomer; where the terminal functional groups of an intermediary chain-extended polysiloxane polymer are a 1,2- or 1,3-diol, acrylamidoacetaldehyde dimethylacetal (or methacrylamidoacetaldehyde dimethylacetal) can be used as ethylenically functionalizing vinylic monomer.

In accordance with the invention, a hydrophilized polysiloxane or chain-extended polysiloxane crosslinker of formula (8) can be obtained by a process including the steps of: (1) reacting a bridging linker having a pendant hydrophilic polymer chain (any one of those described above) with at least one polysiloxane mono-terminated with one organic moiety having two reactive functional group, e.g., mono-dicarbinol-terminated polysiloxane having one sole polysiloxane segment (i.e., a mono-bishydroxyalkyl-terminated or mono-bishydroxyalkyloxyalkyl-terminated polysiloxane), in the presence or absence of a coupling agent under coupling reaction conditions, to form a comb-like compound having (a) at least one pendant polysiloxane chain (i.e., a segment terminated with no reactive functional group), (b) at least one pendant hydrophilic polymer chain and (c) two terminal first reactive functional groups; and (2) ethylenically functionalizing the comb-like compound by using an ethylenically functionalizing vinylic monomer having a second reactive functional group (other than ethylenically unsaturated group) capable of reacting with the first reactive functional groups in the presence or absence of a coupling agent to form a covalent linkage, thereby forming a hydrophilized polysiloxane crosslinker of formula (10).

A mono-dicarbinol polysiloxane can be obtained from commercial sources, such as Shin Etsu, Gelest, Inc.

A polysiloxane mono-terminated with one organic moiety having two reactive functional groups can be obtained by (a) reacting a mercaptan having one sole thiol group and two first reactive functional groups (other than thiol groups) with a mono-vinyl-, mono-acryloyl-, mono-methacryloyl-, or mono-allyl-terminated polysiloxane, or (b) reacting mono-thiol terminated polysiloxane with a vinylic monomer having two first reactive functional groups (other than ethylenically unsaturated groups), under Michael Addition or thiol-ene reaction conditions.

Mono-vinyl-, mono-acryloyl-, mono-methacryloyl-, and mono-allyl-terminated polysiloxanes can be obtained from commercial sources (e.g., from Shin Etsu, Gelest, Inc, or Fluorochem). Alternatively, they can be obtained by ethylenically functionalizing a mono-functional polysiloxane obtained from a commercial source.

Above described mercaptans having 2 to 24 carbon atoms and two reactive functional group selected from the group consisting of amino (—NHR' with R' as defined above), hydroxyl, carboxyl, and combinations thereof can be used in the invention to prepare a polysiloxane terminated with mono-organic moiety having two reactive functional groups. Examples of such mercaptans include without limitation mercaptoglycerol, 2-Mercapto-pyrimidine-4,6-diol; 4-amino-5-mercapto-pentanoic acid, 2-mercapto-4-amino-6-hydroxypyrimidine, 2-mercapto-succinic acid, 3-mercapto-2-(methylamino)propanoic acid, 2-mercapto-4,5-dihydro-1h-imidazole-4,5-diol, 3-mercaptotyramine, mercaptopropanediol, 2-mercaptomethylglutaric acid, 3-mercapto-DL-valine hydrochloride, and combinations thereof.

Any vinylic monomer having two reactive functional groups selected from the group consisting of amino (—NHR' with R' as defined above), hydroxyl, carboxyl, and combinations thereof can be used in the invention to prepare a bridging linker having a pendant hydrophilic polymer chain in step (2). Examples of such vinylic monomers include without limitation N,N-2-(meth)acrylamidoglycolic acid, glycerol(meth)acrylate, 2-hydroxy-3-aminopropyl(meth)acrylate, 1-hydroxy-2-aminopropyl(meth)acrylate, 1-amino-2-hydroxypropyl(meth)acrylate, glutaconic acid, itaconic acid, citraconic acid, mesaconic acid, maleic acid, fumaric acid, and combinations thereof.

In accordance with the invention, any suitable hydrophilic vinylic monomers can be used in preparation of a prepolymer of the invention. Suitable hydrophilic vinylic monomers are, without this being an exhaustive list, hydroxyl-substituted $C_1$-$C_6$ alkyl(meth)acrylates, hydroxyl-substituted $C_1$-$C_6$ alkyl vinyl ethers, $C_1$ to $C_6$ alkyl(meth)acrylamide, di-($C_1$-$C_6$ alkyl)(meth)acrylamide, N-vinylpyrrole, N-vinyl-2-pyrrolidone, 2-vinyloxazoline, 2-vinyl-4,4'-dialkyloxazolin-5-one, 2- and 4-vinylpyridine, olefinically unsaturated carboxylic acids having a total of 3 to 6 carbon atoms, amino-substituted $C_1$-$C_6$ alkyl- (where the term "amino" also includes quaternary ammonium), mono($C_1$-$C_6$ alkyl amino)($C_1$-$C_6$ alkyl) and di($C_1$-$C_6$ alkyl amino)($C_1$-$C_6$ alkyl)(meth)acrylates, allyl alcohol, N-vinyl $C_1$-$C_6$ alkylamide, N-vinyl-N—$C_1$-$C_6$ alkyl amide, and combinations thereof.

Examples of preferred hydrophilic vinylic monomers free of reactive functional group are N,N-dimethylacrylamide (DMA), N-methyl-3-methylene-2-pyrrolidone, 1-ethyl-3-methylene-2-pyrrolidone, 1-methyl-5-methylene-2-pyrrolidone, 1-ethyl-5-methylene-2-pyrrolidone, 5-methyl-3-methylene-2-pyrrolidone, 5-ethyl-3-methylene-2-pyrrolidone, 1-n-propyl-3-methylene-2-pyrrolidone, 1-n-propyl-5-methylene-2-pyrrolidone, 1-isopropyl-3-methylene-2-pyrrolidone, 1-isopropyl-5-methylene-2-pyrrolidone, 1-n-butyl-3-methylene-2-pyrrolidone, 1-tert-butyl-3-methylene-2-pyrrolidone, N-vinyl-2-pyrrolidone (NVP), vinylpyridine, a $C_1$-$C_4$-alkoxy polyethylene glycol(meth)acrylate having a weight average molecular weight of up to 1500, N-vinyl formamide, N-vinyl acetamide, N-vinyl isopropylamide, N-vinyl-N-methyl acetamide, N-vinyl caprolactam, and mixtures thereof. Examples of the most preferred hydrophilic vinylic monomers include without limitation N-vinylpyrrolidone, N,N-dimethyl(meth)acrylamide, (meth)acrylamide, N-vinyl formamide, N-vinyl acetamide, N-vinyl isopropylamide, N-vinyl-N-methyl acetamide, N-methyl-3-methylene-2-pyrrolidone, 1-ethyl-3-methylene-2-pyrrolidone, 1-methyl-5-methylene-2-pyrrolidone, 1-ethyl-5-methylene-2-pyrrolidone, 5-methyl-3-methylene-2-pyrrolidone, 5-ethyl-3-methylene-2-pyrrolidone, and combinations thereof.

In accordance with the invention, the polymerizable units are free of any polysiloxane segment and each comprise a basic monomeric unit being a part of a polymer chain of the prepolymer and a pendant or terminal, ethylenically-unsaturated group attached thereon, wherein each basic monomeric unit is derived from a first ethylenically functionalizing vinylic monomer having a first reactive functional group, wherein the pendant or terminal ethylenically unsaturated group is derived from a second ethylenically functionalizing vinylic monomer having a second reactive functional group which reacts with one first reactive functional in the presence or absence of a crosslinking agent to form a covalent linkage. The first and second reactive functional groups are selected from the group consisting of amino group, hydroxyl group, carboxyl group, azlactone group, isocyanate group, epoxy group, aziridine group, acid chloride, and combination thereof. Examples of such vinylic monomers are those ethylenically functionalizing vinylic monomers described above. Preferably, the first ethylenically functionalizing vinylic monomer is selected from the group consisting of hydroxyethyl(meth)acrylate, hydroxypropyl(meth)acrylate, hydroxyethyl(meth)acrylamide, hydroxypropyl(meth)acrylamide, allyl alcohol, aminoethyl(meth)acrylate, aminopropyl(meth)acrylate, aminoethyl(meth)acrylamide, aminopropyl(meth)acrylamide, allyl amine, (meth)acrylic acid, ethylacrylic acid, propylacrylic acid, butylacrylic acid, glycidyl(meth)acrylate, vinyl glycidyl ether, allyl glycidyl ether, isocyanatoethyl(meth)acrylate, 2-(1-aziridinyl)ethyl(meth)acrylate, 3-(1-aziridinyl)propyl(meth)acrylate, 4-(1-aziridinyl)butyl(meth)acrylate, 2-vinyl-4,4-dimethyl-1,3-oxazolin-5-one (VDMO), 2-isopropenyl-4,4-dimethyl-1,3-oxazolin-5-one (IPDMO), and combination thereof. Most preferably, the first ethylenically functionalizing vinylic monomer is selected from the group consisting of hydroxyethyl(meth)acrylate, hydroxypropyl(meth)acrylate, hydroxyethyl(meth)acrylamide, hydroxypropyl(meth)acrylamide, allyl alcohol, aminoethyl(meth)acrylate, aminopropyl(meth)acrylate, aminoethyl(meth)acrylamide, aminopropyl(meth)acrylamide, allyl amine, and combinations thereof.

In accordance with the invention, the content of the polymerizable units are determined based on weight percentage of the ethylenically functionalizing vinylic monomer present in the polymerizable composition for making an water-processable intermediary copolymer relative to the total weight of polymerizable components in the polymerizable composition or the weight percentage of the ethylenically functionalizing vinylic monomer used in ethylenically functionalizing the intermediary copolymer to form the prepolymer of the invention, relative to the weight of the prepolymer.

A chain transfer agent (containing at least one thiol group) is used to control the molecular weight of the resultant intermediary copolymer. Where a chain transfer has a reactive functional group such as amine, hydroxyl, carboxyl, epoxy, isocyanate, azlactone, or aziridine group, it can provide terminal or pendant functionality (amine, hydroxyl, carboxyl, epoxy, isocyanate, azlactone, or aziridine group) for subsequent ethylenical functionalization of the resultant intermediary copolymer.

Any suitable hydrophobic vinylic monomers can be used in the preparation of a water-processable prepolymer of the invention. Examples of preferred hydrophobic vinylic monomers include methyl(meth)acrylate, ethyl(meth)acrylate, propyl(meth)acrylate, isopropyl(meth)acrylate, butyl(meth)acrylate, sec-butyl(meth)acrylate, isobutyl(meth)acrylate, t-butyl(meth)acrylate, cyclohexylacrylate, 2-ethylhexylacrylate, vinyl acetate, vinyl propionate, vinyl butyrate, vinyl valerate, styrene, chloroprene, vinyl chloride, vinylidene chloride, acrylonitrile, 1-butene, butadiene, methacrylonitrile, vinyl toluene, vinyl ethyl ether, perfluorohexylethyl-thioarbonyl-aminoethyl-methacrylate, isobornyl methacrylate, trifluoroethyl methacrylate, hexafluoro-isopropyl methacrylate, hexafluorobutyl methacrylate, a silicone-containing vinylic monomer, and mixtures thereof.

In a preferred embodiment, the polymerizable composition comprises a polymerizable UV-absorbing agent. Preferred polymerizable UV absorbing agents include without limitation 2-(2-hydroxy-5-vinylphenyl)-2H-benzotriazole, 2-(2-hydroxy-5-acryloyloxyphenyl)-2H-benzotriazole, 2-(2-hydroxy-3-methacrylamido methyl-5-tert octylphenyl) benzotriazole, 2-(2'-hydroxy-5'-methacrylamidophenyl)-5-chlorobenzotriazole, 2-(2'-hydroxy-5'-methacrylamidophenyl)-5-methoxybenzotriazole, 2-(2'-hydroxy-5'-methacryloxypropyl-3'-t-butyl-phenyl)-5-chlorobenzotriazole, 2-(2'-hydroxy-5'-methacryloxyethylphenyl)benzotriazole, 2-(2'-hydroxy-5'-methacryloxypropylphenyl)benzotriazole, 2-hydroxy-4-acryloxy alkoxy benzophenone, 2-hydroxy-4-methacryloxy alkoxy benzophenone, allyl-2-hydroxybenzophenone, 2-hydroxy-4-methacryloxy benzophenone. A polymerizable UV-absorbing agent is generally is present in the polymerizable composition for preparing a water-processable prepolymer of the invention in an amount sufficient to render a contact lens, which is made from a lens forming material including the prepolymer and which absorbs at least about 80 percent of the UV light in the range of from about 280 nm to about 370 nm that impinges on the lens. A person skilled in the art will understand that the specific amount of UV-absorbing agent used in the polymerizable composition will depend on the molecular weight of the UV-absorbing agent and its extinction coefficient in the range from about 280 to about 370 nm. In accordance with the invention, the polymerizable composition comprises about 0.2% to about 5.0%, preferably about 0.3% to about 2.5%, more preferably about 0.5% to about 1.8%, by weight of a UV-absorbing agent.

In accordance with the invention, ethylenically functionalizing of an intermediary copolymer can be carried out by covalently attaching ethylenically unsaturated groups to the functional groups (e.g., amine, hydroxyl, carboxyl, isocyanate, and/or epoxy groups) of the intermediary copolymer. Any vinylic monomer having a hydroxy, amino, carboxyl, epoxy, aziridine, acid-chloride, isocyanate group, which is coreactive with isocyanate, amine, hydroxyl, carboxy, epoxy, aziridine, or azlactone groups of an intermediary copolymer in the absence or presence of a coupling agent (those described above), can be used in ethylenically functionalizing the polysiloxane. Any ethylenically-functionalizing vinylic monomers described above can be used in the ethylenical functionalization of an intermediary copolymer to make a prepolymer of the invention.

The polymerizable composition for preparing an intermediary copolymer can be a melt, a solventless liquid in which all necessary components are blended together, or a solution in which all necessary component is dissolved in an inert solvent (i.e., should not interfere with the reaction between the reactants in the mixture), such as water, an organic solvent, or mixture thereof, as known to a person skilled in the art.

Example of suitable solvents includes without limitation, water, tetrahydrofuran, tripropylene glycol methyl ether, dipropylene glycol methyl ether, ethylene glycol n-butyl ether, ketones (e.g., acetone, methyl ethyl ketone, etc.), diethylene glycol n-butyl ether, diethylene glycol methyl ether, ethylene glycol phenyl ether, propylene glycol methyl ether, propylene glycol methyl ether acetate, dipropylene glycol methyl ether acetate, propylene glycol n-propyl ether, dipropylene glycol n-propyl ether, tripropylene glycol n-butyl ether, propylene glycol n-butyl ether, dipropylene glycol n-butyl ether, tripropylene glycol n-butyl ether, propylene glycol phenyl ether dipropylene glycol dimethyl ether, polyethylene glycols, polypropylene glycols, ethyl acetate, butyl acetate, amyl acetate, methyl lactate, ethyl lactate, i-propyl lactate, methylene chloride, 2-butanol, 1-propanol, 2-propanol, menthol, cyclohexanol, cyclopentanol and exonorborneol, 2-pentanol, 3-pentanol, 2-hexanol, 3-hexanol, 3-methyl-2-butanol, 2-heptanol, 2-octanol, 2-nonanol, 2-decanol, 3-octanol, norborneol, tert-butanol, tert-amyl, alcohol, 2-methyl-2-pentanol, 2,3-dimethyl-2-butanol, 3-methyl-3-pentanol, 1-methylcyclohexanol, 2-methyl-2-hexanol, 3,7-dimethyl-3-octanol, 1-chloro-2-methyl-2-propanol, 2-methyl-2-heptanol, 2-methyl-2-octanol, 2-2-methyl-2-nonanol, 2-methyl-2-decanol, 3-methyl-3-hexanol, 3-methyl-3-heptanol, 4-methyl-4-heptanol, 3-methyl-3-octanol, 4-methyl-4-octanol, 3-methyl-3-nonanol, 4-methyl-4-nonanol, 3-methyl-3-octanol, 3-ethyl-3-hexanol, 3-methyl-3-heptanol, 4-ethyl-4-heptanol, 4-propyl-4-heptanol, 4-isopropyl-4-heptanol, 2,4-dimethyl-2-pentanol, 1-methylcyclopentanol, 1-ethylcyclopentanol, 1-ethylcyclopentanol, 3-hydroxy-3-methyl-1-butene, 4-hydroxy-4-methyl-1-cyclopentanol, 2-phenyl-2-propanol, 2-methoxy-2-methyl-2-propanol 2,3,4-trimethyl-3-pentanol, 3,7-dimethyl-3-octanol, 2-phenyl-2-butanol, 2-methyl-1-phenyl-2-propanol and 3-ethyl-3-pentanol, 1-ethoxy-2-propanol, 1-methyl-2-propanol, t-amyl alcohol, isopropanol, 1-methyl-2-pyrrolidone, N,N-dimethylpropionamide, dimethyl formamide, dimethyl acetamide, dimethyl propionamide, N-methylpyrrolidinone, and mixtures thereof.

The copolymerization of a polymerizable composition for preparing an intermediary copolymer may be induced photochemically or preferably thermally. Suitable thermal polymerization initiators are known to the skilled artisan and comprise, for example peroxides, hydroperoxides, azo-bis (alkyl- or cycloalkylnitriles), persulfates, percarbonates or mixtures thereof. Examples are benzoylperoxide, tert.-butyl peroxide, di-tert.-butyl-diperoxyphthalate, tert.-butyl hydroperoxide, azo-bis(isobutyronitrile) (AIBN), 1,1-azodiisobutyramidine, 1,1'-azo-bis(1-cyclohexanecarbonitrile), 2,2'-azo-bis(2,4-dimethylvaleronitrile) and the like. The polymerization is carried out conveniently in an above-mentioned solvent at elevated temperature, for example at a temperature of from 25 to 100° C. and preferably 40 to 80° C. The reaction time may vary within wide limits, but is conveniently, for example, from 1 to 24 hours or preferably from 2 to 12 hours. It is advantageous to previously degas the components and solvents used in the polymerization reaction and to carry out said copolymerization reaction under an inert atmosphere, for example under a nitrogen or argon atmosphere. Copolymerization can yield optical clear well-defined copolymers which may be worked up in conventional manner using for example extraction, precipitation, ultrafiltration and the like techniques.

In accordance with the invention, a water-processable prepolymer of the invention comprises from about 20% to about 50%, preferably from about 25% to about 45%, more preferably from about 28% to about 40%, by weight of silicone relative to the total weight of the prepolymer. As used in this patent application, the term "silicone" refers to a tris(organic group)-substituted silyl group and/or a di(organic group)-substituted siloxane unit, wherein the organic group can be alkyl, tris(methyl)siloxyl, and/or alkene diradical. The weight percentage of silicone in a prepolymer can be calculated based on the percentages of all of the siloxane-containing vinylic monomer(s) and hydrophilized polysiloxane and/or chain-extended polysiloxane crosslinker(s) relative to the total weight of all of polymerizable components and based on the weight percentages of silicone relative to the molecular weight (or average molecular weight) of the siloxane-containing vinylic monomer(s) and hydrophilized polysiloxane and/or chain-extended polysiloxane crosslinker(s). For example, for a polymerizable composition for making an intermediary copolymer comprising, as polymerizable components, about 35% by weight of MA-PDMS100-PEG750 (made of isocyantoethylmethacrylate (IEM), α,ω-bishydroxyethoxypropyl-terminated polydimethylsiloxane (PDMS1000, m.w.~1000, X-22-160AS from ShinEtsu), isophorone diisocyanate (IPDI), and mono-methoxy terminated polyethylene glycol (PEG750, m.w.~750), i.e., IEM-PDMS1000-IPDI-PEG750 see formula below for structural information), about 20% by weight of Hydroxy-4 (see formula below for structural information) and about 45% by weight of DMA (N,N-dimethyl acrylamide), the weight percentage of silicone in the intermediary copolymer can be calculated as follows.

MA-PDMS1000-PEG750 =

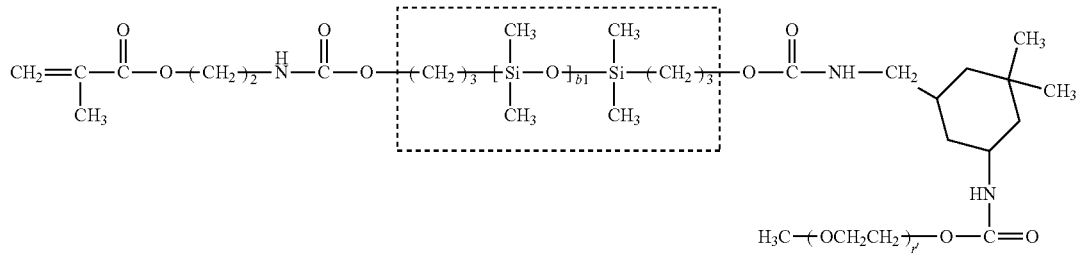

Hydroxy-4 =

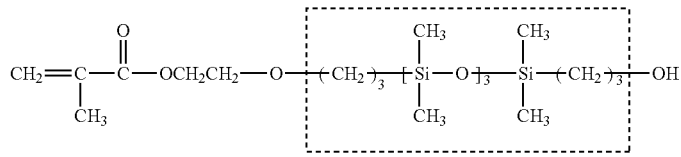

The percentage of silicone in MA-PDMS1000-PEG750 can be calculated to be $$\text{Silicone \% } (w/w) \approx \frac{M_{PDMS1000}}{M_{IEM} + M_{PDMS1000} + M_{IPDI} + M_{PEG750}} \times 100$$

$$= \frac{1000}{155 + 1000 + 222 + 750}$$

$$= 47\%.$$

The percentage of silicone in Hydroxy-4 can be calculated to be about 71% (equal to the weight of the moiety in the dashed box divided by the molecular weight of Hydroxy-4).
The percentage of silicone in the copolymer obtained from the polymerizable composition can be calculated to be $$\text{Silicone \% } (w/w) = [\text{Silicone \%}]_{MA-PDMS1000-PEG750} \times$$

$$[MA - PDMS1000 - PEG750] +$$

$$[\text{Silicone \%}]_{Hydroxy-4} \times [\text{Hydroxy} - 4]$$

$$= 47\% \times 35\% + 63\% \times 20\%$$

$$= 30.7\%$$

In accordance with the invention, a water-processable prepolymer of the invention has a high water solubility or dispersibility of at least about 5%, preferably at least about 10%, more preferably at least about 20% by weight in water. The prepolymer is capable of being actinically crosslinked, in the absence of one or more vinylic monomers, to form a silicone hydrogel contact lens having a water content of from about 20% to about 75% (preferably from about 25% to about 70%, more preferably from about 30% to about 65%) by weight when fully hydrated, an oxygen permeability (Dk) of at least about 40 barrers (preferably at least about 50 barrers, more preferably at least about 60 barrers, and even more preferably at least about 70 barrers), and optionally (but preferably) a hydrophilic surface characterized by an average water contact angle of about 90 degrees or less (preferably about 80 degrees or less, more preferably 70 degrees or less, even more preferably about 60 degrees or less) without post molding surface treatment.

A water-processable prepolymer of the invention can find particular use in preparing silicone hydrogel ophthalmic lenses, in particular contact lenses.

It should be understood that although various preferred embodiments of the invention may be separately described above, they can be combined in any desirable fashion to arrive at different preferred embodiments of the invention.

In another aspect, the invention provides a soft contact lens. The soft contact lens of the invention comprises: a silicone hydrogel material that is obtained by curing a lens-forming material in a mold, wherein the lens-forming formulation (or material) comprises a water-processable prepolymer of the invention (as described above in detail) and one or more components selected from the group consisting of a hydrophilic vinylic monomer, a hydrophobic vinylic monomer, a crosslinking agent having a molecular weight of less than 700 Daltons, a polymerizable UV-absorbing agent, a visibility tinting agent (e.g., dyes, pigments, or mixtures thereof), antimicrobial agents (e.g., preferably silver nanoparticles), a bioactive agent, leachable lubricants, leachable tear-stabilizing agents, and mixtures thereof, wherein the silicone hydrogel contact lens has a water content of from about 20% to about 75% (preferably from about 25% to about 70%, more preferably from about 30% to about 65%) by weight when fully hydrated, an oxygen permeability (Dk) of at least about 40 barrers (preferably at least about 50 barrers, more preferably at least about 60 barrers, and even more preferably at least about 70 barrers), and optionally (but preferably) a hydrophilic surface characterized by an average water contact angle of about 90 degrees or less (preferably about 80 degrees or less, more preferably 70 degrees or less, even more preferably about 60 degrees or less) without post molding surface treatment.

In accordance with the invention, a lens-forming formulation (or material) is a fluid composition, which can be a solution or a melt at a temperature from about 20° C. to about 85° C. Preferably, a lens-forming material is a solution of at least one prepolymer of the invention and other desirable components in an ophthalmically compatible solvent (e.g., water, 1,2-propylene glycol, a polyethyleneglycol having a molecular weight of about 400 Daltons or less, or a mixture thereof).

Various embodiments of water-processable prepolymers, hydrophilic vinylic monomers, hydrophobic vinylic monomers, solvents, crosslinking agents, polymerizable UV-absorbing agents, photoinitiators are described above and can be used in this aspect of the invention.

Examples of cross-linking agents include without limitation tetraethyleneglycol di-(meth)acrylate, triethyleneglycol di-(meth)acrylate, ethyleneglycol di-(meth)acrylate, diethyleneglycol di-(meth)acrylate, bisphenol A dimethacrylate, vinyl methacrylate, ethylenediamine di(meth)acrylamide, glycerol dimethacrylate, allyl(meth)acrylate, N,N'-methylenebis(meth)acrylamide, N,N'-ethylenebis(meth)acrylamide, N,N'-dihydroxyethylene bis(meth)acrylamide, 1,3-bis(methacrylamidopropyl)-1,1,3,3-tetrakis(trimethylsiloxy)disiloxane, 1,3-bis(N-(meth)acrylamidopropyl)-1,1,3,3-tetrakis-(trimethylsiloxy)disiloxane, 1,3-bis(methacrylamidobutyl)-1,1,3,3-tetrakis(trimethylsiloxy)-disiloxane, 1,3-bis(methacryloxyethylureidopropyl)-1,1,3,3-tetrakis(trimethylsiloxy)disiloxane, a product of diamine (preferably selected from the group consisting of N,N'-bis(hydroxyethyl)ethylenediamine, N,N'-dimethylethylenediamine, ethylenediamine, N,N'-dimethyl-1,3-propanediamine, N,N'-diethyl-1,3-propanediamine, propane-1,3-diamine, butane-1,4-diamine, pentane-1,5-diamine, hexamethylenediamine, isophorone diamine, and combinations thereof) and epoxy-containing vinylic monomer (preferrably selected from the group consisting of glycidyl(meth)acrylate, vinyl glycidyl ether, allyl glycidyl ether, and combinations thereof), combinations thereof. A more preferred cross-linking agent to be used in the preparation of a prepolymer of the invention is tetra(ethyleneglycol)diacrylate, tri(ethyleneglycol)diacrylate, ethyleneglycol diacrylate, di(ethyleneglycol)diacrylate, glycerol dimethacrylate, allyl(meth)acrylate, N,N'-methylene bis(meth)acrylamide, N,N'-ethylene bis(meth)acrylamide, N,N'-dihydroxyethylene bis(meth)acrylamide, or combination thereof.

The bioactive agent incorporated in the polymeric matrix is any compound that can prevent a malady in the eye or reduce the symptoms of an eye malady. The bioactive agent can be a drug, an amino acid (e.g., taurine, glycine, etc.), a polypeptide, a protein, a nucleic acid, or any combination thereof. Examples of drugs useful herein include, but are not limited to, rebamipide, ketotifen, olaptidine, cromoglycolate, cyclosporine, nedocromil, levocabastine, lodoxamide, ketotifen, or the pharmaceutically acceptable salt or ester thereof. Other examples of bioactive agents include 2-pyrrolidone-5-carboxylic acid (PCA), alpha hydroxyl acids (e.g., glycolic, lactic, malic, tartaric, mandelic and citric acids and salts thereof, etc.), linoleic and gamma linoleic acids, and vitamins (e.g., B5, A, B6, etc.).

Examples of leachable lubricants include without limitation mucin-like materials (e.g., polyglycolic acid) and non-crosslinkable hydrophilic polymers (i.e., without ethylenically unsaturated groups).

Any hydrophilic polymers without any ethylenically unsaturated groups can be used as leachable lubricants. Preferred examples of non-crosslinkable hydrophilic polymers include, but are not limited to, polyvinyl alcohols (PVAs), polyamides, polyimides, polylactone, a homopolymer of a vinyl lactam, a copolymer of at least one vinyl lactam in the presence or in the absence of one or more hydrophilic vinylic comonomers, a homopolymer of acrylamide or methacrylamide, a copolymer of acrylamide or methacrylamide with one or more hydrophilic vinylic monomers, polyethylene oxide (i.e., polyethylene glycol (PEG)), a polyoxyethylene derivative, poly-N—N-dimethylacrylamide, polyacrylic acid, poly 2 ethyl oxazoline, heparin polysaccharides, polysaccharides, and mixtures thereof.

The weight-average molecular weight $M_w$ of the non-crosslinkable hydrophilic polymer is preferably from 5,000 to 500,000, more preferably from 10,000 to 300,000, even more preferably from 20,000 to 100,000.

Examples of leachable tear-stabilizing agents include, without limitation, phospholipids, monoglycerides, diglycerides, triglycerides, glycolipids, glyceroglycolipids, sphingolipids, sphingo-glycolipids, fatty alcohols, fatty acids, mineral oils, and mixtures thereof. Preferably, a tear stabilizing agent is a phospholipid, a monoglyceride, a diglyceride, a triglyceride, a glycolipid, a glyceroglycolipid, a sphingolipid, a sphingo-glycolipid, a fatty acid having 8 to 36 carbon atoms, a fatty alcohol having 8 to 36 carbon atoms, or a mixture thereof.

Lens molds for making contact lenses are well known to a person skilled in the art and, for example, are employed in cast molding or spin casting. For example, a mold (for cast molding) generally comprises at least two mold sections (or portions) or mold halves, i.e. first and second mold halves. The first mold half defines a first molding (or optical) surface and the second mold half defines a second molding (or optical) surface. The first and second mold halves are configured to receive each other such that a lens forming cavity is formed between the first molding surface and the second molding surface. The molding surface of a mold half is the cavity-forming surface of the mold and in direct contact with lens-forming material.

Methods of manufacturing mold sections for cast-molding a contact lens are generally well known to those of ordinary skill in the art. The process of the present invention is not limited to any particular method of forming a mold. In fact, any method of forming a mold can be used in the present invention. The first and second mold halves can be formed through various techniques, such as injection molding or lathing. Examples of suitable processes for forming the mold halves are disclosed in U.S. Pat. No. 4,444,711 to Schad; U.S. Pat. No. 4,460,534 to Boehm et al.; U.S. Pat. No. 5,843,346 to Morrill; and U.S. Pat. No. 5,894,002 to Boneberger et al., which are also incorporated herein by reference.

Virtually all materials known in the art for making molds can be used to make molds for making contact lenses. For example, polymeric materials, such as polyethylene, polypropylene, polystyrene, PMMA, Topas® COC grade 8007-S10 (clear amorphous copolymer of ethylene and norbornene, from Ticona GmbH of Frankfurt, Germany and Summit, N.J.), or the like can be used. Other materials that allow UV light transmission could be used, such as quartz glass and sapphire.

In a preferred embodiment, reusable molds are used and the lens-forming composition is cured (i.e., polymerized) actinically under a spatial limitation of actinic radiation to form a silicone hydrogel contact lens. Examples of preferred reusable molds are those disclosed in U.S. patent application Ser. No. 08/274,942 filed Jul. 14, 1994, 10/732,566 filed Dec. 10, 2003, 10/721,913 filed Nov. 25, 2003, and U.S. Pat. No. 6,627,124, which are incorporated by reference in their entireties. Reusable molds can be made of quartz, glass, sapphire, $CaF_2$, a cyclic olefin copolymer (such as for example, Topas® COC grade 8007-S10 (clear amorphous copolymer of ethylene and norbornene) from Ticona GmbH of Frankfurt, Germany and Summit, N.J., Zeonex® and Zeonor® from Zeon Chemicals LP, Louisville, Ky.), polymethylmethacrylate (PMMA), polyoxymethylene from DuPont (Delrin), Ultem® (polyetherimide) from G.E. Plastics, PrimoSpire®, etc.

In accordance with the invention, the lens-forming formulation (or composition) can be introduced (dispensed) into a cavity formed by a mold according to any known methods.

After the lens-forming composition is dispensed into the mold, it is polymerized to produce a contact lens. Crosslinking may be initiated thermally or actinically, preferably by exposing the lens-forming composition in the mold to a spatial limitation of actinic radiation to crosslink the polymerizable components in the lens-forming composition.

Where the lens-forming composition comprises a polymerizable UV-absorbing agent (i.e., a UV-absorbing moiety-containing vinylic monomer), a benzoylphosphine oxide photoinitiator is preferably used as the photoinitiator in the invention. Preferred benzoylphosphine oxide photoinitiators include without limitation 2,4,6-trimethylbenzoyldiphenylophosphine oxide; bis-(2,6-dichlorobenzoyl)-4-N-propylphenylphosphine oxide; and bis-(2,6-dichlorobenzoyl)-4-N-butylphenylphosphine oxide. It is understood that any photoinitiators other than benzoylphosphine oxide initiators can be used in the invention.

Opening of the mold so that the molded article can be removed from the mold may take place in a manner known per se.

The molded contact lens can be subject to lens extraction to remove unpolymerized polymerizable components. The extraction solvent can be any solvent known to a person skilled in the art. Examples of suitable extraction solvent are those described above. Preferably, water or an aqueous solution is used as extraction solvent. After extraction, lenses can be hydrated in water or an aqueous solution of a wetting agent (e.g., a hydrophilic polymer).

The molded contact lenses can further subject to further processes, such as, for example, packaging in lens packages with a packaging solution which can contain about 0.005% to about 5% by weight of a wetting agent (e.g., a hydrophilic polymer described above or the like known to a person skilled in the art) and/or a viscosity-enhancing agent (e.g., methyl cellulose (MC), ethyl cellulose, hydroxymethylcellulose, hydroxyethyl cellulose (HEC), hydroxypropylcellulose (HPC), hydroxypropylmethyl cellulose (HPMC), or a mixture thereof); sterilization such as autoclave at from 118 to 124° C. for at least about 30 minutes; and the like.

A silicone hydrogel contact lens of the invention has a water content of from about 20% to about 75% (preferably from about 25% to about 70%, more preferably from about 30% to about 65%) by weight when fully hydrated, an oxygen permeability (Dk) of at least about 40 barrers (preferably at least about 50 barrers, more preferably at least about 60 barrers, and even more preferably at least about 70 barrers), and a hydrophilic surface characterized by an average water contact angle of about 90 degrees or less (preferably about 80 degrees or less, more preferably 70 degrees or less, even more preferably about 60 degrees or less) without post molding surface treatment.

A contact lens of the invention can further have at least one property selected from the group consisting of an elastic modulus of from about 0.1 MPa to about 2.0 MPa, preferably from about 0.2 MPa to about 1.5 MPa, more preferably from about 0.3 MPa to about 1.2 MPa, even more preferably from about 0.4 MPa to about 1.0 MPa; an Ionoflux Diffusion Coefficient, D, of, preferably at least about $1.0 \times 10^{-5}$ mm$^2$/min, more preferably at least about $2.0 \times 10^{-5}$ mm$^2$/min, even more preferably at least about $6.0 \times 10^{-5}$ mm$^2$/min; and combinations thereof.

It should be understood that although in this aspect of the invention various embodiments including preferred embodiments of the invention may be separately described above, they can be combined and/or used together in any desirable fashion to arrive at different embodiments of a silicone hydrogel contact lenses of the invention. All of the various embodiments described above for the previous aspect of the invention can be used alone or in combination in any desirable fashion in this aspect of the invention.

In a further aspect, the invention provides a method for making silicone hydrogel contact lenses. The method comprises the steps of: introducing a lens formulation into a mold for making contact lenses, wherein the lens-forming formulation comprises (a) an opthalmically compatible solvent selected from the group consisting of water, 1,2-propylene glycol, a polyethyleneglycol having amolecular weight of about 400 Daltons or less, and mixtures thereof, and (b) a water-processable polysiloxane-containing polymerizable material selected from the group consisting of a prepolymer of the invention as described above, a siloxane-containing vinylic monomer of formula (2) described above, a siloxane-containing vinylic monomer of formula (3) described above, a crosslinker of formula (7) described above, a crosslinker of formula (8) described above, and combinations thereof, in which $B_1$ to $B_{14}$ independent of each other area linear or 3-arm hydrophilic polymer chain having a molecular weight of about 10,000 Daltons or less (preferably about 7500 daltons or less, more preferably about 5000 daltons or less, even more preferably about 2500 Daltons or less, most preferably about 1000 Daltons or less) and comprising at least about 60%, preferably at least about 70%, more preferably at least about 80%, even more preferably at least about 90%) by weight of one or more hydrophilic monomeric units selected from the group consisting of ethyleneoxide units, (meth)acrylamide units, $C_1$-$C_3$ alkyl(meth)acrylamide units, di-($C_1$-$C_3$ alkyl)(meth)acrylamide units, N-vinylpyrrole units, N-vinyl-2-pyrrolidone units, 2-vinyloxazoline units, 4-vinylpyridine units, mono-$C_1$-$C_4$ alkoxy, mono-(meth)acryloyl terminated polyethyleneglycol units having a molecular weight of 600 Daltons or less, di($C_1$-$C_3$ alkyl amino)($C_2$-$C_4$ alkyl)(meth)acrylate units, N—$C_1$-$C_4$ alkyl-3-methylene-2-pyrrolidone units, N—$C_1$-$C_4$ alkyl-5-methylene-2-pyrrolidone units, N-vinyl $C_1$-$C_6$ alkylamide units, N-vinyl-N—$C_1$-$C_6$ alkyl amide units, and combinations thereof, provided that the lens-forming formulation is free of any non-ophthalmically compatible solvent; polymerizing the lens formulation in the mold to form a silicone hydrogel contact lens, wherein the formed silicone hydrogel contact lens has a water content of from about 20% to about 75% (preferably from about 25% to about 70%, more preferably from about 30% to about 65%) by weight when fully hydrated, an oxygen permeability (Dk) of at least about 40 barrers (preferably at least about 50 barrers, more preferably at least about 60 barrers, and even more preferably at least about 70 barrers), and optionally (but preferably) a hydrophilic surface characterized by an average water contact angle of about 90 degrees or less (preferably about 80 degrees or less, more preferably 70 degrees or less, even more preferably about 60 degrees or less) without post molding surface treatment. Preferably, the lens forming formulation further comprises one or more components selected from the group consisting of a hydrophilic vinylic monomer, a hydrophobic vinylic monomer, a crosslinking agent having a molecular weight of less than 700 Daltons, a polymerizable UV-absorbing agent, a visibility tinting agent (e.g., dyes, pigments, or mixtures thereof), antimicrobial agents (e.g., preferably silver nanoparticles), a bioactive agent, leachable lubricants, leachable tear-stabilizing agents, and mixtures thereof.

Various embodiments of water-processable prepolymers, lens forming formulations, hydrophilic vinylic monomers, hydrophobic vinylic monomers, solvents, crosslinking agents, polymerizable UV-absorbing agents, photoinitiators, visibility tinting agents, antimicrobial agents, bioactive agents, leachable lubricants, leachable tear-stabilizing agents, molds, polymerizing techniques, and post molding processes are described above and can be used in this aspect of the invention.

In a preferred embodiment, the resultant silicone hydrogel contact lens is extracted with water or an aqueous solution.

In another preferred embodiment, the mold is a reusable mold, the lens-forming composition is cured (i.e., polymerized) actinically under a spatial limitation of actinic radiation to form a silicone hydrogel contact lens, and the reusable mold is cleaned with an ophthalmically compatible fluid selected from the group consisting of water, an aqueous solution, 1,2-propylene glycol, a polyethyleneglycol having a molecular weight of about 400 Daltons or less, and combination thereof.

Examples of preferred reusable molds are those disclosed in U.S. patent application Ser. No. 08/274,942 filed Jul. 14, 1994, 10/732,566 filed Dec. 10, 2003, 10/721,913 filed Nov. 25, 2003, and U.S. Pat. No. 6,627,124, which are incorporated by reference in their entireties. Reusable molds can be made of quartz, glass, sapphire, $CaF_2$, a cyclic olefin copolymer (such as for example, Topas® COC grade 8007-S10 (clear amorphous copolymer of ethylene and norbornene) from Ticona GmbH of Frankfurt, Germany and Summit, N.J., Zeonex® and Zeonor® from Zeon Chemicals LP, Louisville, Ky.), polymethylmethacrylate (PMMA), polyoxymethylene from DuPont (Delrin), Ultem® (polyetherimide) from G.E. Plastics, PrimoSpire®, and combinations thereof.

The molded contact lenses can further subject to further processes, such as, for example, packaging in lens packages with a packaging solution which can contain about 0.005% to about 5% by weight of a wetting agent (e.g., a hydrophilic polymer described above or the like known to a person skilled in the art) and/or a viscosity-enhancing agent (e.g., methyl cellulose (MC), ethyl cellulose, hydroxymethylcellulose, hydroxyethyl cellulose (HEC), hydroxypropylcellulose (HPC), hydroxypropylmethyl cellulose (HPMC), or a mixture thereof); sterilization such as autoclave at from 118 to 124° C. for at least about 30 minutes; and the like.

The resultant silicone hydrogel contact lens can further have at least one property selected from the group consisting of an elastic modulus of from about 0.1 MPa to about 2.0 MPa, preferably from about 0.2 MPa to about 1.5 MPa, more preferably from about 0.3 MPa to about 1.2 MPa, even more preferably from about 0.4 MPa to about 1.0 MPa; an Ionoflux Diffusion Coefficient, D, of, preferably at least about $1.0 \times 10^{-5}$ mm$^2$/min, more preferably at least about $2.0 \times 10^{-5}$ mm$^2$/min, even more preferably at least about $6.0 \times 10^{-5}$ mm$^2$/min.

It should be understood that although in this aspect of the invention various embodiments including preferred embodiments of the invention may be separately described above, they can be combined and/or used together in any desirable fashion to arrive at different embodiments of a silicone hydrogel contact lenses of the invention. All of the various embodiments described above for the previous aspects of the invention can be used alone or in combination in any desirable fashion in this aspect of the invention.

The previous disclosure will enable one having ordinary skill in the art to practice the invention. In order to better enable the reader to understand specific embodiments and the advantages thereof, reference to the following non-limiting examples is suggested. However, the following examples should not be read to limit the scope of the invention.

Although various embodiments of the invention have been described using specific terms, devices, and methods, such description is for illustrative purposes only. The words used are words of description rather than of limitation. It is to be understood that changes and variations may be made by those skilled in the art without departing from the spirit or scope of the present invention, which is set forth in the following claims. In addition, it should be understood that aspects of the various embodiments may be interchanged either in whole or in part or can be combined in any manner and/or used together. Therefore, the spirit and scope of the appended claims should not be limited to the description of the preferred versions contained therein.

Example 1

Oxygen Permeability Measurements

The apparent oxygen permeability of a lens and oxygen transmissibility of a lens material is determined according to a technique similar to the one described in U.S. Pat. No. 5,760,100 and in an article by Winterton et al., (The Cornea: Transactions of the World Congress on the Cornea 111, H. D. Cavanagh Ed., Raven Press: New York 1988, pp 273-280), both of which are herein incorporated by reference in their entireties. Oxygen fluxes (J) are measured at 34° C. in a wet cell (i.e., gas streams are maintained at about 100% relative humidity) using a Dk1000 instrument (available from Applied Design and Development Co., Norcross, Ga.), or similar analytical instrument. An air stream, having a known percentage of oxygen (e.g., 21%), is passed across one side of the lens at a rate of about 10 to 20 cm$^3$/min., while a nitrogen stream is passed on the opposite side of the lens at a rate of about 10 to 20 cm$^3$/min. A sample is equilibrated in a test media (i.e., saline or distilled water) at the prescribed test temperature for at least 30 minutes prior to measurement but not more than 45 minutes. Any test media used as the overlayer is equilibrated at the prescribed test temperature for at least 30 minutes prior to measurement but not more than 45 minutes. The stir motor's speed is set to 1200±50 rpm, corresponding to an indicated setting of 400±15 on the stepper motor controller. The barometric pressure surrounding the system, $P_{measured}$, is measured. The thickness (t) of the lens in the area being exposed for testing is determined by measuring about 10 locations with a Mitotoya micrometer VL-50, or similar instrument, and averaging the measurements. The oxygen concentration in the nitrogen stream (i.e., oxygen which diffuses through the lens) is measured using the DK1000 instrument. The apparent oxygen permeability of the lens material, $Dk_{app}$, is determined from the following formula:

$$Dk_{app} = Jt/(P_{oxygen})$$

where
J=oxygen flux [microliters $O_2$/cm$^2$-minute]
$P_{oxygen} = (P_{measured} - P_{water}$ vapor$) = $ (% $O_2$ in air stream)
[mm Hg]=partial pressure of oxygen in the air stream
$P_{measured}$=barometric pressure (mm Hg)
$P_{water}$ vapor=0 mm Hg at 34° C. (in a dry cell) (mm Hg)
$P_{water}$ vapor=40 mm Hg at 34° C. (in a wet cell) (mm Hg)
t=average thickness of the lens over the exposed test area (mm)
$Dk_{app}$ is expressed in units of barrers.

The apparent oxygen transmissibility (Dk/t) of the material may be calculated by dividing the apparent oxygen permeability ($Dk_{app}$) by the average thickness (t) of the lens.

The above described measurements are not corrected for the so-called boundary layer effect which is attributable to the use of a water or saline bath on top of the contact lens during the oxygen flux measurement. The boundary layer effect causes the reported value for the apparent Dk ($Dk_{app}$) of a silicone hydrogel material to be lower than the actual intrinsic Dk value ($Dk_i$). Further, the relative impact of the boundary layer effect is greater for thinner lenses than with thicker lenses. The net effect is that the reported Dk appear to change as a function of lens thickness when it should remain constant.

The intrinsic Dk value of a lens can be estimated based on a Dk value corrected for the surface resistance to oxygen flux caused by the boundary layer effect as follows.

Measure the apparent oxygen permeability values (single point) of the reference Iotrafilcon A (Focus® N&D® from CIBA VISION CORPORATION) or Iotrafilcon B (AirOptix™ from CIBA VISION CORPORATION) lenses using the same equipment. The reference lenses are of similar optical power as the test lenses and are measured concurrently with the test lenses.

Measure the oxygen flux through a thickness series of Iotrafilcon A or Iotrafilcon B (reference) lenses using the same equipment according to the procedure for apparent Dk measurements described above, to obtain the intrinsic Dk value ($Dk_i$) of the reference lens. A thickness series should cover a thickness range of approximately 100 μm or more. Preferably, the range of reference lens thicknesses will bracket the test lens thicknesses. The $Dk_{app}$ of these reference lenses must be measured on the same equipment as the test lenses and should ideally be measured contemporaneously with the test lenses. The equipment setup and measurement parameters should be held constant throughout the experiment. The individual samples may be measured multiple times if desired.

Determine the residual oxygen resistance value, $R_r$, from the reference lens results using equation (I) in the calculations.

$$R_r = \frac{\sum \left( \frac{t_j}{Dk_{app}} - \frac{t_j}{Dk_i} \right)}{n} \quad (I)$$

In which t is the thickness of a reference lens under measurement, and n is the number of the reference lenses measured. Plot the residual oxygen resistance value, $R_r$ vs. t data and fit a curve of the form Y=a+bX where, for the jth lens, $Y_j=(\Delta P/J)_j$ and $X=t_j$. The residual oxygen resistance, $R_r$ is equal to a.

Use the residual oxygen resistance value determined above to calculate the correct oxygen permeability $Dk_c$ (estimated intrinsic Dk) for the test lenses based on Equation (II).

$$Dk_c = t/[(t/Dk_a) - R_r] \quad (II)$$

The estimated intrinsic Dk of the test lens can be used to calculate what the apparent Dk ($Dk_{a\_std}$) would have been for a standard thickness lens in the same test environment based on Equation (III).

$$Dk_{a\_std} = t_{std}/[(t_{std}/Dk_c) + R_{r\_std}] \quad (III)$$

Ion Permeability Measurements.

The ion permeability of a lens is measured according to procedures described in U.S. Pat. No. 5,760,100 (herein incorporated by reference in its entirety). The values of ion permeability reported in the following examples are relative ionoflux diffusion coefficients ($D/D_{ref}$) in reference to a lens material, Alsacon, as reference material. Alsacon has an ionoflux diffusion coefficient of $0.314 \times 10^{-3}$ mm$^2$/minute.

Water Contact Angle (WCA) Measurements.

Water contact angle (WCA) measurements are performed by the sessile drop method with a DSA 10 drop shape analysis system from Krüss GmbH, Germany with pure water (Fluka, surface tension 72.5 mN/m at 20° C.). For measurement purposes a contact lens is taken off the storage solution with tweezers and excess storage solution is removed by gentle shaking. The contact lens are placed on the male part of a lens mold and gently blotted with a dry and clean cloth. A water droplet (approximately 1 μl) is then dosed on the lens apex, and the change of the contact angle over time of this water droplet (WCA(t), circle fitting mode) is monitored. The WCA is calculated by the extrapolation of the graph WCA(t) to t=0.

UV-Absorbance.

Contact lenses are manually placed into a specially fabricated sample holder or the like which can maintain the shape of the lens as it would be when placing onto eye. This holder is then submerged into a 1 cm path-length quartz cell containing phosphate buffered saline (PBS, pH~7.0-7.4) as the reference. A UV/visible spectrophotometer, such as, Varian Cary 3E UV-Visible Spectrophotometer with a LabSphere DRA-CA-302 beam splitter or the like, can be used in this measurement. Percent transmission spectra are collected at a wavelength range of 250-800 nm with % T values collected at 0.5 nm intervals. This data is transposed onto an Excel spreadsheet and used to determine if the lenses conform to Class 1 UV absorbance. UV absorbance is calculated using the following equations:

$$UVA \% T = \frac{\text{Average \% } T \text{ between } 380-316 \text{ nm}}{\text{Luminescence \% } T} \times 100$$

$$UVB \% T = \frac{\text{Average \% } T \text{ between } 280-315 \text{ nm}}{\text{Luminescence \% } T} \times 100$$

In which Luminescence % T is the average % transmission between 380 and 780.

Example 2

A one-liter reaction vessel is evacuated overnight to remove moisture, and the vacuum broken with dry nitrogen. 73.59 g (75 meq) of dried X-22-160AS (α,ω-bis(2-hydroxyethoxypropyl)-polydimethylsiloxane, M.W.~1000, from Shin-Etsu) is charged to the reactor and then about 16.67 g (75 meq) of freshly distilled isophorone diisocyanate (IPDI) is added into the reactor. The reactor is purged with nitrogen and heated to 45° C. with stirring and about 0.30 g of dibutyltin dilaurate (DBTDL) is added. The reactor is sealed, and a positive flow of nitrogen is maintained. An exotherm occurs, after which the reaction mixture is allowed to cool and stir at 55° C. for 2 hours. About 56.25 g (75 meq) of dried monomethoxy-terminated polyethylene glycol, M.W.~750) is added to the reactor at 55° C., followed by 100 μL of DBTDL. The reaction is continued for 8 hours before heating is discontinued and the reactor is allowed to cool overnight. The nitrogen bubble is discontinued and the reactor is filled with dry air with moderate stirring. The formed product contains hydroxy-terminated block copolymer containing one polysiloxane segment and one PEG 750 segment as main components. About 11.63 g (75 meq) of IEM is added to the reactor along with 100 μL of DBTDL. The reaction is continued under dry air with moderate stirring for 24 hours, leading to a product majorly containing methacrylate ended PDMS and PEG block copolymer (MA-PDMS1000-PEG750), and then the product is decanted and stored under refrigeration.

Example 3

A one-liter reaction vessel is evacuated overnight to remove moisture, and the vacuum broken with dry nitrogen. 73.59 g (75 meq) of dried X-22-160AS (α,ω-bis(2-hydroxyethoxypropyl)-polydimethylsiloxane, M.W.~1000, from Shin-Etsu) is charged to the reactor and then about 39.23 g (176.5 meq) of freshly distilled isophorone diisocyanate (IPDI) is added into the reactor. The reactor is purged with nitrogen and heated to 45° C. with stirring and then about 0.30 g of dibutyltin dilaurate (DBTDL) is added. The reactor is sealed, and a positive flow of nitrogen is maintained. An exotherm occurs, after which the reaction mixture is allowed to cool and stir at 55° C. for 2 hours. About 72.12 g (66.20 meq) of dried Ymer™ N120 (mono-3,3-bis(hydroxymethyl) butyl- and mono-methoxy-terminated polyethylene glycol, M.W.~1000, from Perstorp Polyols, Inc.) is added to the reactor at 55° C., followed by 100 µL of DBTDL. The reaction is continued for 8 hours before heating is discontinued and the reactor is allowed to cool overnight. The nitrogen bubble is discontinued and the reactor is filled with dry air with moderate stirring. An α,ω-bis(isocyanate)-terminated chain extended polysiloxane having multiple segments of polysiloxane and pendent PEG 1000 chains is formed. About 9.83 g (75 meq) of 2-hydroxyethyl methacrylate (HEMA) is added to the reactor, along with 100 µL of DBTDL. The reaction is continued under dry air with moderate stirring for 24 hours, leading to a hydrophilized chain-extended polysiloxane crosslinker (YMER 50x) having the formula of

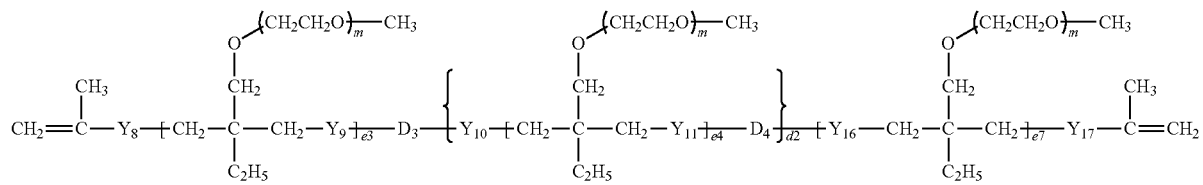

in which $Y_8$ is —C(O)—O—$C_2H_4$—O—C(O)—NH—$Z_3$—NH—C(O)—O—, $Y_{17}$ is —O—C(O)—NH—$Z_3$—NH—C(O)—O—$C_2H_4$—O—C(O)— in which $Z_3$ is a divalent radical of

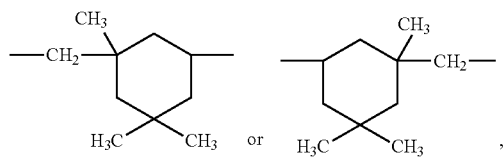

$Y_9$, $Y_{10}$, $Y_{11}$ and $Y_{16}$ independent of each other are —O—C(O)—NH—$Z_3$—NH—C(O)—O— in which $Z_3$ is as defined above, $D_3$ and $D_4$ are a divalent radical of

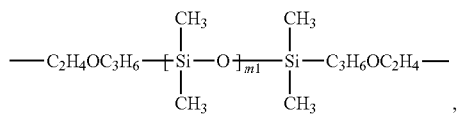

e3 and e7 independent of each other are integer of 0, 1 or 2, e4 is an integer of 1 or 2, d2 is an integer of 0 to about 10, m is an integer of about 15 to 29, m1 is an integer of about 7 to about 14. The number average molecular weight of YMER 50x is determined to be about 12,000 Daltons based on conventional GPC using DMF as the eluent and polystyrene as the standard. The product is decanted and stored under refrigeration.

Examples 4 to 10

Various lens forming formulations are prepared in a 20 mL amber vial to have compositions shown in Table 1. The homogenization of the mixture is achieved via rolling on the roller overnight.

TABLE 1

| Example | Silicone-containing component | | | | DMA | EGDMA | DC-1173 | Solvent |
| | I | II | III | IV | | | | |
|---|---|---|---|---|---|---|---|---|
| 4 | 3.1 | | | | 4.7 | 0.2 | 0.1 | 1.9[a] |
| 5 | 4.7 | | | | 3.1 | 0.2 | 0.1 | 1.9[a] |
| 6 | | 1.55 | | | 2.35 | 0.1 | 0.05 | 0.95[b] |
| 7 | | 2.35 | | | 1.55 | 0.1 | 0.05 | 0.95[b] |
| 8 | | | 0.9 | | 3 | 0.1 | 0.05 | 0.95[b] |
| 9 | | | 0.9 | | 3 | 0.1 | 0.05 | 0.95[b] |
| 10 | | | | 1.65 | 2.25 | 0.1 | 0.05 | 0.95[b] |

DMA: N,N-dimethyl acrylamide;
EGDMA: Ethyleneglycol dimethacrylate;
DC-1173: Darocur 1173.
[a]1,2-propylene glycol;
[b]1-propanol
Silicone containing component: I is SiGMA (methyl bis(trimethylsiloxy)silyl] propyl glycerol methacrylate); II is Hydroxy-4 (as shown above); III is a hydrophilized chain-extended polysiloxane crosslinker prepared in Example 3; and IV is MA-PDMS1000-PEG750.

A lens forming formulation is placed in polypropylene plastic molds and cured under UV light (3.8 mW/cm²) for about 15 minutes to form contact lenses. The lens de-molding is achieved by soaking the molds with lenses in 2-propanol/water (30/70 v/v) for about 10 minutes. The lenses are extracted with DI water for about 5 minutes. The lenses are stored in PBS in the glass vial and autoclaved at about 120° C. for about 30 minutes. Oxygen permeability ($Dk_c$), water content (WC %), relative ionoflux diffusion coefficients ($D/D_{ref}$) in reference to Alsacon as reference lens material ($IP_{rel}$), and average water contact angle are measured according to the procedures described in Example 1. The results are shown in Table 2.

TABLE 2

| Lens Property | Example | | | | | | |
| | 3 | 4 | 5 | 6 | 7 | 8 | 9 |
|---|---|---|---|---|---|---|---|
| $Dk_c$ (barrers) | 49 | 32 | 50 | 29 | 35 | 61 | 31 |
| WC % (w/w) | 33 | 53 | 52 | 61 | 49 | 48 | 54 |
| IP | 0.3 | 15.3 | 5.2 | NA | NA | 15.5 | NA |
| WCA (degrees) | NA | NA | 106 | 109 | 81 | 55 | NA |

Experiments carried out in Examples 4-10 may provide guidance to select a polymerizable composition to make a water-processable prepolymer, which is suitable for making silicone hydrogel contact lenses having desired oxygen permeability, water content, surface hydrophilicity/wettability without any post molding surface treatment, and ion permeability.

Example 11

This example illustrates the water-solubility of intermediary copolymers which can be ethylenically functionalized to form prepolymers.

An intermediary copolymer is prepared by thermally polymerizing a polymerizable composition having the polymerizable contents shown in Table 3 according to a procedure used to prepare sample 11 as follows.

TABLE 3

| | Polymerizable component (% w/w)* | | | | |
|---|---|---|---|---|---|
| Sample | SIGMA | Ymer 50X | MA-PDMS1000-PEG750 | MA-PDMS | Hydroxy 4 | DMA |
| 1 | | | 35 | | 20 | 45 |
| 2 | 40 | 20 | | | | 40 |
| 3 | 20 | 40 | | | | 40 |
| 4 | 17 | | 35 | | | 47 |
| 5 | 22 | | 35 | | | 42 |
| 6 | 22 | | 42 | | | 36 |
| 7 | 35 | | 45 | | | 25 |
| 8 | 20 | | | | 20 | 60 |
| 9 | 20 | 20 | | | 10 | 50 |
| 10 | | 20 | | | 40 | 40 |
| 11 | | 40 | | | 20 | 40 |

*Each sample also contains about 0.73% (w/w) of APMA which can be used for covalent attachment of ethylenically unsaturated group relative to the total amount of all polymerizable components.

A 1-L jacketed reactor equipped with a heating/chilling loop, reflux condenser with N$_2$-inlet adapter, N$_2$ inlet adapter, 250 mL additional funnel, a thermocouple adaptor, and overhead stirring is used. Add all the polymerizable components including 40 g of YMER 50x, 20 g of hydroxy 4, 40 g of DMA, and 233 g of methanol and thoroughly mix them. Chill the mixture with stirring until the solution temperature gets between 0 to –5° C. The solution is degassed by purging with N$_2$ for 1 hour. 0.09 g of azo-bis(isobutyronitrile) (AIBN) and 0.26 g 2-mercaptoethanol, 0.74 g of N-(3-aminopropyl)methylacrylamide hydrochloride (APMA) are dissolved in 50 g of methanol in a 100 mL beaker. This initiator/CTA solution is then transferred to the additional funnel connected to the reactor. This solution is degassed three times by evacuation to 100 mBar, holding vacuum for 10 minutes, and then re-pressurizing with nitrogen. After completion of N$_2$ purge, the reactor is then heated to 60° C. and the solution is charged to the reactor at this point. After 8 hours, the reaction mixture is then cooled to room temperature and the solvent was removed via rotavap at 50 mbar and 30° C. The final wax like product is obtained.

Solubility Test:

The obtained intermediary copolymers are characterized to determine their water solubility and clarity (Table 4). The solubility test is carried out by adding 0.1 g of copolymer in 10 mL of water and stirring it overnight.

TABLE 4

| | 1 | 2 | 3 | 4 | 5 | 6 | 7 | 8 | 9 | 10 | 11 |
|---|---|---|---|---|---|---|---|---|---|---|---|
| Silicone % (w/w) | 29 | 32 | 28 | 25 | 24 | 31 | 40 | 28 | 28 | 37 | 30 |
| Water solubility | yes | No | Yes | Yes | Yes | Yes | No | No | Yes | No | Yes |
| Clarity | a | d | b | a | b | b | d | d | c | d | a |

Note:
a—slightly hazy;
b—clear;
c—hazy;
d—not soluble.

Sample 4 is further studied to determine the feasibility of formulation in water or low and non-toxic organic solvents such as 1,2-propylene glycol and PEG 200 (Table 5). The formulations are prepared in a 5 mL amber vial to have compositions shown in Table 5. The homogenization of the mixture is achieved by first heating the solution to 50° C. for half hour and then rolling it on the roller overnight. Clear formulations are obtained using either 1,2-propylene glycol or PEG 200 as the solvent, while formulation in water is hazy.

TABLE 5

| Test | Polymer | Water | 1,2-propylene glycol | PEG 200 | % | Appearance |
|---|---|---|---|---|---|---|
| 1 | 0.5 | 0.5 | | | 50 | Haze |
| 2 | 0.5 | | 0.5 | | 50 | Clear |
| 3 | 0.4 | | | 0.417 | 49 | Clear |

Mold Cleaning:

The above formulations in PEG 200 and 1,2-propylene glycol are used for mold cleaning study. One or two drops of formulation are deposited on a male Quartz mold and then cleaned it with DI water either through wash bottle or water machine. The mold surface is then inspected with microscope. The results are shown in (Table 6). In most cases, the molds can be efficiently cleaned.

TABLE 6

| | Water (RT) | | Water (40° C.) | |
|---|---|---|---|---|
| Test | Bottle (60 s) | Machine (30-40 s) | Bottle (60 s) | Machine (20 s) |
| 2 | Small residual | Clean | Clean | Clean |
| 3 | Clean | Clean | Clean | Clean |

Example 12

A one-liter reaction vessel is evacuated overnight to remove moisture, and the vacuum broken with dry nitrogen. 73.59 g (75 meq) of dried X-22-160AS (α,ω-bis(2-hydroxyethoxypropyl)-polydimethylsiloxane, M.W.~1000, from Shin-Etsu) is charged to the reactor and then about 26.68 g (120 meq) of freshly distilled isophorone diisocyanate (IPDI) is added into the reactor. The reactor is purged with nitrogen and heated to 45° C. with stirring and then about 0.30 g of dibutyltin dilaurate (DBTDL) is added. The reactor is sealed, and a positive flow of nitrogen is maintained. An exotherm occurs, after which the reaction mixture is allowed to cool and stir at 55° C. for 2 hours. About 23.89 g (21.96 meq) of dried Ymer™ N120 (mono-3,3-bis(hydroxymethyl)butyl- and mono-methoxy-terminated polyethylene glycol, M.W.~1000, from Perstorp Polyols, Inc.) is added to the reactor at 55° C., followed by 100 μL of DBTDL. The reaction is continued for 2 hours before heating is discontinued and the reactor is allowed to cool. About 6.59 g (50.64 meq)

of 2-hydroxyethyl methacrylate (HEMA) is added to the reactor, along with 100 μL of DBTDL. The reaction is continued under dry air with moderate stirring for 24 hours, leading to formation of hydrophilized chain-extended polysiloxane crosslinkers (YSX-75) having the formula of

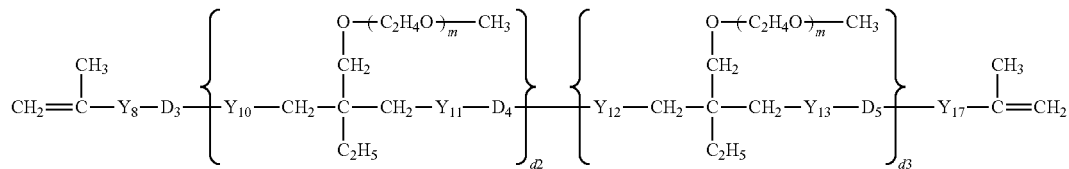

in which $Y_8$ and $Y_{17}$ are a divalent radical of —C(O)—O—$C_2H_4$—O—C(O)—NH—$Z_3$—NH—C(O)—O— and —O—C(O)—NH—$Z_3$—NH—C(O)—O—$C_2H_4$—O—C(O)— respectively, in which $Z_3$ is a divalent radical of

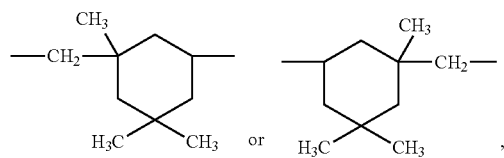

$D_3$, $D_4$, and $D_5$ are a divalent radical of

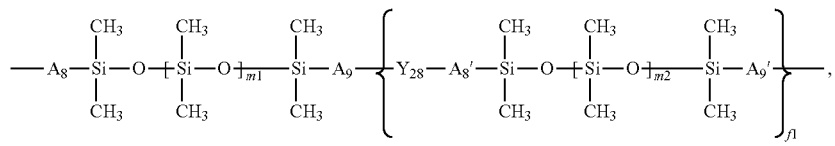

$Y_{10}$, $Y_{11}$, $Y_{12}$, $Y_{13}$ and $Y_{28}$ independent of one another are —O—C(O)—NH—$Z_3$—NH—C(O)—O— in which $Z_3$ is as defined above, $A_8$ and $A_8'$ are —$C_2H_4OC_3H_6$—, $A_9$ and $A_9'$ are —$C_3H_6OC_2H_4$—, m is an integer of about 15 to 29, m1 and m2 independent of each other are an integer of about 7 to about 14, f1 is an integer of 0 to 9, d2 and d3 independent of each other are an integer of 0 to 10. The number average molecular weight of YSX-75 is determined to be about 17,000 Daltons based on conventional GPC using DMF as the eluent and polystyrene as the standard. The product is decanted and stored under refrigeration.

Example 13

Copolymer/Macromer Synthesis

A 500-mL jacketed reactor is equipped with a heating/chilling loop, septum inlet adapter, reflux condenser with $N_2$-inlet adapter, vacuum line and overhead stirring. 25.6 g of hydrophilized chain-extended PDMS crosslinker (YSX-75, prepared in Example 12), is prepared as a 50% solution in t-amyl alcohol and then charged to the reaction vessel. The solution is degassed under vacuum less than 1 mBar for 5 minutes, and then re-pressurizing with dry nitrogen. This degas procedure is repeated for a total of 6 times.

A monomer solution is prepared by dissolving 5.76 g of methyl bis(trimethylsiloxy)silyl]propyl glycerol methacrylate (SiGMA), 1.50 g of methacrylic acid, 13.67 g of N,N-dimethylacrylamide and 1.23 g of aminopropyl methacrylamide hydrochloride salt in a mixture of 1.23 g of DI water and 175 g of t-amyl alcohol. This monomer solution is transferred to an additional funnel sitting on top of reaction vessel followed with a degas process under vacuum at 100 mBar for 10 minutes, and then re-pressurizing with dry nitrogen. This degas procedure is repeated for a total of 3 times.

An initiator and chain-transfer agent (CTA) pot solution is prepared by mixing 0.15 g of azo-bis(isobutyronitrile) pre-dissolved in 37.50 g of t-Amyl alcohol and 0.755 g of cysteamine hydrochloride pre-dissolved in 0.60 g of DI water and 1.80 g of methanol is degassed under vacuum at 100 mBar for 10 minutes, and then re-pressurizing with dry nitrogen. This degas procedure is repeated for a total of 3 times.

The CTA feed solution is prepared by dissolving 1.136 g of cysteamine hydrochloride in 0.90 g of DI water, 2.25 g of methanol and 56.25 g of t-amyl alcohol.

After both YSX-75 solution and monomer solution are degassed, the monomer solution is charged to the reaction vessel. Temperature of the mixed solution is then quickly elevated from room temperature to 64° C. The initiator/CTA solution is injected to the system when the temperature close to 64° C. and CTA feed solution is fed over 2 hours through a combination of degas unit and HPLC pump. The reaction mixture is maintained at 64° C. under nitrogen for 5 hours after the initiator solution is injected. After the copolymerization is done and the temperature is cooled to room temperature, the reaction solvent is exchanged to isopropyl alcohol and then to water as a 2 liter solution. The copolymer solution is purified by ultrafiltration and then charged to a 2-L reactor equipped with overhead stirring, refrigeration loop, thermometer, and the pH meter and dispensing tip of a Metrohm Model 718 STAT Titrino. The reaction mixture is then cooled to 1° C. 4.8 g of $NaHCO_3$ are charged to the solution and stirred to dissolve. The Titrino is set to maintain pH at 9.5 by intermittent addition of 20% sodium hydroxide solution. Acryloyl chloride, 9.6 mL, is then added over 2 hour using a syringe pump. After the solution is stirred for another hour, the Titrino is set to neutralize the reaction mixture by addition of a 2 N hydrochloric acid. The macromer solution is then filtered and then purified with ultrafiltration until the conductivity of permeability is less than 5 μS/cm. The purified macromer solution is then solvent exchanged to 1-propanol as a stock solution.

Formulation Composition and Photorheology:

| Formulation | | | Photorheology | | | |
| --- | --- | --- | --- | --- | --- | --- |
| | | | UV Curing | | | |
| Macromer | Irgacur 2959 | Solvent DPGME | Intensity mW/cm² | Time Seconds | G' kPa | Viscosity mPas |
| 60% | 0.3% | 39.7% | 6 | 13 | 150 | 6875 |
| 55% | 0.3% | 44.7% | 6 | 36 | 130 | 2500 |
| 55% | 0.5% | 44.5% | 6 | 19 | 115 | 2355 |

DPGME: dipropylene glycol methyl ether

Lens Fabrication:

The lenses are fabricated in polypropylene lens mold with equivalent UV energy as provided by photorheology. The lenses are demold in DI water and then packed in saline solution followed with autoclave at 121° C. for 30 minutes.

Lens Characterization Properties:

| Formulation | | | Lens Characterization | | | |
| --- | --- | --- | --- | --- | --- | --- |
| Macromer | Irgacur 2959 | Solvent DPGME | E' | EtB % | Dk | IP |
| 60% | 0.3% | 39.7% | 0.81 | 190% | 60 | 19 |
| 55% | 0.3% | 44.7% | 0.82 | 210% | 61 | 18 |
| 55% | 0.5% | 44.5% | 0.86 | 220% | 62 | 17 |

Example 14

Copolymer/Macromer Synthesis

The copolymer and macromer are prepared by the same manner as the macromer of Example 13 except that aminopropyl methacrylamide hydrochloride salt is not used as one of the monomers.

Formulation Composition and Photorheology:

| Formulation | | | Photorheology | | | |
| --- | --- | --- | --- | --- | --- | --- |
| | | | UV Curing | | | |
| Macromer | Irgacur 2959 | Solvent DPGME | Intensity mW/cm² | Time Seconds | G' kPa | Viscosity mPas |
| 60% | 0.3% | 39.7% | 6 | 38 | 89 | 14800 |

Lens Fabrication:

The lenses are fabricated according to the procedures described in Example 13.

Lens Characterization Properties:

| Formulation | | | Lens Characterization | | | |
| --- | --- | --- | --- | --- | --- | --- |
| Macromer | Irgacur 2959 | Solvent DPGME | E' | EtB % | Dk | IP |
| 60% | 0.3% | 39.7% | 0.42 | 260% | 52 | 36 |

Example 15

A: Chain-Extended PDMS Cross-Linker with Pendant p(DMA) Chains

Mono-dihydroxyl terminated poly(N,N-dimethylacrylamide) (poly(DMA)) is prepared by radical polymerization using 3-mercapto-1,2-propanediol as chain transfer reagent, as shown in the following scheme

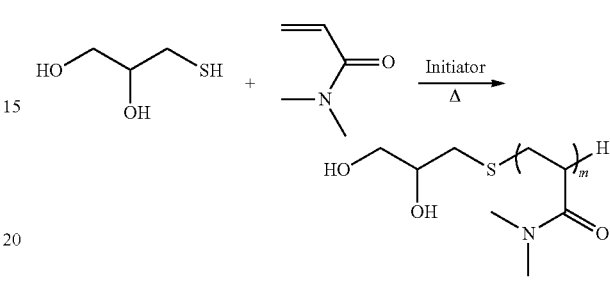

In a typical experiment, DMA (15.861 g, 160 mmol), AIBN (0.263 g, 1.44 wt % of monomers), 3-mercapto-1,2-propanediol (2.388 g, 22.08 mmol), and toluene (42.80 mL) are introduced into a 250 mL Pyrex round flask. The solution is purged with $N_2$ gas for 30 min before polymerization is carried out at 65° C. for 12 h. The product is dialyzed in 2 L toluene using MWCO 500 Cellulose Ester (Spectra/Por® Biotec) tube for 12 hours. The final product is precipitated into ethyl ether, decanted, and dried under vacuum. The number average molecular weight of the final polymer was 383 g/mol based on GPC using THF as the eluent and polystyrene as the standards.

Intermediary copolymers having PDMS segments and pendant poly(DMA) chains and terminated with isocyanate group is synthesized via condensation reaction between a mono-bishydroxyl terminated poly(DMA) (4.50 g) prepared above and di-hydroxyl terminated PDMS (7.00 g) in presence of 1,6-hexamethylene diisocyanate (2.51 g) and catalytical amount of Dibutyltindilaurate (DBTDL) (0.075%) in 14 g of toluene at 40° C. for 2 hours. Reactions are allowed to proceed until percentage of NCO by titration is close to theoretically predicted values.

Isocyanate terminated intermediary copolymers are then converted to a crosslinker in a second step through reaction with N-hydroxylethyl acrylamide (HEAA) (0.69 g) at room temperature for 5-6 hrs. The resulting crosslinkers are dialyzed in methanol followed by ethyl acetate using MWCO 3,500 regenerator cellulose tube. Final crosslinker is kept in solution with OH-TEMPO inhibitor (100 ppm against the polymer). The number average molecular weight of the final polymer is 7,160 g/mol based on GPC using THF as the eluent and polydimethylsiloxane as the standards.

B: Chain-Extended PDMS Cross-Linker with Pendant p(DMA) Chains 44.46 g (448.0 mmol) of DMA, 0.184 g (1.12 mmol) of AIBN, 6.726 g, (61.82 mmol) of 3-mercapto-1,2-propanediol, 102.6 g of Toluene and 10.29 g of ethyl acetate are introduced into a 250 ml round flask. After degassing by nitrogen bubbling for 1.0 h, polymerization is carried out at 55° C. for 12 h. The product is dialyzed in toluene using MWCO 500 Cellulose Ester (Spectra/Por® Biotec) tube for 12 h. Final product is precipitated into hexane, decanted, and dried under vacuum. The number average molecular weight of the final polymer is 541 g/mol based on GPC using THF as the eluent and polystyrene as standards.

To dried 250 ml flask, 28.0 g (29.3 mmol) of purified Shin-Etsu 160AS, 24.0 g (29.0 mmol) of mono-dihydroxyl terminated poly(DMA) above prepared and 64.0 g toluene are added. The flask is placed in 40° C. oil bath with stirring until dissolution. After cooling down to room temperature, 11.81 g (69.88 mmol) of hexamethylene diisocyanate with 3 drops of Dibutyltindilaurate (DBTDL) are added. Reaction is preceded in 40° C. oil bath for about 2 hrs and NCO conversion is monitored by titration until close to theoretical value. Cooled down again to room temperature and then 3.256 g (27.95 mmol) of HEAA is added with 3 drops catalyst to react overnight. Product is dialyzed in methanol and ethyl acetate, respectively using MWCO 3,500 regenerator cellulose tube. Final macromer is kept in solution with H-tempo inhibitor for solid content determination, formulation and lens fabrication. The number average molecular weight of the final polymer is 7,464 g/mol based on GPC using THF as the eluent and polydimethylsiloxane as the standards.

C. Formulation and Lens Casting

Formulations are prepared by dissolving a chain-extended PDMS crosslinker with pendant p(DMA) chains in dipropylene glycol methyl ether (DPGME) to have a concentration of about 60% by weight. Each formulation also contains 0.3% by weight of Irgacure 2959. Typical conditions for formulation photo-rheology and lens production are about 4-10 seconds at 4-6 mW/cm² with 297 nm filter cut off depended on mold type used. The molded lenses are characterized and properties are reported in Table 7.

TABLE 7

| Properties | Crosslinker A | Crosslinker B |
| --- | --- | --- |
| G' (kPa) | 131 | 164 |
| Curing time (s) | 6 | 4 |
| Viscosity (mPa · S) | 2,820 | 4,130 |
| Modulus (MPa) | 1.05 | 1.07 |
| Maximum Elongation (%) | 217 | 209 |
| Dkc (Barrer) | 125 | 83 |
| IP (relative to Alsacon) | 0.9 | 7.6 |

TABLE 7-continued

| Properties | Crosslinker A | Crosslinker B |
| --- | --- | --- |
| Water % | 34 | 39 |
| Lubricity | — | 2 |

D: Mold Cleaning

All above formulations are used for mold cleaning study. After lenses are made using the Quartz mold, the mold is rinsed with tap water. The mold is then examined with OptiSpec microscope. In most cases, the molds are efficiently cleaned.

What is claimed is:

1. A water-processable prepolymer, comprising:
   (1) siloxane-containing monomeric units and/or polysiloxane-containing crosslinking units, wherein the siloxane-containing monomeric units are derived from one or more siloxane-containing vinylic monomers each having at least one hydrophilic polymeric chain with a molecular weight of up to about 10000 Daltons, wherein the polysiloxane-containing crosslinking units are derived from at least one hydrophilized polysiloxane crosslinker and/or chain-extended hydrophilized polysiloxane crosslinker each having one or more pendant hydrophilic polymeric chains;
   (2) hydrophilic monomeric units derived from one or more hydrophilic vinylic monomers;
   (3) from about 0.05% to about 5% by weight of polymerizable units each having a pendant or terminal, ethylenically-unsaturated group and free of any polysiloxane segment; and
   (4) optionally hydrophobic units derived from at least one hydrophobic vinylic monomer free of silicone,
   wherein the prepolymer comprises the polysiloxane-containing crosslinking units derived from a hydrophilized polysiloxane or chain-extended polysiloxane crosslinker of formula (7) or (8)

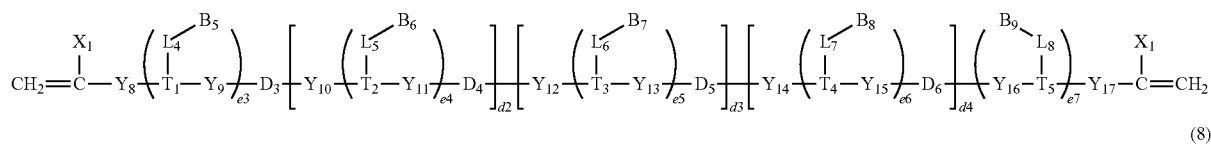

(7)

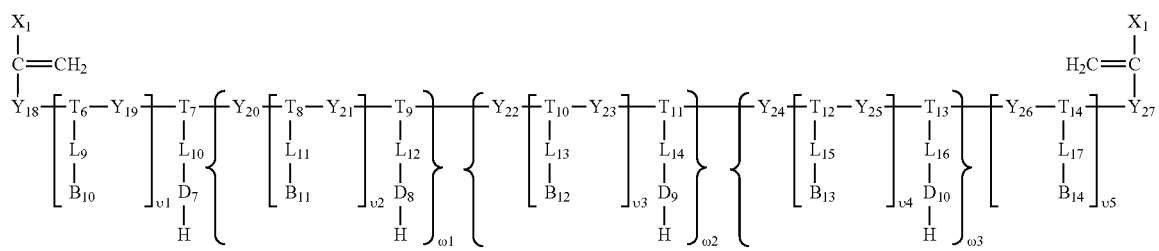

(8)

In which d2, d3, d4, ω1, ω2, and ω3 independent of one another are an integer from 0 to 20;

e3, e4, e5, e6, e7, v1, v2, v3, v4, and v5 independent of one other are 0, 1, 2 or 3 and (e3+e4+e5+e6+e7)≥1 and (v1+v2+v3+v4+v5)≥1;

$X_1$ is hydrogen or methyl;

$D_3$, $D_4$, $D_5$, $D_6$, $D_7$, $D_8$, $D_9$ and $D_{10}$ independently of one other are a divalent group of formula (9)

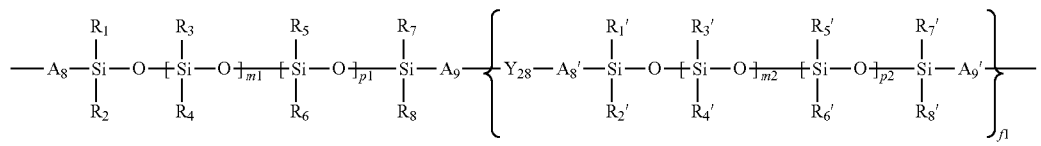

(9)

in which $Y_{28}$ is as defined below, $A_8$, $A_8'$, $A_9$, and $A_9'$ independent of one other are a direct bond, a linear or branched $C_1$-$C_{10}$ alkylene divalent radical, —$(CH_2CH_2O)_{r1}$—$CH_2CH_2$— in which r1 is an integer of 1 to 20, or a $C_1$-$C_7$ alkyleneoxy-$C_1$-$C_7$ alkylene divalent radical, and $R_1$, $R_2$, $R_3$, $R_4$, $R_5$, $R_6$, $R_7$, $R_8$, $R_1'$, $R_2'$, $R_3'$, $R_4'$, $R_5'$, $R_6'$, $R_7'$, and $R_8'$ independently of one another, are $C_1$-$C_4$-alkyl, -alk-$(OCH_2CH_2)_{r2}$—$OR_9$ in which alk is $C_1$-$C_6$-alkylene divalent radical, $R_9$ is $C_1$-$C_4$ alkyl and r2 is an integer from 1 to 20, f1 is an integer of 0 to 8, m1, m2, p1 and p2 independently of each other are an integer of from 0 to 150, (m1+p1) and (m2+p2) independent of each other are from 2 to 150;

$L_4$, $L_5$, $L_6$, $L_7$, $L_8$, $L_9$, $L_{10}$, $L_{11}$, $L_{12}$, $L_{13}$, $L_{14}$, $L_{15}$, $L_{16}$, $L_{17}$, $Y_8$, $Y_9$, $Y_{10}$, $Y_{11}$, $Y_{12}$, $Y_{13}$, $Y_{14}$, $Y_{15}$, $Y_{16}$, $Y_{17}$, $Y_{18}$, $Y_{19}$, $Y_{20}$, $Y_{21}$, $Y_{22}$, $Y_{23}$, $Y_{24}$, $Y_{25}$, $Y_{26}$, $Y_{27}$, and $Y_{28}$ independent of one another are a direct bond or a divalent radical of —$Z_1$—$X_2$—$Z_2$—$X_3$—$Z_3$—$X_4$—$Z_4$— In which $X_2$, $X_3$ and $X_4$ independent of one other are a linkage selected from the group consisting of a direct bond —O—, —NR'— in which R' is H or $C_1$-$C_4$ alkyl, —C(O)—NH—, —NH—C(O)—, —NH—C(O)—NH—, —O—C(O)—NH—, —S—, —NH—C(O)—O—, —C(O)—O—, —O—C(O)—, —NH—C(O)—NH—$Z_0$—NH—C(O)—NH—, —O—C(O)—NH—$Z_0$—NH—C(O)—O—, —O—C(O)—NH—$Z_0$—NH—C(O)—NH—, and —NH—C(O)—NH—$Z_0$—NH—C(O)—O—, $Z_0$ is a linear or branched $C_2$-$C_{12}$ alkylene divalent radical or a $C_5$-$C_{45}$ cycloaliphatic or aliphatic-cycloaliphatic divalent radical optionally containing therein one or more linkages of —O—, —NR'—, —S— and —C(O)—, $Z_1$, $Z_2$, $Z_3$ and $Z_4$ independent of one other are is a direct bond, a linear or branched $C_1$-$C_{12}$ alkylene divalent radical optionally containing therein one or more linkages of —O—, —NR'—, —S— and —C(O)—, a divalent radical of —$CH_2$—CH(OH)—$CH_2$— or —$(CH_2CH_2O)_{r1}$—$CH_2CH_2$— with r1 as defined above, or a $C_5$-$C_{45}$ cycloaliphatic or aliphatic-cycloaliphatic divalent radical optionally containing therein one or more linkages of —O—, —NR'—, —S— and —C(O)—;

$B_5$, $B_6$, $B_7$, $B_8$, $B_9$, $B_{10}$, $B_{11}$, $B_{12}$, $B_{13}$, and $B_{14}$ independent of one another are hydroxyl or a linear or 3-arm hydrophilic polymer chain having a molecular weight of about 10000 Daltons or less and comprising at least about 60% by weight of one or more hydrophilic monomeric units selected from the group consisting of ethyleneoxide units, (meth)acrylamide units, $C_1$-$C_3$ alkyl (meth)acrylamide units, di-($C_1$-$C_3$ alkyl) (meth)acrylamide units, N-vinylpyrrole units, N-vinyl-2-pyrrolidone units, 2-vinyloxazoline units, 4-vinylpyridine units, mono-$C_1$-$C_4$ alkoxy, mono-(meth)acryloyl terminated polyethyleneglycol units having a molecular weight of 600 Daltons or less, di($C_1$-$C_3$ alkyl amino)($C_2$-$C_4$ alkyl) (meth)acrylate units, N—$C_1$-$C_4$ alkyl-3-methylene-2-pyrrolidone units, N—$C_1$-$C_4$ alkyl-5-methylene-2-pyrrolidone units, N-vinyl $C_1$-$C_6$ alkylamide units, N-vinyl-N—$C_1$-$C_6$ alkyl amide units, and combinations thereof, provided that at least one of $B_5$, $B_6$, $B_7$, $B_8$, and $B_9$ and at least one of $B_{10}$, $B_{11}$, $B_{12}$, $B_{13}$, and $B_{14}$ are the linear or 3-arm hydrophilic polymer chain; and $T_1$, $T_2$, $T_3$, $T_4$, $T_5$, $T_6$, $T_7$, $T_8$, $T_9$, $T_{10}$, $T_{11}$, $T_{12}$, $T_{13}$, and $T_{14}$ independent of one another are an aliphatic or cycloaliphatic or aliphatic-cycloaliphatic trivalent radical which has up to 15 carbon atoms and can be interrupted by —O—, —NR'—, —C(O)— and/or —S—, wherein the prepolymer comprises from about 20% to about 50% by weight of silicone relative to the total weight of the prepolymer and has a high water solubility or dispersibility of at least about 5% by weight in water, wherein the prepolymer is capable of being actinically crosslinked, in the absence of one or more vinylic monomers, to form a silicone hydrogel contact lens having a water content of from about 20% to about 75% by weight when fully hydrated, an oxygen permeability (Dk) of at least about 40 barrers, and optionally a hydrophilic surface characterized by an average water contact angle of about 90 degrees or less without post-molding surface treatment.

2. The prepolymer of claim 1, wherein the prepolymer comprises the polysiloxane-containing crosslinking units derived from a hydrophilized polysiloxane or chain-extended polysiloxane crosslinker of formula (8).

3. The prepolymer of claim 1, wherein the prepolymer comprises the polysiloxane-containing crosslinking units derived from a hydrophilized polysiloxane or chain-extended polysiloxane crosslinker of formula (7).

4. The prepolymer of claim 1, wherein the prepolymer comprises the siloxane-containing monomeric units derived from a siloxane-containing vinylic monomer of formula (2) or (3)

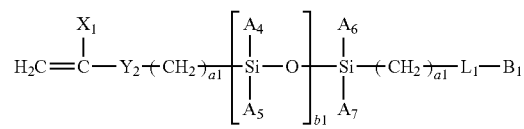

(2)

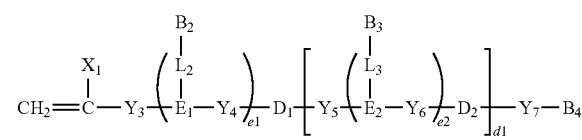

(3)

in which
a1 is an integer from 1 to 5;
b1 is an integer from 1 to 10;
d1 is an integer from 0 to 4;
e1 and e2 independent of each other are 0, 1, 2 or 3;

$A_4$, $A_5$, $A_6$, and $A_7$ independent of one another are methyl or ethyl;

$X_1$ is hydrogen or methyl;

$D_1$ and $D_2$ independently of each other are a divalent group of formula (4)

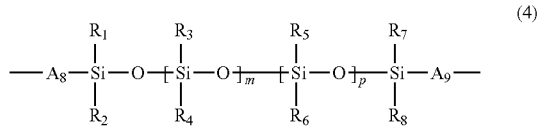

in which $A_8$ and $A_9$ independent of each other are a direct bond, a linear or branched $C_1$-$C_{10}$ alkylene divalent radical, —$(CH_2CH_2O)_{r1}$—$CH_2CH_2$— in which r1 is an integer of 1 to 20, or a $C_1$-$C_7$ alkyleneoxy-$C_1$-$C_7$ alkylene divalent radical, and $R_1$, $R_2$, $R_3$, $R_4$, $R_5$, $R_6$, $R_7$, and $R_8$, independently of one another, are $C_1$-$C_4$- alkyl, -alk-$(OCH_2CH_2)_{r2}$—$OR_9$ in which alk is $C_1$-$C_6$-alkylene divalent radical, $R_9$ is $C_1$-$C_4$ alkyl and r2 is an integer from 1 to 20, m and p independently of each other are an integer of from 0 to 150 and (m+p) is from 2 to 150;

$L_1$, $L_2$, $L_3$, $Y_2$, $Y_3$, $Y_4$, $Y_5$, $Y_6$, and $Y_7$ independent of one another are a direct bond or a divalent radical of —$Z_1$—$X_2$—$Z_2$—$X_3$—$Z_3$—$X_4$—$Z_4$— In which $X_2$, $X_3$, and $X_4$ independent of one other are a linkage selected from the group consisting of a direct bond, —O—, —NR'— in which R' is H or $C_1$-$C_4$ alkyl, —C(O)—NH—, —NH—C(O)—, —NH—C(O)—NH—, —O—C(O)—NH—, —S—, —NH—C(O)—O—, —C(O)—O—, —O—C(O)—, —NH—C(O)—NH—$Z_0$—NH—C(O)—NH—, —O—C(O)—NH—$Z_0$—NH—C(O)—O—, —O—C(O)—NH—$Z_0$—NH—C(O)—NH—, and —NH—C(O)—NH—$Z_0$—NH—C(O)—O—, in which $Z_0$ is a linear or branched $C_2$-$C_{12}$ alkylene divalent radical or a $C_5$-$C_{45}$ cycloaliphatic or aliphatic-cycloaliphatic divalent radical optionally containing therein one or more linkages of —O—, —NR'—, —S— and —C(O)—, $Z_1$, $Z_2$, $Z_3$, and $Z_4$ independent of one other are a direct bond, a linear or branched $C_1$-$C_{12}$ alkylene divalent radical optionally containing therein one or more linkages of —O—, —NR'—, —S— and —C(O)—, a divalent radical of —$CH_2$—$CH(OH)$—$CH_2$— or —$(CH_2CH_2O)_{r1}$—$CH_2CH_2$— with r1 as defined above, or a $C_5$-$C_{45}$ cycloaliphatic or aliphatic-cycloaliphatic divalent radical optionally containing therein one or more linkages of —O—, —NR'—, —S— and —C(O)—;

$B_1$ is a linear or 3-arm hydrophilic polymer chain having a number-average molecular weight of 10,000 Daltons or less and comprising at least 60% by weight of one or more hydrophilic monomeric units selected from the group consisting of ethyleneoxide units, (meth)acrylamide units, $C_1$-$C_3$ alkyl (meth)acrylamide units, di-($C_1$-$C_3$ alkyl) (meth)acrylamide units, N-vinylpyrrole units, N-vinyl-2-pyrrolidone units, 2-vinyloxazoline units, 4-vinylpyridine units, mono-$C_1$-$C_4$ alkoxy, mono-(meth)acryloyl terminated polyethyleneglycol units having a number-average molecular weight of 600 Daltons or less, di($C_1$-$C_3$ alkyl amino)($C_2$-$C_4$ alkyl) (meth)acrylate units, N—$C_1$-$C_4$ alkyl-3-methylene-2-pyrrolidone units, N—$C_1$-$C_4$ alkyl-5-methylene-2-pyrrolidone units, N-vinyl $C_1$-$C_6$ alkylamide units, N-vinyl-N—$C_1$-$C_6$ alkyl amide units, and combinations thereof, provided that at least one of $B_2$, $B_3$ and $B_4$ is the linear or 3-arm hydrophilic polymer chain;

$B_2$, $B_3$ and $B_4$ independent of one another are hydroxyl or a linear or 3-arm hydrophilic polymer chain having a molecular weight of about 10,000 Daltons or less and comprising at least about 60% by weight of one or more hydrophilic monomeric units selected from the group consisting of ethyleneoxide units, (meth)acrylamide units, $C_1$-$C_3$ alkyl (meth)acrylamide units, di-($C_1$-$C_3$ alkyl) (meth)acrylamide units, N-vinylpyrrole units, N-vinyl-2-pyrrolidone units, 2-vinyloxazoline units, 4-vinylpyridine units, mono-$C_1$-$C_4$ alkoxy, mono-(meth)acryloyl terminated polyethyleneglycol units having a molecular weight of 600 Daltons or less, di($C_1$-$C_3$ alkyl amino)($C_2$-$C_4$ alkyl) (meth)acrylate units, N—$C_1$-$C_4$ alkyl-3-methylene-2-pyrrolidone units, N—$C_1$-$C_4$ alkyl-5-methylene-2-pyrrolidone units, N-vinyl $C_1$-$C_6$ alkylamide units, N-vinyl-N—$C_1$-$C_6$ alkyl amide units, and combinations thereof, provided that at least one of $B_2$, $B_3$ and $B_4$ is the linear or 3-arm hydrophilic polymer chain;

$E_1$ and $E_2$ independent of each another are an aliphatic or cycloaliphatic or aliphatic-cycloaliphatic trivalent radical which has up to 15 carbon atoms and can be interrupted by —O—, —NR'—, —C(O)— and/or —S—.

5. The prepolymer of claim 4, wherein the prepolymer comprises a siloxane-containing vinylic monomer of formula (2).

6. The prepolymer of claim 4, wherein the prepolymer comprises a siloxane-containing vinylic monomer of formula (3).

7. The prepolymer of claim 1, wherein the hydrophilic monomeric units are derived from at least one hydrophilic vinylic monomer selected from the group consisting of N,N-dimethylacrylamide (DMA), N,N-dimethylmethacrylamide (DMMA), 2-acrylamidoglycolic acid, 3-acryloylamino-1-propanol, N-hydroxyethyl acrylamide, N-[tris(hydroxymethyl)methyl]-acrylamide, N-methyl-3-methylene-2-pyrrolidone, 1-ethyl-3-methylene-2-pyrrolidone, 1-methyl-5-methylene-2-pyrrolidone, 1-ethyl-5-methylene-2-pyrrolidone, 5-methyl-3-methylene-2-pyrrolidone, 5-ethyl-3-methylene-2-pyrrolidone, 1-n-propyl-3-methylene-2-pyrrolidone, 1-n-propyl-5-methylene-2-pyrrolidone, 1-isopropyl-3-methylene-2-pyrrolidone, 1-isopropyl-5-methylene-2-pyrrolidone, 1-n-butyl-3-methylene-2-pyrrolidone, 1-tert-butyl-3-methylene-2-pyrrolidone, 2-hydroxyethylmethacrylate (HEMA), 2-hydroxyethyl acrylate (HEA), hydroxypropyl acrylate, hydroxypropyl methacrylate (HPMA), trimethylammonium 2-hydroxy propylmethacrylate hydrochloride, aminopropyl methacrylate hydrochloride, dimethylaminoethyl methacrylate (DMAEMA), glycerol methacrylate (GMA), N-vinyl-2-pyrrolidone (NVP), allyl alcohol, vinylpyridine, a $C_1$-$C_4$-alkoxy polyethylene glycol (meth)acrylate having a weight average molecular weight of up to 1500, methacrylic acid, N-vinyl formamide, N-vinyl acetamide, N-vinyl isopropylamide, N-vinyl-N-methyl acetamide, N-vinyl caprolactam, and mixtures thereof.

8. The prepolymer of claim 7, wherein said at least one hydrophilic monomer is selected from the group consisting of N-vinylpyrrolidone, N,N-dimethyl (meth)acrylamide, (meth)acrylamide, N-vinyl formamide, N-vinyl acetamide, N-vinyl isopropylamide, N-vinyl-N-methyl acetamide, N-methyl-3-methylene-2-pyrrolidone, 1-ethyl-3-methylene-2-pyrrolidone, 1-methyl-5-methylene-2-pyrrolidone, 1-ethyl-5-methylene-2-pyrrolidone, 5-methyl-3-methylene-2-pyrrolidone, 5-ethyl-3-methylene-2-pyrrolidone, and combinations thereof.

9. The prepolymer of claim 1, wherein the polymerizable units are free of any polysiloxane segment and each comprise a basic monomeric unit being a part of a polymer chain of the prepolymer and with a pendant or terminal, ethylenically-unsaturated group attached thereon, wherein each basic monomeric unit is derived from a first ethylenically functionalizing vinylic monomer having a first reactive functional group, wherein the pendant or terminal ethylenically unsaturated group is derived from a second ethylenically functionalizing vinylic monomer having a second reactive functional group which reacts with one first reactive functional in the presence or absence of a crosslinking agent to form a covalent linkage, wherein the first and second reactive functional groups are selected from the group consisting of amino group, hydroxyl group, carboxyl group, azlactone group, isocyanate group, epoxy group, aziridine group, acid chloride, and combination thereof.

10. The prepolymer of claim 9, wherein the first and second ethylenically functionalizing vinylic monomers independent of each other are selected from the group consisting of $C_2$ to $C_6$ hydroxylalkyl (meth)acrylate, $C_2$ to $C_6$ hydroxyalkyl (meth)acrylamide, allylalcohol, allylamine, amino-$C_2$-$C_6$ alkyl (meth)acrylate, $C_1$-$C_6$ alkylamino-$C_2$-$C_6$ alkyl (meth)acrylate, vinylamine, amino-$C_2$-$C_6$ alkyl (meth)acrylamide, $C_1$-$C_6$ alkylamino-$C_2$-$C_6$ alkyl (meth)acrylamide, acrylic acid, $C_1$-$C_4$ alkylacrylic acid, N-[tris(hydroxymethyl)-methyl]acrylamide, N,N-2-acrylamidoglycolic acid, beta methyl-acrylic acid, alpha-phenyl acrylic acid, beta-acryloxy propionic acid, sorbic acid, angelic acid, cinnamic acid, 1-carobxy-4-phenyl butadiene-1,3, itaconic acid, citraconic acid, mesaconic acid, glutaconic acid, aconitic acid, maleic acid, fumaric acid, aziridinyl $C_1$-$C_{12}$ alkyl (meth)acrylate, glycidyl (meth)acrylate, vinyl glycidyl ether, allyl glycidyl ether, (meth)acrylic acid halide groups, $C_1$ to $C_6$ isocyanatoalkyl (meth)acrylate, azlactone-containing vinylic monomers, and combinations thereof.

11. The prepolymer of claim 10, wherein the first ethylenically functionalizing vinylic monomer is selected from the group consisting of hydroxyethyl (meth)acrylate, hydroxypropyl (meth)acrylate, hydroxyethyl (meth)acrylamide, hydroxypropyl (meth)acrylamide, allyl alcohol, aminoethyl (meth)acrylate, aminopropyl (meth)acrylate, aminoethyl (meth)acrylamide, aminopropyl (meth)acrylamide, allyl amine, (meth)acrylic acid, ethylacrylic acid, propylacrylic acid, butylacrylic acid, glycidyl (meth)acrylate, vinyl glycidyl ether, allyl glycidyl ether, isocynatoethyl (meth)acrylate, 2-(1-aziridinyl) ethyl (meth)acrylate, 3-(1-aziridinyl) propyl (meth)acrylate, 4-(1-aziridinyl) butyl (meth)acrylate, 2-vinyl-4,4-dimethyl-1,3-oxazolin-5-one (VDMO), 2-isopropenyl-4,4-dimethyl-1,3-oxazolin-5-one (IPDMO), and combination thereof.

\* \* \* \* \*